US012634850B2

(12) United States Patent   (10) Patent No.: US 12,634,850 B2

Kim et al.   (45) Date of Patent: May 19, 2026

(54) METHOD AND DEVICE FOR TIME AND PHASE SYNCHRONIZATION BETWEEN BASE STATIONS IN NETWORK COOPERATIVE COMMUNICATION

(71) Applicant: SAMSUNG ELECTRONICS CO., LTD., Suwon-si (KR)

(72) Inventors: Jaemin Kim, Suwon-si (KR); Hyoungju Ji, Suwon-si (KR); Youngrok Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 262 days.

(21) Appl. No.: 18/565,479

(22) PCT Filed: May 25, 2022

(86) PCT No.: PCT/KR2022/007434
§ 371 (c)(1),
(2) Date: Nov. 29, 2023

(87) PCT Pub. No.: WO2022/255721
PCT Pub. Date: Dec. 8, 2022

(65) Prior Publication Data
US 2024/0406891 A1   Dec. 5, 2024

(30) Foreign Application Priority Data

Jun. 1, 2021   (KR) ........................ 10-2021-0071071

(51) Int. Cl.
H04W 56/00   (2009.01)

(52) U.S. Cl.
CPC ..... H04W 56/001 (2013.01); H04W 56/0055 (2013.01)

(58) Field of Classification Search
None
See application file for complete search history.

(56) References Cited

U.S. PATENT DOCUMENTS 10,111,213 B2   10/2018   Lee et al.
11,206,632 B2   12/2021   Qi
(Continued)

FOREIGN PATENT DOCUMENTS

CN          112448783 A      3/2021
KR   10-2017-0129595 A     11/2017
(Continued)

OTHER PUBLICATIONS

International Search Report and Written Opinion of the International Searching Authority dated Aug. 25, 2022, in connection with International Application No. PCT/KR2022/007434, 9 pages.
(Continued)

*Primary Examiner* — Andre Tacdiran

(57)   ABSTRACT

The present disclosure relates to a 5G or 6G communication system for supporting a higher data transmission rate. The present disclosure provides a method performed by a terminal in a wireless communication system and a device for performing same, the method comprising the steps of: measuring a first reference signal transmitted from a first transmission and reception point (TRP) of a base station, and measuring a second reference signal transmitted from a second TRP; calculating a time delay difference between the first reference signal and the second reference signal; receiving, from the base station, terminal report configuration information indicating a report on the time delay difference between the first reference signal and the second reference signal; transmitting information on the time delay difference between the first reference signal and the second reference signal to the base station on the basis of the terminal report configuration information; receiving, from the first TRP and the second TRP, reference signals compensated on the basis of the information on the time delay difference between the first reference signal and the second reference signal; and receiving downlink information from the first TRP and the (Continued)

One subframe (110)

$N_{symb}^{subframe,\mu}$ OFDM symbols
1 OFDM symbols (102)

$l = N_{symb}^{subframe,\mu} \cdot N_{slot}^{frame} - 1$ 1 subcarrier (103)

$N_{sc}^{RB}$ subcarriers (104)

Resource block $N_{sc}^{RB}$ subcarriers (105)

Resource element $(k, l)$ (101)

Frequency $k = 0$ $l = 0$   $l = 14 \cdot 2^\mu - 1$

Time second TRP on the basis of the compensated reference signals.

15 Claims, 32 Drawing Sheets

(56) References Cited

U.S. PATENT DOCUMENTS

| | | | |
|---|---|---|---|
| 2013/0083780 A1 | 4/2013 | Luo et al. | |
| 2013/0242952 A1* | 9/2013 | Chu ................. | H04W 72/0446 |
| | | | 370/336 |
| 2018/0317186 A1* | 11/2018 | Fan ....................... | H04L 5/0035 |
| 2022/0141064 A1* | 5/2022 | Horn ..................... | H04W 72/23 |
| | | | 370/329 |
| 2022/0353832 A1* | 11/2022 | Xiao ................... | H04W 56/004 |
| 2023/0344575 A1* | 10/2023 | Manolakos ......... | H04W 56/004 |

FOREIGN PATENT DOCUMENTS

| | | | |
|---|---|---|---|
| KR | 10-2053038 B1 | 12/2019 | |
| KR | 10-2020-0099500 A | 8/2020 | |
| WO | 2020/167057 A1 | 8/2020 | |
| WO | WO2021036969 | * | 4/2021 |

OTHER PUBLICATIONS

CATT [RAN1], "[Draft] LS on UE/TRP Tx/Rx Timing Errors", 3GPP TSG RAN WG1 Meeting #104bis-e, R1-2104053, e-Meeting, Apr. 12-20, 2021, 2 pages.

3GPP TR 38.866 V16.1.0 (Mar. 2019), 3rd Generation Partnership Project; Technical Specification Group Radio Access Network; Study on remote interference management for NR (Release 16), Mar. 2019, 31 pages.

Supplementary European Search Report dated Aug. 29, 2024, in connection with European Patent Application No. 22816380.4, 13 pages.

* cited by examiner

FIG. 6

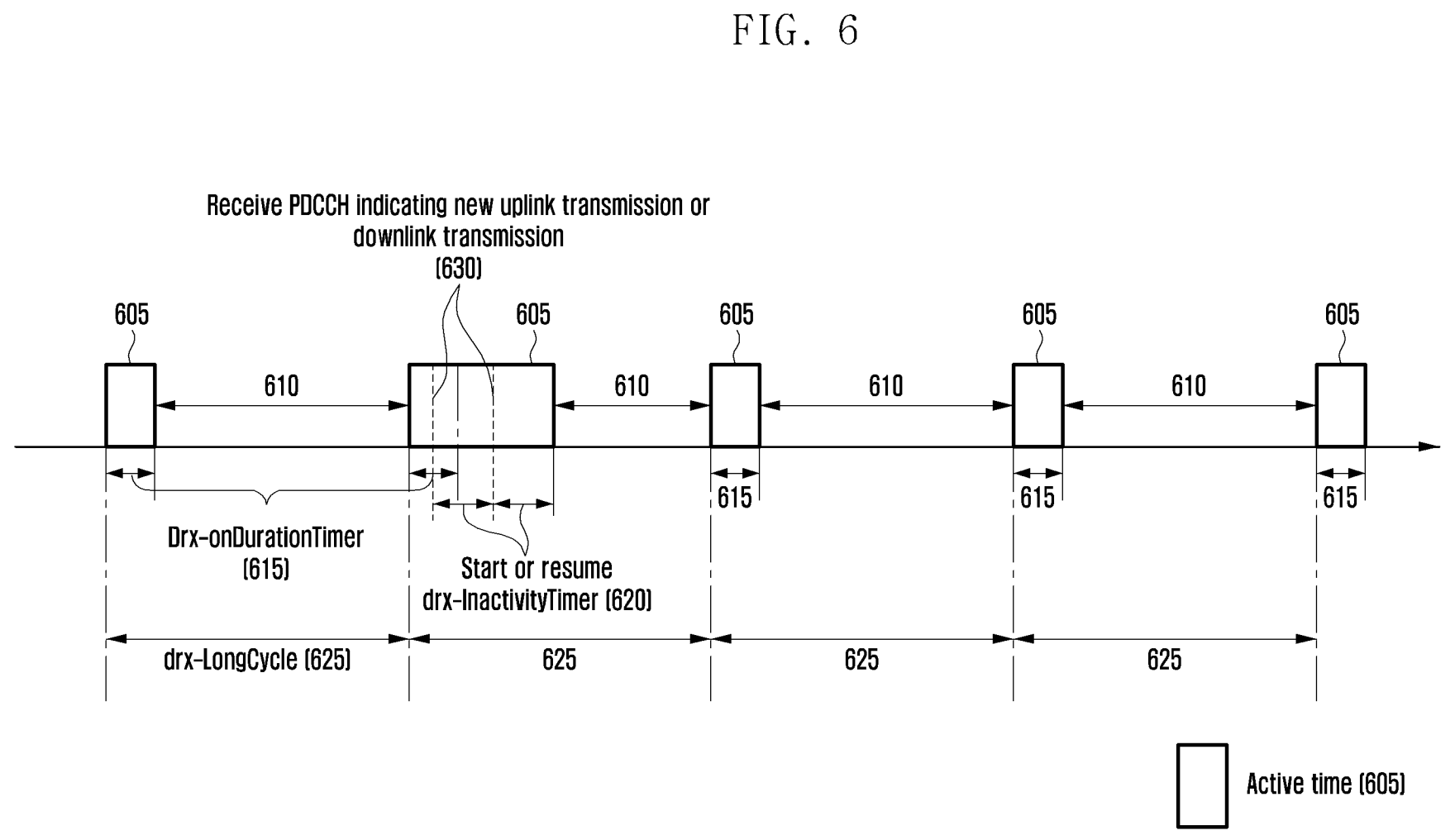

Active time [605]

Receive PDCCH indicating new uplink transmission or downlink transmission [630]

Start or resume drx-InactivityTimer [620]

Drx-onDurationTimer [615]

drx-LongCycle [625]

605

610

615

625

TCI state #0
[700]

TCI state #1
[705]

TCI state #2
[710]

FIG. 10
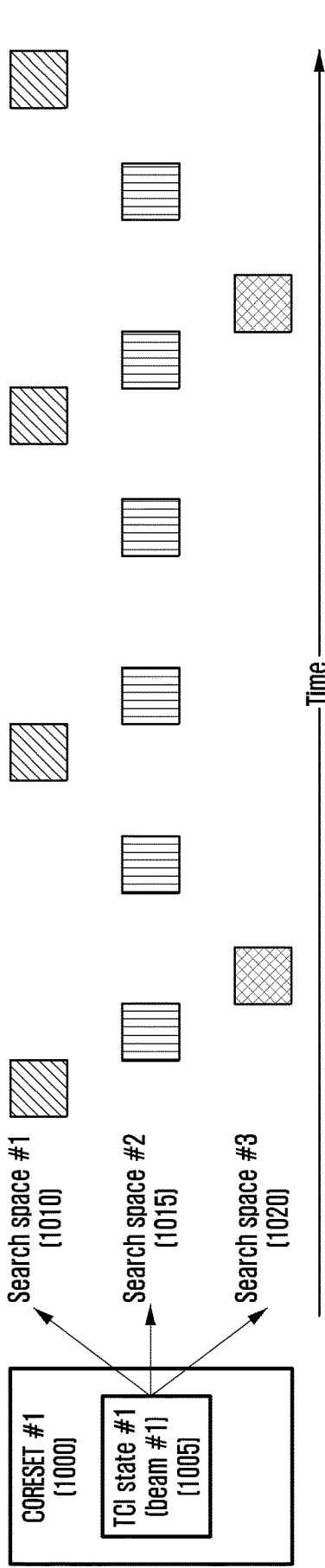
Search space #1 (1010)
Search space #2 (1015)
Search space #3 (1020)
CORESET #1 (1000)
TCI state #1 (beam #1) (1005)
Time

FIG. 11

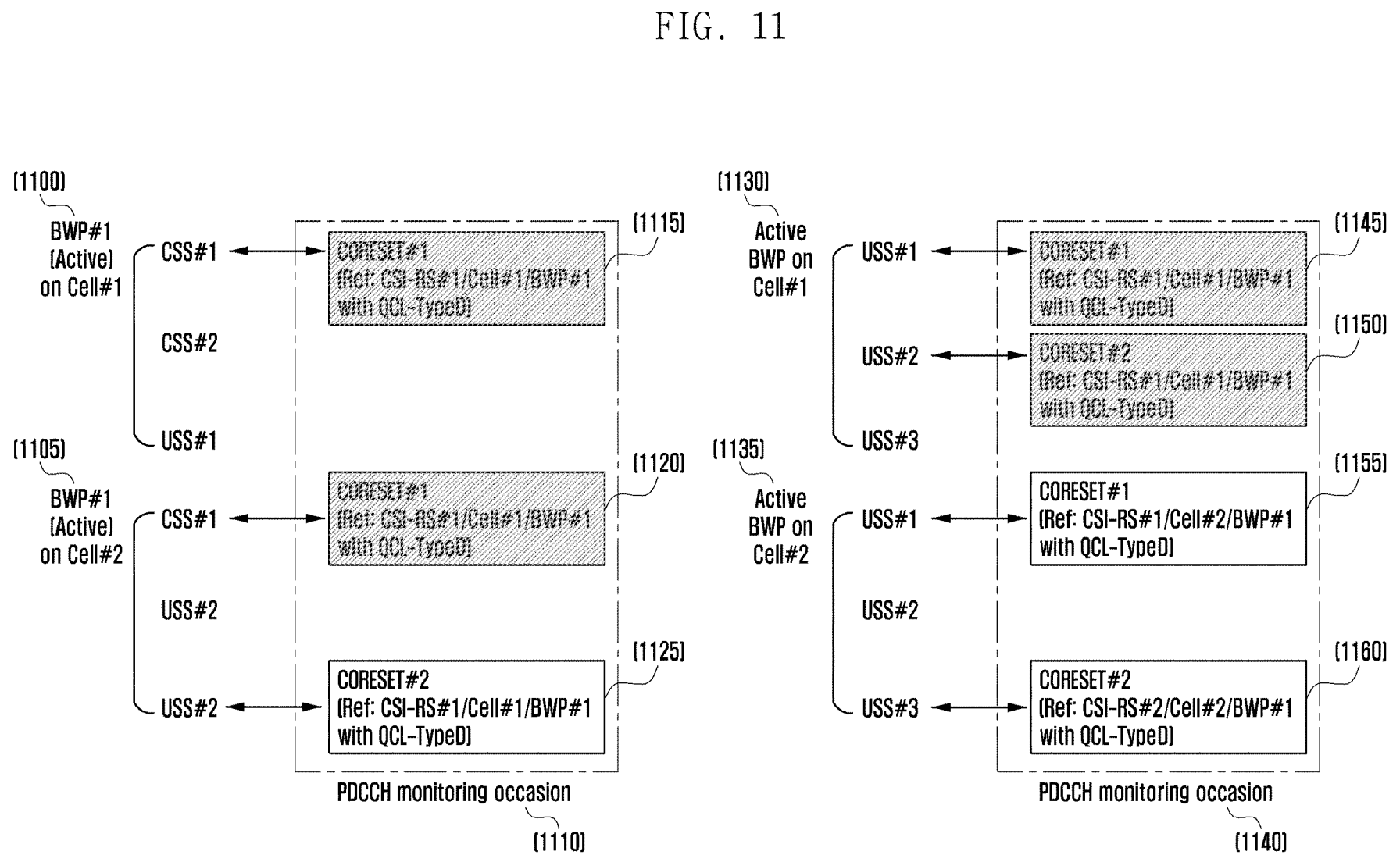

[1115] CORESET #1
[Ref: CSI-RS#1/Cell#1/BWP#1 with QCL-TypeD]

[1120] CORESET #1
[Ref: CSI-RS#1/Cell#1/BWP#1 with QCL-TypeD]

[1125] CORESET #2
[Ref: CSI-RS#1/Cell#1/BWP#1 with QCL-TypeD]

PDCCH monitoring occasion [1110]

CSS#1
CSS#2
USS#1

CSS#1
USS#2
USS#2

[1100] BWP #1 (Active) on Cell#1
[1105] BWP #1 (Active) on Cell#2

[1145] CORESET #1
[Ref: CSI-RS#1/Cell#1/BWP#1 with QCL-TypeD]

[1150] CORESET #2
[Ref: CSI-RS#1/Cell#1/BWP#1 with QCL-TypeD]

[1155] CORESET #1
[Ref: CSI-RS#1/Cell#2/BWP#1 with QCL-TypeD]

[1160] CORESET #2
[Ref: CSI-RS#2/Cell#2/BWP#1 with QCL-TypeD]

PDCCH monitoring occasion [1140]

USS#1
USS#2
USS#3

USS#1
USS#2
USS#3

[1130] Active BWP on Cell#1
[1135] Active BWP on Cell#2

Figure 19:
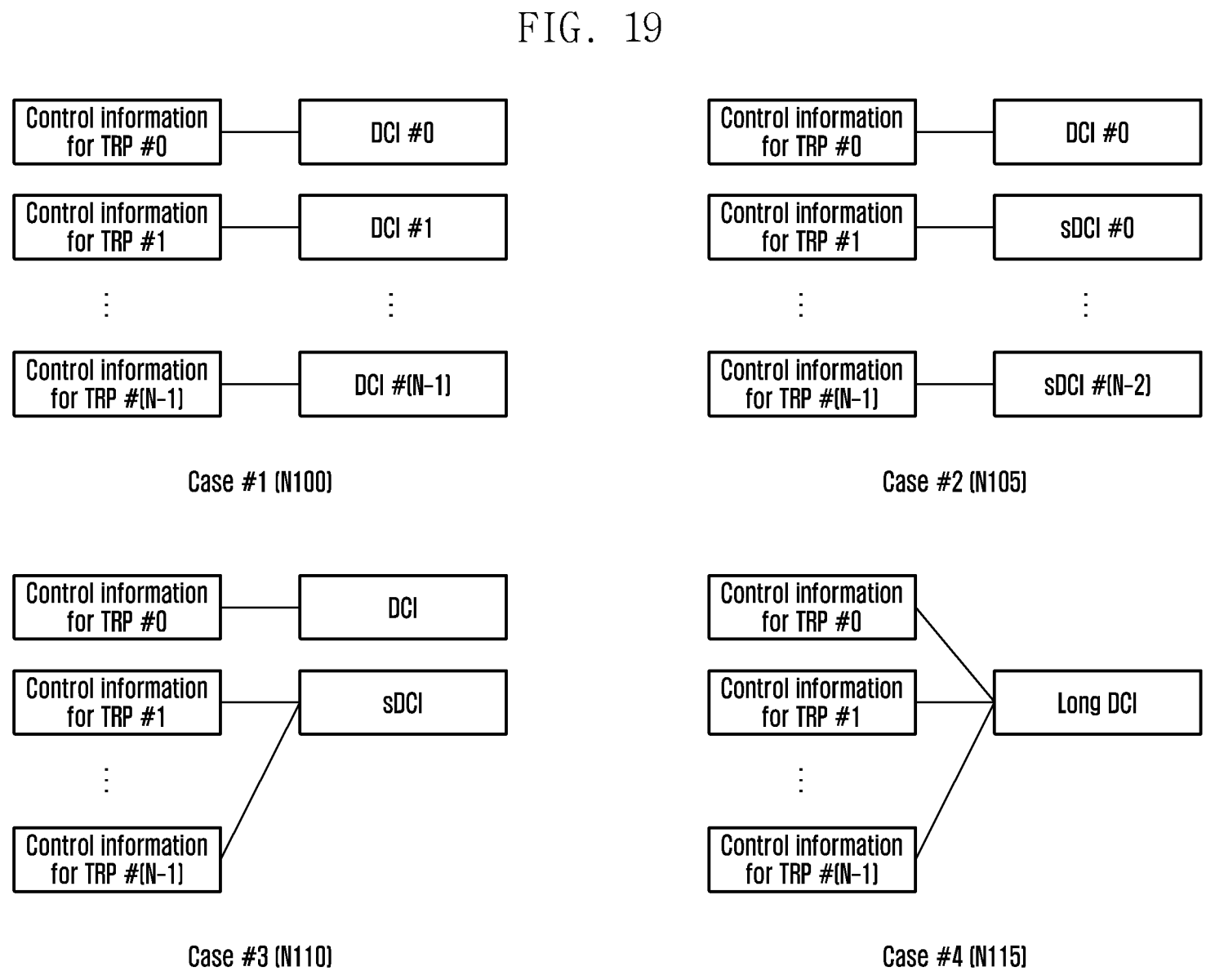

Case #1 (N100)

| Control information for TRP #0 | — | DCI #0 |
| Control information for TRP #1 | — | DCI #1 |
| ... | | ... |
| Control information for TRP #(N-1) | — | DCI #(N-1) |

Case #2 (N105)

| Control information for TRP #0 | — | DCI #0 |
| Control information for TRP #1 | — | sDCI #0 |
| ... | | ... |
| Control information for TRP #(N-1) | — | sDCI #(N-2) |

Case #3 (N110)

| Control information for TRP #0 | — | DCI |
| Control information for TRP #1 | — | sDCI |
| ... | | |
| Control information for TRP #(N-1) | | |

Case #4 (N115)

| Control information for TRP #0 | | |
| Control information for TRP #1 | | Long DCI |
| ... | | |
| Control information for TRP #(N-1) | | |

METHOD AND DEVICE FOR TIME AND PHASE SYNCHRONIZATION BETWEEN BASE STATIONS IN NETWORK COOPERATIVE COMMUNICATION

TECHNICAL FIELD

The disclosure relates to operations of a terminal and a base station in network cooperative communication. Specifically, the disclosure relates to a method for synchronization between base stations in network cooperative communication and a device capable of performing the same.

BACKGROUND ART 5G mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G.

In the initial stage of 5G mobile communication technologies, in order to support services and to satisfy performance requirements in connection with enhanced Mobile BroadBand, (eMBB), Ultra Reliable & Low Latency Communications (URLLC), and massive Machine-Type Communications (mMTC), there has been ongoing standardization regarding beamforming and massive MIMO for alleviating radio-wave path loss and increasing radio-wave transmission distances in mmWave, numerology (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large-capacity data transmission and a polar code for highly reliable transmission of control information, L2 pre-processing, and network slicing for providing a dedicated network customized to a specific service.

Currently, there is ongoing discussion regarding improvement and performance enhancement of initial 5G mobile communication technologies in view of services to be supported by 5G mobile communication technologies, and there has been physical layer standardization regarding technologies such as V2X for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for securing coverage in an area in which communication with terrestrial networks is impossible, and positioning.

Moreover, there has been ongoing standardization in wireless interface architecture/protocol fields regarding technologies such as Industrial Internet of Things (IoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service fields regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

If such 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting AR, VR, and the like (XR=AR+VR+MR), 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for securing coverage in terahertz bands of 6G mobile communication technologies, Full Dimensional MIMO (FD-MIMO), multi-antenna transmission technologies such as array antennas and large-scale antennas, meta-material-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

DISCLOSURE

Technical Problem

Embodiments of the disclosure provide a device and a method capable of effectively providing a service in a mobile communication system.

In addition, embodiments of the disclosure provide a method for synchronization between base stations in network cooperative communication and a device capable of performing the same.

Technical Solution

An embodiment of the disclosure for solving the task above relates to a method for processing a control signal in a wireless communication system, the method including: configuring a reference signal for a terminal from a base station; transmitting the configured reference signal to the terminal; measuring, by the terminal, a delay time and a phase difference of the signal transmitted from the base station; reporting a measurement value to the base station from the terminal; based on the reported measurement value, performing pre-compensation to match time and phase synchronization by the base station; and transmitting a downlink signal to the terminal by the base station having matched synchronization.

In addition, an embodiment of the disclosure relates to a method performed by a terminal of a wireless communication system, the method including measuring a first reference signal transmitted from a first transmission and reception point (TRP) of a base station and measuring a second reference signal transmitted from a second TRP, calculating a time delay difference between the first reference signal and the second reference signal, receiving, from the base station, terminal report configuration information indicating reporting of the time delay difference between the first reference signal and the second reference signal, transmitting, based on the terminal report configuration information, information on the time delay difference between the first reference signal and the second reference signal to the base station, receiving reference signals compensated based on the information on the time delay difference between the first reference signal and the second reference signal from the first TRP and the second TRP, and receiving downlink information from the first TRP and the second TRP, based on the compensated reference signals.

In addition, an embodiment of the disclosure relates to a method performed by a base station of a wireless communication system, the method including transmitting a first reference signal from a first transmission and reception point (TRP) and transmitting a second reference signal from a second TRP to a terminal, transmitting, to the terminal, terminal report configuration information indicating reporting of a time delay difference between the first reference signal and the second reference signal, receiving, based on the terminal report configuration information, information on the time delay difference between the first reference signal and the second reference signal from the terminal, compensating, based on the information on the time delay difference, at least one reference signal of the first reference signal of the first TRP or the reference signal of the second TRP, transmitting compensated reference signals from the first TRP and the second TRP to the terminal, and transmitting downlink information to the terminal from the first TRP and the second TRP, based on the compensated reference signals.

In addition, an embodiment of the disclosure relates to a terminal of a wireless communication system, the terminal including a transceiver and a controller, wherein the controller is configured to measure a first reference signal transmitted from a first transmission and reception point (TRP) of a base station and measure a second reference signal transmitted from a second TRP, calculate a time delay difference between the first reference signal and the second reference signal, receive, from the base station, terminal report configuration information indicating reporting of the time delay difference between the first reference signal and the second reference signal, transmit, based on the terminal report configuration information, information on the time delay difference between the first reference signal and the second reference signal to the base station, receive reference signals compensated based on the information on the time delay difference between the first reference signal and the second reference signal from the first TRP and the second TRP, and perform control to receive downlink information from the first TRP and the second TRP, based on the compensated reference signals.

In addition, an embodiment of the disclosure relates to a base station of a wireless communication system, the base station including a transceiver and a controller, wherein the controller is configured to transmit a first reference signal from a first transmission and reception point (TRP) and transmit a second reference signal from a second TRP to a terminal, transmit, to the terminal, terminal report configuration information indicating reporting of a time delay difference between the first reference signal and the second reference signal, receive, based on the terminal report configuration information, information on the time delay difference between the first reference signal and the second reference signal from the terminal, compensate, based on the information on the time delay difference, at least one reference signal of the first reference signal of the first TRP or the reference signal of the second TRP, transmit compensated reference signals from the first TRP and the second TRP to the terminal, and perform control to transmit downlink information to the terminal from the first TRP and the second TRP, based on the compensated reference signals.

The technical subjects pursued in the disclosure may not be limited to the above mentioned technical subjects, and other technical subjects which are not mentioned may be clearly understood, through the following descriptions, by those skilled in the art to which the disclosure pertains.

Advantageous Effects

According to various embodiments of the disclosure, a device and a method for efficiently providing a service in a mobile communication system can be provided.

In addition, according to various embodiments of the disclosure, a method for synchronization between base stations in network cooperative communication and a device capable of performing the same can be provided.

DESCRIPTION OF DRAWINGS

FIG. 6 is a diagram illustrating an example of a discontinuous reception (DRX) operation in the wireless communication system according to an embodiment of the disclosure;

FIG. 10 is a diagram illustrating an example of a control resource set and a beam configuration of a search space in the wireless communication system according to an embodiment of the disclosure;

FIG. 11 is a diagram for illustrating a method of selecting a receivable control resource set in consideration of a priority when a terminal receives a downlink control channel in the wireless communication system according to an embodiment of the disclosure;

FIG. 18 shows diagrams illustrating examples of an antenna port configuration and resource allocation for cooperative communication in the wireless communication system according to an embodiment of the disclosure;

FIG. 19 shows diagrams illustrating examples of a downlink control information (DC) configuration for cooperative communication in the wireless communication system according to an embodiment of the disclosure;

MODE FOR INVENTION

Figure 1:
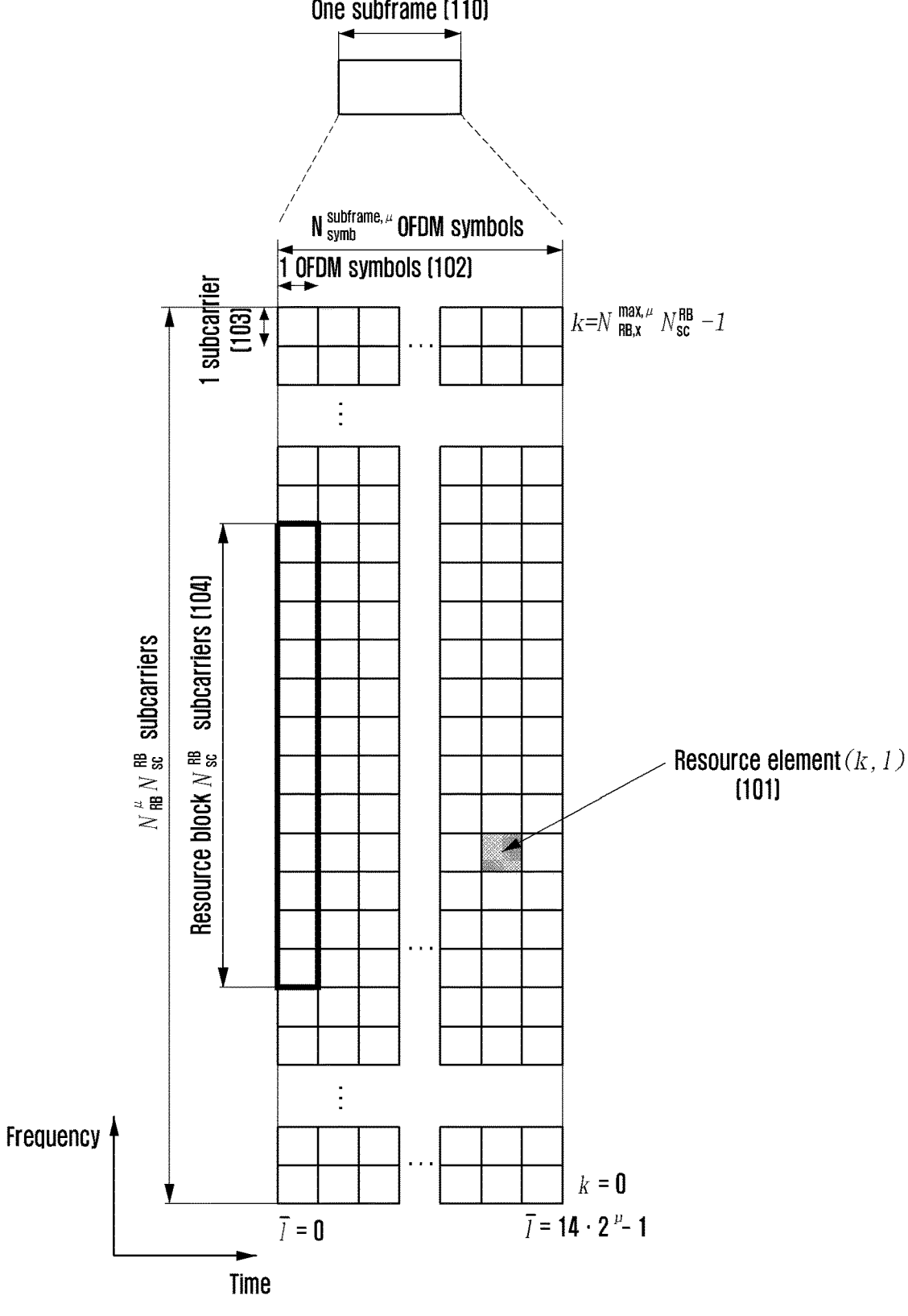
FIG. 1 is a diagram illustrating a basic structure of a time-frequency domain in a wireless communication system according to an embodiment of the disclosure.

Hereinafter, embodiments of the disclosure will be described in detail with reference to the accompanying drawings.

In describing the embodiments, descriptions related to technical contents well-known in the art and not associated directly with the disclosure will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements. Furthermore, in describing the disclosure, a detailed description of known functions or configurations incorporated herein will be omitted when it is determined that the description may make the subject matter of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification.

In the following description, a base station is an entity that allocates resources to terminals, and may be at least one of a gNode B, an eNode B, a Node B, a base station (BS), a wireless access unit, a base station controller, and a node on a network. A terminal may include a user equipment (UE), a mobile station (MS), a cellular phone, a smartphone, a computer, or a multimedia system capable of performing communication functions. In the disclosure, a "downlink (DL)" refers to a radio link via which a base station transmits a signal to a terminal, and an "uplink (UL)" refers to a radio link via which a terminal transmits a signal to a base station. Furthermore, in the following description, LTE or LTE-A systems may be described by way of example, but the embodiments of the disclosure may also be applied to other communication systems having similar technical backgrounds or channel types. Examples of such communication systems may include 5th generation mobile communication technologies (5G, new radio, and NR) developed beyond LTE-A, and in the following description, the "5G" may be the concept that covers the exiting LTE, LTE-A, or other similar services. In addition, based on determinations by those skilled in the art, the embodiments of the disclosure may also be applied to other communication systems through some modifications without significantly departing from the scope of the disclosure.

Herein, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Furthermore, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more CPUs within a device or a security multimedia card. Furthermore, the "unit" in the embodiments may include one or more processors.

A wireless communication system is advancing to a broadband wireless communication system for providing high-speed and high-quality packet data services using communication standards, such as high-speed packet access (HSPA) of 3GPP, LTE {long-term evolution or evolved universal terrestrial radio access (E-UTRA)}, LTE-Advanced (LTE-A), LTE-Pro, high-rate packet data (HRPD) of 3GPP2, ultra-mobile broadband (UMB), IEEE 802.16e, and the like, as well as typical voice-based services.

As a typical example of the broadband wireless communication system, an LTE system employs an orthogonal frequency division multiplexing (OFDM) scheme in a downlink (DL) and employs a single carrier frequency division multiple access (SC-FDMA) scheme in an uplink (UL). The uplink indicates a radio link through which a user equipment (UE) (or a mobile station (MS)) transmits data or control signals to a base station (BS) (eNode B), and the downlink indicates a radio link through which the base station transmits data or control signals to the UE. The above multiple access scheme may separate data or control information of respective users by allocating and operating time-frequency resources for transmitting the data or control information for each user so as to avoid overlapping each other, that is, so as to establish orthogonality.

Since a 5G communication system, which is a post-LTE communication system, must freely reflect various requirements of users, service providers, and the like, services satisfying various requirements must be supported. The services considered in the 5G communication system include enhanced mobile broadband (eMBB) communication, massive machine-type communication (mMTC), ultra-reliability low-latency communication (URLLC), and the like.

eMBB aims at providing a data rate higher than that supported by existing LTE, LTE-A, or LTE-Pro. For example, in the 5G communication system, eMBB must provide a peak data rate of 20 Gbps in the downlink and a peak data rate of 10 Gbps in the uplink for a single base station. Furthermore, the 5G communication system must provide an increased user-perceived data rate to the UE, as well as the maximum data rate. In order to satisfy such requirements, transmission/reception technologies including a further enhanced multi-input multi-output (MIMO) transmission technique are required to be improved. In addition, the data rate required for the 5G communication system may be obtained using a frequency bandwidth more than 20 MHz in a frequency band of 3 to 6 GHz or 6 GHz or more, instead of transmitting signals using a transmission bandwidth up to 20 MHz in a band of 2 GHz used in LTE.

In addition, mMTC is being considered to support application services such as the Internet of Things (IoT) in the 5G communication system. mMTC has requirements, such as support of connection of a large number of UEs in a cell, enhancement coverage of UEs, improved battery time, a reduction in the cost of a UE, and the like, in order to effectively provide the Internet of Things. Since the Internet of Things provides communication functions while being provided to various sensors and various devices, it must support a large number of UEs (e.g., 1,000,000 UEs/km2) in a cell. In addition, the UEs supporting mMTC may require wider coverage than those of other services provided by the 5G communication system because the UEs are likely to be located in a shadow area, such as a basement of a building, which is not covered by the cell due to the nature of the service. The UE supporting mMTC must be configured to be inexpensive, and may require a very long battery life-time such as 10 to 15 years because it is difficult to frequently replace the battery of the UE.

Lastly, URLLC, which is a cellular-based mission-critical wireless communication service, may be used for remote control for robots or machines, industrial automation, unmanned aerial vehicles, remote health care, emergency alert, and the like. Thus, URLLC must provide communication with ultra-low latency and ultra-high reliability. For example, a service supporting URLLC must satisfy an air interface latency of less than 0.5 ms, and also requires a packet error rate of 10-5 or less. Therefore, for the services supporting URLLC, a 5G system must provide a transmit time interval (TTI) shorter than those of other services, and also may require a design for assigning a large number of resources in a frequency band in order to secure reliability of a communication link.

The three 5G services, that is, eMBB, URLLC, and mMTC, may be multiplexed and transmitted in a single system. In this case, different transmission/reception techniques and transmission/reception parameters may be used between services in order to satisfy different requirements of the respective services. Of course, 5G is not limited to the above-described three services.

[NR Time-Frequency Resources]

Hereinafter, a frame structure of a 5G system will be described in more detail with reference to the drawings.

FIG. 1 is a diagram illustrating a basic structure of a time-frequency domain that is a radio resource region in which data or a control channel is transmitted in a 5G system.

In FIG. 1, a horizontal axis represents a time domain, and a vertical axis represents a frequency domain. A basic unit of a resource in the time and frequency domains is a resource element (RE) 101, and may be defined to be 1 orthogonal frequency division multiplexing (OFDM) symbol 102 on the time axis and 1 subcarrier 103 on the frequency axis. Consecutive REs (e.g., 12) in the frequency domain may constitute one resource block (RB) 104. In the time domain, 14 consecutive OFDM symbols may constitute one slot, and a time interval of 1 ms may be configured to be one subframe 110.

Figure 2:
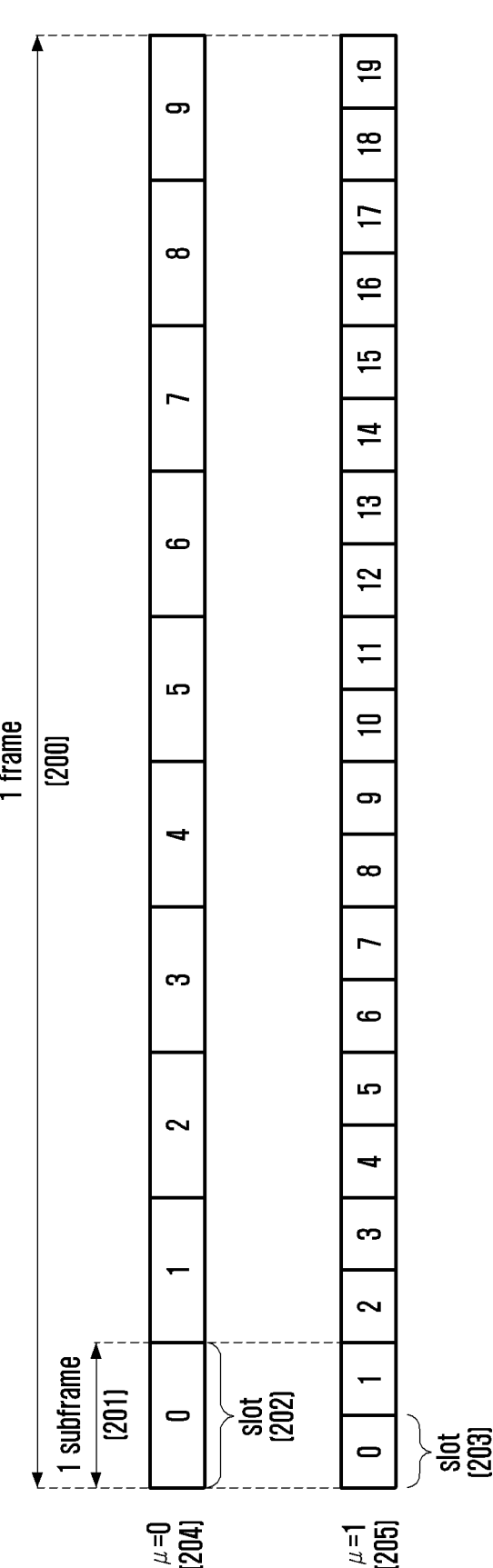
FIG. 2 is a diagram illustrating a frame, a subframe, and a slot structure in the wireless communication system according to an embodiment of the disclosure.

FIG. 2 is a diagram illustrating a frame, a subframe, and a slot structure in the wireless communication system according to an embodiment of the disclosure.

FIG. 2 illustrates an example of a frame 200, a subframe 201, and a slot 202 structure. One frame 200 may be defined to be 10 ms. One subframe 201 may be defined to be 1 ms, and therefore one frame 200 may include a total of 10 subframes 201. One slot 202 or 203 may be defined to be 14 OFDM symbols (that is, the number of symbols per slot $$\left(N_{symb}^{slot}\right) = 14\right).$$

One subframe 201 may include one or multiple slots 202 and 203, and the number of slots 202 and 203 per subframe 201 may vary according to configuration values p 204 and 205 for subcarrier spacings. The example of FIG. 2 illustrates a case 204 where subcarrier spacing configuration value μ=0 and a case 205 where subcarrier spacing configuration value μ=1. If μ=0 204, one subframe 201 may include one slot 202, and if p=1 205, one subframe 201 may include two slots 203. That is, the number $$\left(N_{slot}^{subframe,\mu}\right)$$

of slots per subframe may vary according to configuration value p for a subcarrier spacing, and accordingly, the number $$\left(N_{slot}^{frame,\mu}\right)$$

of slots per frame may vary.

$$N_{slot}^{subframe,\mu} \text{ and } N_{slot}^{frame,\mu}$$

according to each subcarrier spacing configuration p may be defined in Table 1 below.

TABLE 1

| μ | $N_{symb}^{slot}$ | $N_{slot}^{frame,\,\mu}$ | $N_{slot}^{subframe,\,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

[Bandwidth Part (BWP)]

Next, a bandwidth part (BWP) configuration in a 5G communication system will be described in detail with reference to the drawings.

Figure 3:
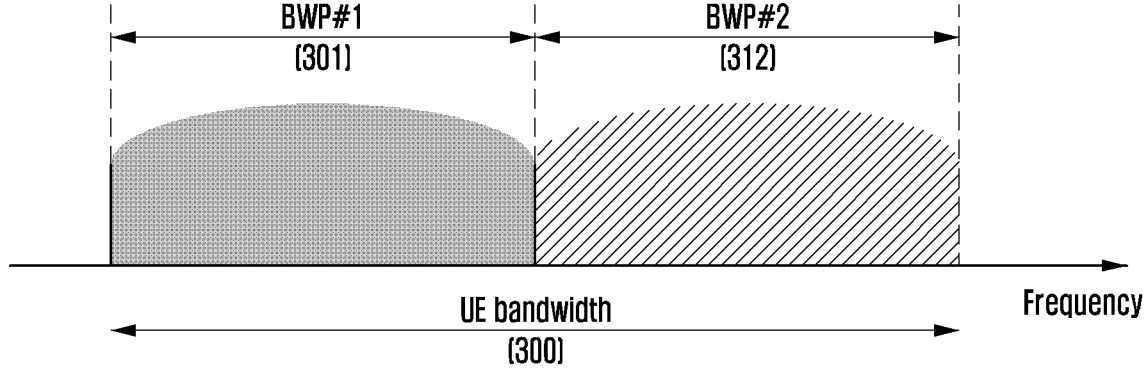
FIG. 3 is a diagram illustrating an example of a bandwidth part configuration in the wireless communication system according to an embodiment of the disclosure.

FIG. 3 is a diagram illustrating an example of a bandwidth part configuration in the wireless communication system according to an embodiment of the disclosure.

FIG. 3 shows an example in which a terminal bandwidth (UE bandwidth) 300 is configured to have two bandwidth parts, i.e., bandwidth part #1 301 and bandwidth part #2 302. A base station may configure one or multiple bandwidth parts for a terminal, and may configure the following information for each bandwidth part.

TABLE 2

| BWP ::= | SEQUENCE { |
|---|---|
| bwp-Id | BWP_Id, |
| (bandwidth part identifier) | |
| locationAndBandwidth | INTEGER (0..65536), |
| (bandwidth part location) | |

TABLE 2-continued

| subcarrierSpacing n5}, (subcarrier spacing) | SubcarrierSpacing {n0, n1, n2, n3, n4, |
|---|---|
| cyclicPrefix (cyclic prefix) } | ENUMERATED { extended } |

The disclosure is not limited to the above example, and in addition to the configuration information, various parameters related to a bandwidth part may be configured for the terminal. The base station may transfer the information to the terminal via higher-layer signaling, for example, radio resource control (RRC) signaling. At least one bandwidth part among the configured one or multiple bandwidth parts may be activated. Whether the configured bandwidth part is active may be transferred from the base station to the terminal in a semi-static manner via RRC signaling or may be dynamically transferred via downlink control information (DCI).

According to some embodiments, the terminal before a radio resource control (RRC) connection may be configured with an initial bandwidth part (BWP) for initial access, by the base station via a master information block (MIB). More specifically, during initial access, the terminal may receive configuration information for a search space and a control area (control resource set (CORESET)) in which a PDCCH for receiving system information (which may correspond to remaining system information (RMSI) or system information block 1 (SIB1)) required for the initial access may be transmitted via the MIB. Each of the search space and the control resource set configured via the MIB may be considered to be identifier (identity (ID)) 0. The base station may notify, via the MIB, the terminal of configuration information, such as frequency allocation information, time allocation information, and numerology for control resource set #0. In addition, the base station may notify, via the MIB, the terminal of configuration information for a monitoring periodicity and occasion for control resource set #0, that is, the configuration information for search space #0. The terminal may consider a frequency domain configured to be control resource set #0, which is acquired from the MIB, as an initial bandwidth part for initial access. In this case, an identity (ID) of the initial bandwidth part may be considered to be 0.

The bandwidth part configuration supported by 5G may be used for various purposes.

According to some embodiments, if a bandwidth supported by the terminal is smaller than a system bandwidth, this may be supported via the bandwidth part configuration. For example, the base station may configure, for the terminal, a frequency position (configuration information 2) of the bandwidth part, and the terminal may thus transmit or receive data at a specific frequency position within the system bandwidth.

According to some embodiments, for the purpose of supporting different numerologies, the base station may configure multiple bandwidth parts for the terminal. For example, in order to support data transmission or reception using both a subcarrier spacing of 15 kHz and a subcarrier spacing of 30 kHz for a certain terminal, the base station may configure two bandwidth parts with the subcarrier spacings of 15 kHz and 30 kHz, respectively. Different bandwidth parts may be frequency-division-multiplexed, and when data is to be transmitted or received at a specific subcarrier spacing, a bandwidth part configured with the subcarrier spacing may be activated.

According to some embodiments, for the purpose of reducing power consumption of the terminal, the base station may configure, for the terminal, bandwidth parts having different bandwidth sizes. For example, if the terminal supports a very large bandwidth, for example, a bandwidth of 100 MHz, and always transmits or receives data via the corresponding bandwidth, very large power consumption may occur. In particular, in a situation where there is no traffic, it may be very inefficient, in terms of power consumption, to perform unnecessary monitoring for a downlink control channel with a large bandwidth of 100 MHz. For the purpose of reducing power consumption of the terminal, the base station may configure, for the terminal, a bandwidth part of a relatively small bandwidth, for example, a bandwidth part of 20 MHz. In the situation where there is no traffic, the terminal may perform monitoring in the bandwidth part of 20 MHz, and when data is generated, the terminal may transmit or receive the data by using the bandwidth part of 100 MHz according to an indication of the base station.

In the method for configuring the bandwidth part, terminals before an RRC connection may receive configuration information for an initial bandwidth part via a master information block (MIB) during initial access. More specifically, a terminal may be configured with a control area (control resource set (CORESET)) for a downlink control channel through which downlink control information (DCI) for scheduling of a system information block (SIB) may be transmitted from an MIB of a physical broadcast channel (PBCH). The bandwidth of the control resource set, which is configured via the MIB, may be considered to be the initial bandwidth part, and the terminal may receive a physical downlink shared channel (PDSCH), through which the SIB is transmitted, via the configured initial bandwidth part. In addition to reception of the SIB, the initial bandwidth part may be used for other system information (OSI), paging, and random access.

[Change of Bandwidth Part (BWP)]

When one or more bandwidth parts are configured for the terminal, the base station may indicate the terminal to change (or switch or shift) the bandwidth part, by using a bandwidth part indicator field in DCI. For example, in FIG. 3, if a currently active bandwidth part of the terminal is bandwidth part #1 301, the base station may indicate bandwidth part #2 302 to the terminal by using the bandwidth part indicator in the DCI, and the terminal may switch the bandwidth part to bandwidth part #2 302 indicated using the bandwidth part indicator in the received DCI.

As described above, the DCI-based switching of the bandwidth part may be indicated by the DCI for scheduling of a PDSCH or PUSCH, and therefore when a request for switching a bandwidth part is received, the terminal may need to perform, with ease, transmission or reception of the PDSCH or PUSCH scheduled by the corresponding DCI in the switched bandwidth part. To this end, in the standard, requirements for a delay time (TBWP) required when a bandwidth part is switched are regulated, and may be defined as below, for example,

TABLE 3

| | | BWP switch delay $T_{BWP}$ (slots) | |
|---|---|---|---|
| μ | NR Slot length (ms) | Type 1[Note 1] | Type 2[Note 1] |
| 0 | 1 | 1 | 3 |
| 1 | 0.5 | 2 | 5 |

TABLE 3-continued

| μ | NR Slot length (ms) | BWP switch delay $T_{BWP}$ (slots) | |
| | | Type 1[Note 1] | Type 2[Note 1] |
| --- | --- | --- | --- |
| 2 | 0.25 | 3 | 9 |
| 3 | 0.125 | 6 | 18 |

Note 1:

Depends on UE capability.

Note 2:

If the BWP switch involves changing of SCS, the BWP switch delay is determined by the larger one between the SCS before BWP switch and the SCS after BWP switch.

The requirements for a bandwidth part switch delay time support type 1 or type 2 according to capability of the terminal. The terminal may report a supportable bandwidth part delay time type to the base station.

According to the aforementioned requirements for the bandwidth part switch delay time, when the terminal receives DCI including the bandwidth part switch indicator in slot n, the terminal may complete switching to a new bandwidth part indicated by the bandwidth part switch indicator at a time point no later than slot n+TBWP, and may perform transmission or reception for a data channel scheduled by the corresponding DCI in the switched new bandwidth part. When the base station is to schedule a data channel with a new bandwidth part, time domain resource allocation for the data channel may be determined by considering the bandwidth part switch delay time (TBWP) of the terminal. That is, in a method of determining time domain resource allocation for a data channel when the base station schedules the data channel with a new bandwidth part, scheduling of the data channel may be performed after a bandwidth part switch delay time. Accordingly, the terminal may not expect that DCI indicating bandwidth part switching indicates a slot offset (K0 or K2) value smaller than the bandwidth part switch delay time (TBWP).

If the terminal receives DCI (e.g., DCI format 1_1 or 0_1) indicating bandwidth part switching, the terminal may not perform any transmission or reception during a time interval from a third symbol of a slot in which a PDCCH including the DCI is received to a start point of a slot indicated by a slot offset (K0 or K2) value indicated via a time domain resource allocation indicator field in the DCI. For example, when the terminal receives the DCI indicating bandwidth part switching in slot n, and a slot offset value indicated by the DCI is K, the terminal may not perform any transmission or reception from a third symbol of slot n to a symbol before slot n+K (i.e., the last symbol in slot n+K−1).

[SS/PBCH Block]

In the following, a synchronization signal (SS)/PBCH block in 5G will be described.

The SS/PBCH block may refer to a physical layer channel block including a primary SS (PSS), a secondary SS (SSS), and a PBCH. Detailed descriptions are as follows.

PSS: A PSS is a signal that serves as a reference for downlink time/frequency synchronization, and provides some information of a cell ID.

SSS: An SSS serves as a reference for downlink time/frequency synchronization, and provides the remaining cell ID information that is not provided by a PSS. Additionally, the SSS may serve as a reference signal for demodulation of a PBCH.

PBCH: A PBCH provides essential system information necessary for transmission or reception of a data channel and a control channel of a terminal. The essential system information may include search space-related control information indicating radio resource mapping information of a control channel, scheduling control information on a separate data channel for transmitting system information, and the like.

SS/PBCH block: An SS/PBCH block includes a combination of a PSS, an SSS, and a PBCH. One or multiple SS/PBCH blocks may be transmitted within 5 ms, and each transmitted SS/PBCH block may be distinguished by an index.

The terminal may decode a PBCH and may detect a PSS and an SSS during initial access. The MIB may be acquired from the PBCH, and control area (control resource set (CORESET)) #0 (which may correspond to a control resource set having a control resource set index of 0) may be configured therefrom. The terminal may perform monitoring on control resource set #0 while assuming that demodulation reference signals (DMRSs) transmitted in control resource set #0 and a selected SS/PBCH block are quasi-co-located (QCLed). The terminal may receive system information as downlink control information transmitted in control resource set #0. The terminal may acquire, from the received system information, random-access channel (RACH)-related configuration information required for initial access. The terminal may transmit a physical RACH (PRACH) to the base station in consideration of a selected SS/PBCH index, and the base station having received the PRACH may acquire information on the SS/PBCH block index selected by the terminal. The base station may identify a block that the terminal has selected from among respective SS/PBCH blocks and may identify that control resource set #0 associated with the selected block is monitored.

[PDCCH: Relating to DCI]

Next, downlink control information (DCI) in the 5G system will be described in detail.

In the 5G system, scheduling information for uplink data (or physical uplink data channel (physical uplink shared channel (PUSCH)) or downlink data (or physical downlink data channel (physical downlink shared channel (PDSCH)) is transferred from the base station to the terminal via DCI. The terminal may monitor a fallback DCI format and a non-fallback DCI format for the PUSCH or PDSCH. The fallback DCI format may include a fixed field predefined between the base station and the terminal, and the non-fallback DCI format may include a configurable field.

The DCI may be transmitted on a physical downlink control channel (PDCCH) via channel coding and modulation. A cyclic redundancy check (CRC) is attached to a DCI message payload, and may be scrambled by a radio network temporary identifier (RNTI) corresponding to the identity of the terminal. Different RNTIs may be used according to the purpose of the DCI message, for example, terminal-specific (UE-specific) data transmission, a power control command, a random-access response, or the like. In other words, the RNTI is not transmitted explicitly, but is included in CRC calculation and transmitted. When the DCI message transmitted on the PDCCH is received, the terminal may check the CRC by using an assigned RNTI and may determine, if a CRC check result is correct, that the message is transmitted to the terminal.

For example, DCI for scheduling of a PDSCH for system information (SI) may be scrambled by an SI-RNTI. DCI for scheduling of a PDSCH for a random-access response (RAR) message may be scrambled by an RA-RNTI. DCI for scheduling of a PDSCH for a paging message may be scrambled by a P-RNTI. DCI for notification of a slot format indicator (SFI) may be scrambled by an SFI-RNTI. DCI for notification of a transmit power control (TPC) may be scrambled by a TPC-RNTI. DCI for scheduling of a UE-specific PDSCH or PUSCH may be scrambled by a cell RNTI (C-RNTI).

DCI format 0_0 may be used as fallback DCI for scheduling of a PUSCH, wherein a CRC is scrambled by a C-RNTI. DCI format 0_0 in which the CRC is scrambled by the C-RNTI may include, for example, the following information.

TABLE 4

Identifier for DCI formats - 1 bit
Frequency domain resource assignment - $\lceil \log_2(N_{RB}^{UL, BWP}(N_{RB}^{UL, BWP} + 1)/2) \rceil$ bits
Time domain resource assignment - X bits
Frequency hopping flag - 1 bit
Modulation and coding scheme - 5 bits
New data indicator - 1 bit
Redundancy version - 2 bits
HARQ process number - 4 bits
TPC command for scheduled PUSCH - 2 bits
UL/SUL indicator - 0 or 1 bit DCI format 0_1 may be used as non-fallback DCI for scheduling of a PUSCH, wherein a CRC is scrambled by a C-RNTI. DCI format 0_1 in which the CRC is scrambled by the C-RNTI may include, for example, the following information.

TABLE 5

Carrier indicator - 0 or 3 bits
UL/SUL indicator - 0 or 1 bit
Identifier for DCI formats - [1] bits
Bandwidth part indicator - 0, 1 or 2 bits
Frequency domain resource assignment
    For resource allocation type 0, $\lceil N_{RB}^{UL\_BWP}/P \rceil$ bits
    For resource allocation type 1, the $\lceil \log_2(N_{RB}^{UL\_BWP}(N_{RB}^{UL\_BWP} + 1)/2) \rceil$ bits
Time domain resource assignment - 0, 1, 2, 3, or 4 bits
VRB-to-PRB mapping - 0 or 1 bit, only for resource allocation type 1.
    0 bit if only resource allocation type 0 is configured;
    1 bit otherwise.
Modulation and coding scheme - 5 bits
New data indicator - 1 bit
Redundancy version - 2 bits
HARQ process number - 4 bits
$1^{st}$ downlink assignment index - 1 or 2 bits:
    1 bit for semi-static HARQ-ACK codebook;
    2 bits for dynamic HARQ-ACK codebook.
$2^{nd}$ downlink assignment index - 0 or 2 bits:
    2 bits for dynamic HARQ-ACK codebook with two HARQ-ACK sub-codebooks;
    0 bit otherwise.
TPC command for scheduled PUSCH - 2 bits TS38.213]

SRS resource indicator $\left\lceil \log_2\left(\sum_{k=1}^{L_{max}} \binom{N_{SRS}}{k}\right) \right\rceil$ or $\lceil \log_2(N_{SRS}) \rceil$ bits $\left\lceil \log_2\left(\sum_{k=1}^{L_{max}} \binom{N_{SRS}}{k}\right) \right\rceil$ bits for non−codebook based *PUSCH* transmission $\lceil \log_2(N_{SRS}) \rceil$ bits for codebook based PUSCH transmission
Precoding information and number of layers - up to 6 bits
Antenna ports - up to 5 bits
SRS request - 2 bits
CSI request - 0, 1, 2, 3, 4, 5, or 6 bits
CBG transmission information (CBGTI) - 0, 2, 4, 6, or 8 bits
    PTRS-DMRS association - 0 or 2 bits
beta_offset indicator - 0 or 2 bits
DMRS sequence initialization - 0 or 1 bit DCI format 1_0 may be used as fallback DCI for scheduling of a PDSCH, wherein a CRC is scrambled by a C-RNTI. DCI format 1_0 in which the CRC is scrambled by the C-RNTI may include, for example, the following information.

TABLE 6

Identifier for DCI formats - 1 bits
Frequency domain resource assignment -

$\lceil \log_2(N_{RB}^{DL,BWP}(N_{RB}^{DL,BWP} + 1)/2) \rceil$ bits

Time domain resource assignment - X bits
VRB-to-PRB mapping - 1 bit
Modulation and coding scheme - 5 bits
New data indicator - 1 bit
Redundancy version - 2 bits
HARQ process number - 4 bits
Downlink assignment index - 2 bits
TPC command for scheduled PUCCH - 2 bits
PUCCH resource indicator - 3 bits
PDSCH-to-HARQ_feedback timing indicator - 3 bits DCI format 1_1 may be used as non-fallback DCI for scheduling of a PDSCH, wherein a CRC is scrambled by a C-RNTI. DCI format 1_1 in which the CRC is scrambled by the C-RNTI may include, for example, the following information.

TABLE 7

Carrier indicator - 0 or 3 bits
Identifier for DCI formats - [1] bits
Bandwidth part indicator - 0, 1 or 2 bits
Frequency domain resource assignment For resource allocation type 0, $\lceil N_{RB}^{DL,BWP}/P \rceil$ bits For resource allocation type 1,the $\lceil \log_2(N_{RB}^{UL,BWP}(N_{RB}^{UL,BWP}+1)/2) \rceil$ bits Time domain resource assignment - 0, 1, 2, 3, or 4 bits
VRB-to-PRB mapping - 0 or 1 bit, only for resource allocation type 1.
0 bit if only resource allocation type 0 is configured;
1 bit otherwise.
PRB bundling size indicator - 0 or 1 bit
Rate matching indicator - 0, 1, or 2 bits
ZP CSI-RS trigger - 0, 1, or 2 bits
For transport block 1:
Modulation and coding scheme - 5 bits
New data indicator - 1 bit
Redundancy version - 2 bits
For transport block 2
Modulation and coding scheme - 5 bits
New data indicator - 1 bit

TABLE 7-continued

Redundancy version - 2 bits
HARQ process number - 4 bits
Downlink assignment index - 0 or 2 or 4 bits
TPC command for scheduled PUCCH - 2 bits
PUCCH resource indicator - 3 bits
PDSCH-to-HARQ_feedback timing indicator -3 bits
Antenna port(s) - 4, 5 or 6 bits
Transmission configuration indication - 0 or 3 bits
SRS request - 2 bits
CBG transmission information (CBGTI) - 0, 2, 4, 6, or 8 bits
CBG flushing out information (CBGFI) - 0 or 1 bit
DMRS sequence initialization - 1 bit.

[PDCCH: CORESET, REG, CCE, and Search Space]

Hereinafter, a downlink control channel in the 5G communication system will be described in more detail with reference to the drawings.

Figure 4:
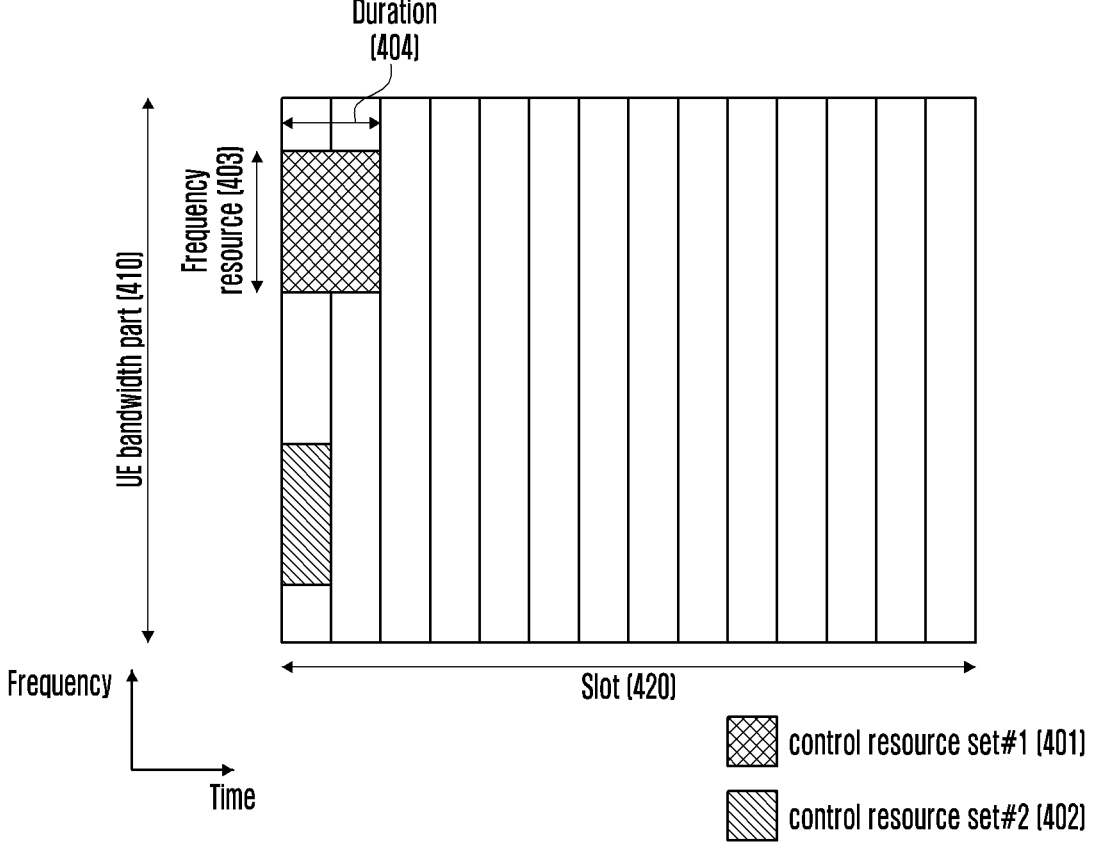
FIG. 4 is a diagram illustrating an example of a control resource set configuration of a downlink control channel in the wireless communication system according to an embodiment of the disclosure.

FIG. 4 is a diagram illustrating an example of a control resource set (control resource set (CORESET)) in which a downlink control channel is transmitted in the 5G wireless communication system. FIG. 4 illustrates an example in which a terminal bandwidth part 410 (UE bandwidth part) is configured on the frequency axis, and two control resource sets (control resource set #1 401 and control resource set #2

402) are configured within one slot 420 on the time axis. The control resource sets 401 and 402 may be configured in a specific frequency resource 403 within the entire terminal bandwidth part 410 on the frequency axis. One or multiple OFDM symbols may be configured on the time axis and may be defined as a control area duration (control resource set duration) 404. Referring to the example illustrated in FIG. 4, control resource set #1 401 is configured to have a control resource set duration of 2 symbols, and control resource set #2 402 is configured to have a control resource set duration of 1 symbol.

The aforementioned control resource set in 5G may be configured for the terminal by the base station via higher-layer signaling (e.g., system information, a master information block (MIB), and radio resource control (RRC) signaling). Configuring a control resource set for the terminal may refer to providing information, such as an identifier (identity) of the control resource set, a frequency position of the control resource set, and a symbol length of the control resource set. For example, the following information may be included.

TABLE 8

| ControlResourceSet ::= | SEQUENCE { |
|---|---|
| --Corresponds to L1 parameter 'CORESET-ID' | |
| controlResourceSetId | ControlResourceSetId, |
| frequencyDomainResources | BIT STRING (SIZE (45)), |
| duration | INTEGER (1..maxCoReSetDuration), |
| cce-REG-MappingType | CHOICE { |
| interleaved | SEQUENCE { |
| reg-BundleSize | ENUMERATED {n2, n3, n6}, |
| precoderGranularity | ENUMERATED {sameAsREG-bundle, |
| allContiguousRBs}, | |
| interleaverSize | ENUMERATED {n2, n3, n6}, |
| shiftIndex | |
| INTEGER(0..maxNrofPhysicalResourceBlocks-1) | OPTIONAL -- Need S |
| }, | |
| nonInterleaved | NULL |
| }, | |
| tci-StatesPDCCH SEQUENCE(SIZE (1..maxNrofTCI-StatesPDCCH)) OF TCI- | |
| StateId OPTIONAL, | |
| tci-PresentInDCI | ENUMERATED {enabled} |
| } | |

In Table 8, tci-StatesPDCCH (simply, referred to as a transmission configuration indication (TCI) state) configuration information may include information on one or multiple synchronization signal (SS)/physical broadcast channel (PBCH) block indexes or channel state information reference signal (CSI-RS) indexes having the quasi-co-location (QCL) relationship with a DMRS transmitted in the corresponding control resource set.

Figure 5A:
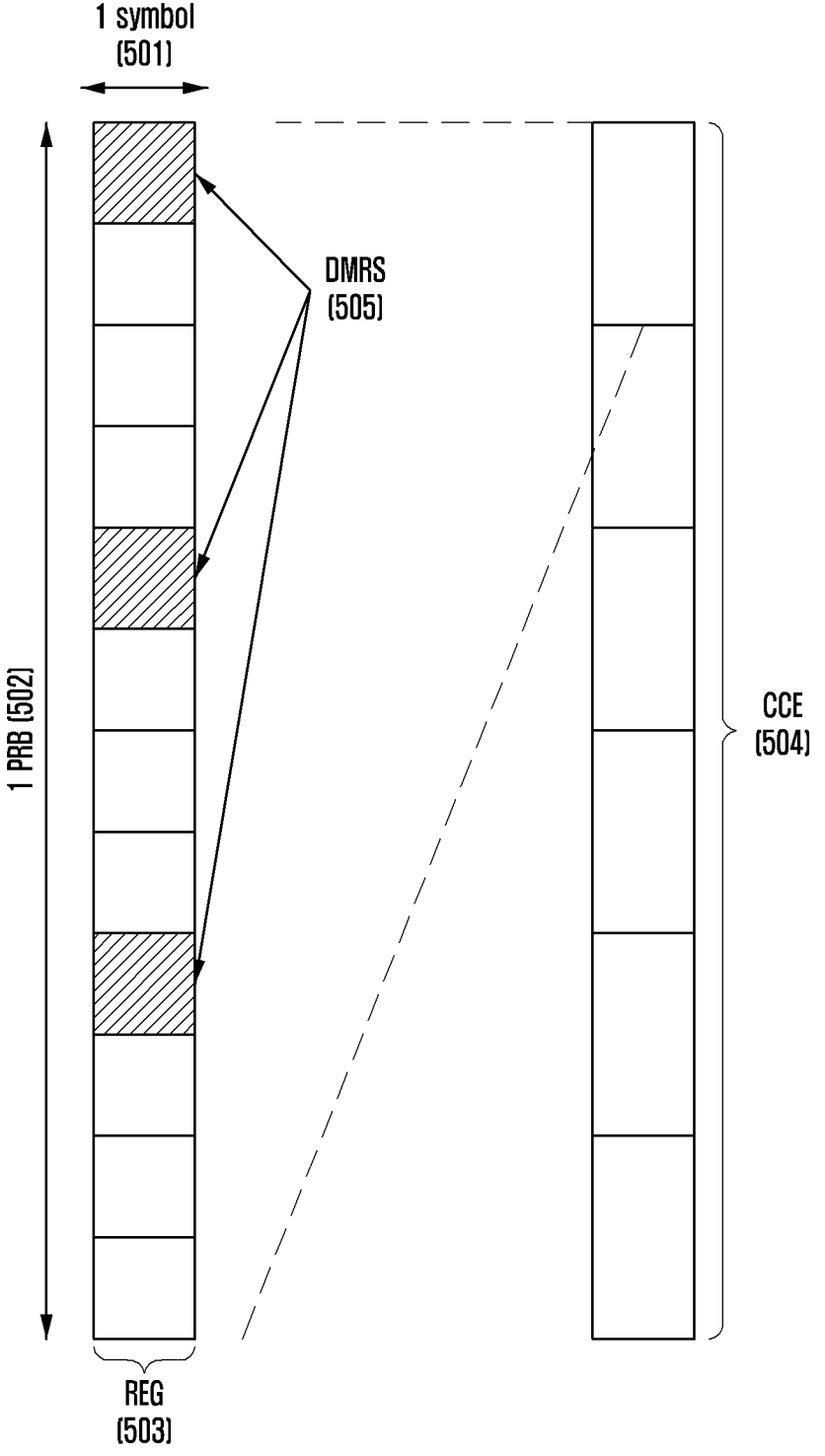
FIG. 5A is a diagram illustrating a structure of a downlink control channel in the wireless communication system according to an embodiment of the disclosure.

FIG. 5A is a diagram showing an example of a basic unit of time and frequency resources constituting a downlink control channel which may be used in 5G.

According to FIG. 5A, a basic unit of time and frequency resources constituting a control channel is referred to as a resource element group (REG) 503, and an REG 503 may be defined to have 1 OFDM symbol 501 on the time axis and 1 physical resource block (PRB) 502, that is, 12 subcarriers, on the frequency axis. A base station may configure a downlink control channel allocation unit by concatenation with the REG 503.

As illustrated in FIG. 5A, when a basic unit for allocation of a downlink control channel in 5G is a control channel element (CCE) 504, 1 CCE 504 may include multiple REGs 503. When the REG 503 illustrated in FIG. 5A is described as an example, the REG 503 may include 12 REs, and if 1 CCE 504 includes 6 REGs 503, 1 CCE 504 may include 72 REs. When a downlink control resource set is configured, the corresponding area may include multiple CCEs 504, and a specific downlink control channel may be mapped to one or multiple CCEs 504 so as to be transmitted according to an aggregation level (AL) within the control resource set. The CCEs 504 within the control resource set are classified by numbers, and the numbers of the CCEs 504 may be assigned according to a logical mapping scheme.

The basic unit of the downlink control channel illustrated in FIG. 5A, that is, the REG 503, may include both REs, to which DCI is mapped, and an area to which a DMRS 505, which is a reference signal for decoding the REs, is mapped. As shown in FIG. 5A, 3 DMRSs 505 may be transmitted in 1 REG 503. The number of CCEs required to transmit a PDCCH may be 1, 2, 4, 8, or 16 depending on an aggregation level (AL), and different numbers of CCEs may be used to implement link adaptation of the downlink control channel. For example, if AL=L, a single downlink control channel may be transmitted via L CCEs. The terminal needs to detect a signal without knowing information on the downlink control channel, wherein a search space representing a set of CCEs is defined for blind decoding. The search space is a set of downlink control channel candidates including CCEs, for which the terminal needs to attempt decoding on a given aggregation level, and since there are various aggregation levels that make one bundle with 1, 2, 4, 8, or 16 CCEs, the terminal may have multiple search spaces. The search space set may be defined to be a set of search spaces at all configured aggregation levels.

The search space may be classified into a common search space and a terminal-specific (UE-specific) search space. A certain group of terminals or all terminals may examine a common search space of a PDCCH in order to receive cell-common control information, such as a paging message or dynamic scheduling for system information. For example, PDSCH scheduling assignment information for transmission of an SIB including cell operator information, etc. may be received by monitoring the common search space of the PDCCH. Since a certain group of terminals or all terminals need to receive the PDCCH, the common search space may be defined as a set of predetermined CCEs. Scheduling allocation information for UE-specific PDSCH or PUSCH may be received by examining the UE-specific search space of the PDCCH. The UE-specific search space may be defined UE-specifically, based on an identity of the terminal and functions of various system parameters.

In 5G, a parameter for the search space of the PDCCH may be configured for the terminal by the base station via higher-layer signaling (e.g., SIB, MIB, and RRC signaling). For example, the base station may configure, for the terminal, the number of PDCCH candidates at each aggregation level L, a monitoring periodicity for a search space, a monitoring occasion in units of symbols in the slot for the search space, a search space type (common search space or UE-specific search space), a combination of an RNTI and a DCI format, which is to be monitored in the search space, a control resource set index for monitoring of the search space, etc. For example, the following information may be included.

TABLE 9

```
SearchSpace ::=                          SEQUENCE {
Identity of the search space. SearchSpaceId=0 identifies the Search Space
configured via PBCH (MIB) or ServingCellConfigCommon
searchSpaceId                            SearchSpaceId,
controlResourceSetId                         ControlResourceSetId
monitoringSlotPeriodicityAndOffset             CHOICE {
sl1                             NULL,
sl2                             INTEGER (0..1),
sl4                             INTEGER (0..3),
sl5                             INTEGER (0..4),
sl8                             INTEGER (0..7),
sl10                            INTEGER (0..9),
sl16                            INTEGER (0..15),
sl20                            INTEGER (0..19),
}
duration                        INTEGER (2..2559)
monitoringSymbolsWithinSlot              BIT STRING (SIZE (14))
nrofCandidates                           SEQUENCE {
aggregationLevel1                            ENUMERATED {n0, n1, n2, n3, n4,
n5, n6, n8},
aggregationLevel2                            ENUMERATED {n0, n1, n2, n3, n4,
n5, n6, n8},
aggregationLevel4                            ENUMERATED {n0, n1, n2, n3, n4,
n5, n6, n8},
aggregationLevel8                            ENUMERATED {n0, n1, n2, n3, n4,
n5, n6, n8},
aggregationLevel16                           ENUMERATED {n0, n1, n2, n3, n4,
n5, n6, n8}
}
searchSpaceType                              CHOICE {
Configures this search space as a common search space (CSS) and DCI formats to
monitor.
common                                       SEQUENCE {
}
ue-Specific                                  SEQUENCE {
Indicates whether the UE monitors in this USS for DCI formats 0_0 and 1_0 or
for formats 0_1 and 1_1
formats                                      ENUMERATED {formats0-0-And-1-0,
formats0-1-And-1-1},
...
}
```

According to configuration information, the base station may configure one or multiple search space sets for the terminal. According to some embodiments, the base station may configure search space set 1 and search space set 2 for the terminal, may configure DCI format A, which is scrambled by an X-RNTI in search space set 1, to be monitored in the common search space, and may configure DCI format B, which is scrambled by a Y-RNTI in search space set 2, to be monitored in the UE-specific search space.

According to the configuration information, one or multiple search space sets may exist in the common search space or the UE-specific search space. For example, search space set #1 and search space set #2 may be configured to be a common search space, and search space set #3 and search space set #4 may be configured to be a UE-specific search space.

In the common search space, the following combinations of DCI formats and RNTIs may be monitored. Of course, the disclosure is not limited to the following examples.

DCI format 0_0/1_0 with CRC scrambled by C-RNTI, CS-RNTI, SP-CSI-RNTI, RA-RNTI, TC-RNTI, P-RNTI, SI-RNTI DCI format 2_0 with CRC scrambled by SFI-RNTI DCI format 2_1 with CRC scrambled by INT-RNTI DCI format 2_2 with CRC scrambled by TPC-PUSCH-RNTI, TPC-PUCCH-RNTI DCI format 2_3 with CRC scrambled by TPC-SRS-RNTI In the UE-specific search space, the following combinations of DCI formats and RNTIs may be monitored. Of course, the disclosure is not limited to the following examples.

DCI format 0_0/1_0 with CRC scrambled by C-RNTI, CS-RNTI, TC-RNTI

DCI format 1_0/1_1 with CRC scrambled by C-RNTI, CS-RNTI, TC-RNTI

The specified RNTIs may follow definitions and uses below.

Cell RNTI (C-RNTI): Used for UE-specific PDSCH scheduling

Temporary cell RNTI (TC-RNTI): Used for UE-specific PDSCH scheduling

Configured scheduling RNTI (CS-RNTI): Used for semi-statically configured UE-specific PDSCH scheduling Random-access RNTI (RA-RNTI): Used for scheduling PDSCH at random-access stage Paging RNTI (P-RNTI): Used for scheduling PDSCH on which paging is transmitted System information RNTI (SI-RNTI): Used for scheduling PDSCH on which system information is transmitted Interruption RNTI (INT-RNTI): Used for indicating whether to puncture PDSCH Transmit power control for PUSCH RNTI (TPC-PUSCH-RNTI): Used for indicating power control command for PUSCH Transmit power control for PUCCH RNTI (TPC-PUCCH-RNTI): Used for indicating power control command for PUCCH Transmit power control for SRS RNTI (TPC-SRS-RNTI): Used for indicating power control command for SRS The DCI formats specified above may follow the definition below.

TABLE 10

| DCI format | Usage |
| --- | --- |
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |

TABLE 10-continued

| DCI format | Usage |
| --- | --- |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

In 5G, a search space of aggregation level L in search space set s and control resource set p may be expressed as Equation 1 below.

$$L \cdot \left\{ \left( \left( Y_{p,n_{s,f}^{\mu}} + \left\lfloor \frac{m_{s,n_{CI}} \cdot N_{CCE,p}}{L \cdot M_{s,max}^{(L)}} \right\rfloor + n_{CI} \right) \bmod \left\lfloor \frac{N_{CCE,p}}{L} \right\rfloor \right) \right\} + i \qquad \text{[Equation 1]}$$

L: aggregation level $n_{CI}$: carrier index $N_{CCE,p}$: a total number of CCEs existing in control resource set p $n_{s,f}^{\mu}$ slot index $M_{s,max}^{(L)}$ the number of PDCCH candidates for aggregation level L $m_{s,n_{CI}} = 0, \ldots, M_{s,max}^{(L)} - 1$:

PDCCH candidate index of aggregation level L i=0, . . . , L−1

$$Y_{p,n_{s,f}^{\mu}} = \left( A_p \cdot Y_{p,n_{s,f}^{\mu}-1} \right) \bmod D,$$

$Y_{p,-1} = n_{RNTI} \neq 0$, $A_p = 39827$ for p $\bmod_e 3 = 0$, $A_p = 39829$ for p $\bmod_e 3 = 1$, $A_p = 39839$ for p $\bmod_e 3 = 2$, and D=65537

$n_{RNTI}$: terminal identifier

A $Y_{p,n_{s,f}^{\mu}}$ value may correspond to 0 for the common search space.

For the UE-specific search space, the $Y_{p,n_{s,f}^{\mu}}$ value may correspond to a value that varies depending on a time index and the identity (a C-RNTI or an ID configured for the terminal by the base station) of the terminal.

In 5G, multiple search space sets may be configured by different parameters (e.g., parameters in Table 10), and therefore a set of search spaces monitored by the terminal at each time point may vary. For example, if search space set #1 is configured with an X-slot period, search space set #2 is configured with a Y-slot period, and X and Y are different from each other, the terminal may monitor both search space set #1 and search space set #2 in a specific slot, and may monitor one of search space set #1 and search space set #2 in a specific slot.

[PDCCH: Span]

The terminal may perform UE capability reporting for each subcarrier spacing in the case of having multiple PDCCH monitoring occasions within a slot, and in this case, the concept of span may be used. Span refers to continuous symbols in which the terminal may monitor a PDCCH in a slot, and each PDCCH monitoring occasion is within one span. Span may be expressed as (X,Y), where X refers to a minimum number of symbols that should be separated between first symbols of two consecutive spans, and Y refers to the number of consecutive symbols in which a PDCCH may be monitored within one span. In this case, the terminal may monitor, within a span, a PDCCH in an interval from a first symbol to symbol Y of the span.

Figure 5B:
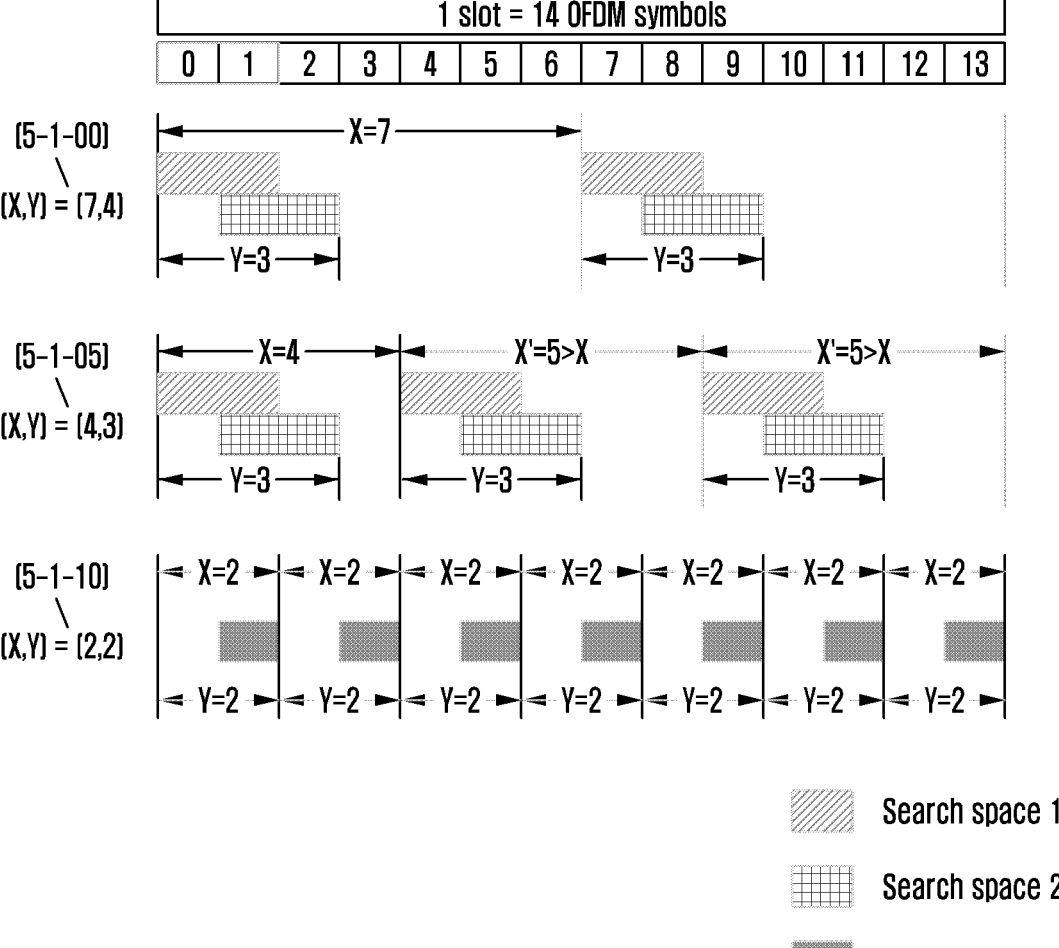
FIG. 5B is a diagram illustrating, via a span, a case in which a terminal may have multiple physical downlink control channel (PDCCH) monitoring occasions within a slot in the wireless communication system according to an embodiment of the disclosure.

FIG. 5B is a diagram illustrating, via a span, a case in which a terminal may have multiple PDCCH monitoring occasions within a slot in the wireless communication system.

For a span, cases where $(X,Y)=(7,4)$, $(4,3)$, and $(2,2)$ are possible, and the three cases are expressed in reference numerals of 5-1-00, 5-1-05, and 5-1-10 in FIG. 5B, respectively. As an example, reference numeral 5-1-00 expresses a case where two spans that may be expressed based on (7,4) exist in a slot. It is indicated that an interval between first symbols of the two spans is expressed as X=7, PDCCH monitoring occasions may exist within a total of Y=3 symbols from the first symbols of the respective spans, and each of search spaces 1 and 2 exists within Y=3 symbols. As another example, reference numeral 5-1-05 expresses a case where a total of three spans that may be expressed based on (4,3) exist in a slot, and an interval between second and third spans indicates separation by X'=5 symbols which is greater than X=4.

[PDCCH: UE Capability Reporting]

Slot positions at which a common search space and a UE-specific search space, which are described above, are located are indicated via parameter monitoringSymbolsWithinSlot in Table 11-1, and symbol positions within a slot are indicated by a bitmap via parameter monitoringSymbolsWithinSlot in Table 9. A symbol position in a slot, at which the terminal is able to monitor a search space may be reported to the base

| 3-1 | Basic DL control channel | 1) One configured CORESET per BWP per cell in addition to CORESET0 CORESET resource allocation of 6RB bit-map and duration of 1-3 OFDM symbols for FR1 For type 1 CSS without dedicated RRC configuration and for type 0, 0A, and 2 CSSs, CORESET resource allocation of 6RB bit-map and duration 1-3 OFDM symbols for FR2 For type 1 CSS with dedicated |
|---|---|---|

-continued

| RRC configuration and for type 3 CSS, UE specific SS, CORESET resource allocation of 6RB bit-map and duration 1-2 OFDM symbols for FR2 REG-bundle sizes of 2/3 RBs or 6 RBs Interleaved and non-interleaved CCE-to-REG mapping Precoder-granularity of REG-bundle size PDCCH DMRS scrambling determination TCI state(s) for a CORESET configuration 2) CSS and UE-SS configurations for unicast PDCCH transmission per BWP per cell PDCCH aggregation levels 1, 2, 4, 8, 16 UP to 3 search space sets in a slot for a scheduled SCell per BWP This search space limit is before applying all dropping rules. For type 1 CSS with dedicated RRC configuration, type 3 CSS, and UE-SS, the monitoring occasion is within the first 3 OFDM symbols of a slot For type 1 CSS without dedicated RRC configuration and for type 0, 0A, and 2 CSS, the monitoring occasion can be any OFDM symbol(s) of a slot, with the monitoring occasions for any of Type 1-CSS without dedicated RRC configuration, or Types 0, 0A, or 2 CSS configurations within a single span of three consecutive OFDM symbols within a slot 3) Monitoring DCI formats 0_0, 1_0, 0_1, 1_1 4) Number of PDCCH blind decodes per slot with a given SCS follows Case 1-1 table 5) Processing one unicast DCI scheduling DL and one unicast DCI scheduling UL per slot per scheduled CC for FDD 6) Processing one unicast DCI scheduling DL and 2 unicast DCI scheduling UL per slot per scheduled CC for TDD |
|---|

UE capability 2 (hereinafter, expressed as FG 3-2). This UE capability refers to, if one monitoring position (monitoring occasion (MO)) for a UE-specific search space or a common search space exists in a slot, capability to perform monitoring regardless of a starting symbol position of the MO, as shown in Table 11-2 below. This UE capability is optionally supportable by the terminal, and whether the capability is supported is explicitly reported to the base station.

TABLE 11-2

| Index | Feature group | Components | Field name in TS 38.331 [2] |
|---|---|---|---|
| 3-2 | PDCCH monitoring on any span of up to 3 consecutive OFDM symbols of a slot | For a given UE, all search space configurations are within the same span of 3 consecutive OFDM symbols in the slot | pdcchMonitoringSingleOccasion |

UE capability 3 (hereinafter, expressed as FG 3-5, 3-5a, and 3-5b). This UE capability indicates a pattern of an MO that the terminal is able to monitor if multiple monitoring positions (monitoring occasions (MOs) for a UE-specific search space or a common search space exists in a slot, as shown in Table 111-3 below. The described pattern of the MO includes interval X between start symbols of different MOs, and maximum symbol length Y for one MO. A combination of (X,Y) supported by the terminal may be, for example, one or more among {(2,2), (4,3), and (7,3)}. This UE capability is optionally supportable by the terminal, and whether the capability is supported and the described combination of (X, Y) are explicitly reported to the base station.

TABLE 11-3

| Index | Feature group | Components | Field name in TS 38.331 [2] |
|---|---|---|---|
| 3-5 | For type 1 CSS with dedicated RRC configuration, type 3 CSS, and UE-SS, monitoring occasion can be any OFDM symbol(s) of a slot for Case 2 | For type 1 CSS with dedicated RRC configuration, type 3 CSS, and UE-SS, monitoring occasion can be any OFDM symbol(s) of a slot for Case 2 | pdcch-Monitoring AnyOccasions {3-5. withoutDCI-Gap 3-5a. withDCI-Gap} |
| 3-5a | For type 1 CSS with dedicated RRC configuration, type 3 CSS, and UE-SS, monitoring occasion can be any OFDM symbol(s) of a slot for Case 2 with a DCI gap | For type 1 CSS with dedicated RRC configuration, type 3 CSS and UE-SS, monitoring occasion can be any OFDM symbol(s) of a slot for Case 2, with minimum time separation (including the cross-slot boundary case) between two DL unicast DCIs, between two UL unicast DCIs, or between a DL and an UL unicast DCI in different monitoring occasions where at least one of them is not the monitoring occasions of FG-3-1, for a same UE as 2OFDM symbols for 15 kHz 4OFDM symbols for 30 kHz 7OFDM symbols for 60 kHz with NCP 11OFDM symbols for 120 kHz Up to one unicast DL DCI and up to one unicast UL DCI in a monitoring occasion except for the monitoring occasions of FG 3-1. In addition for TDD the minimum separation between the first two UL unicast DCIs within the first 3 OFDM symbols of a slot can be zero OFDM symbols. | |
| 3-5b | All PDCCH monitoring occasion can be any OFDM symbol(s) of a slot for Case 2 with a span gap | PDCCH monitoring occasions of FG-3-1, plus additional PDCCH monitoring occasion(s) can be any OFDM symbol(s) of a slot for Case 2, and for any two PDCCH monitoring occasions belonging to different spans, where at least one of them is not the monitoring occasions of FG-3-1, in same or different search spaces, there is a minimum time separation of X OFDM symbols (including the cross-slot boundary case) between the start of two spans, where each span is of length up to Y consecutive OFDM symbols of a slot. Spans do not overlap. Every span is contained in a single slot. The same span pattern repeats in every slot. The separation between consecutive spans within and across slots may be unequal but the same (X, Y) limit may be satisfied by all spans. Every monitoring occasion is fully contained in one span. In order to determine a suitable span pattern, first a bitmap b(l), 0 <= l <= 13 is generated, where b(l) = 1 if symbol l of any slot is part of a monitoring occasion, b(l) = 0 otherwise. The first span in the span pattern begins at the smallest l for which b(l) = 1. The next span in the span pattern begins at the smallest l not included in the previous span(s) for which b(l) = 1. The span duration is max {maximum value of all CORESET durations, | |

TABLE 11-3-continued

| Index | Feature group | Components | Field name in TS 38.331 [2] |
|---|---|---|---|
| | | minimum value of Y in the UE reported candidate value} except possibly the last span in a slot which can be of shorter duration. A particular PDCCH monitoring configuration meets the UE capability limitation if the span arrangement satisfies the gap separation for at least one (X, Y) in the UE reported candidate value set in every slot, including cross slot boundary. For the set of monitoring occasions which are within the same span: Processing one unicast DCI scheduling DL and one unicast DCI scheduling UL per scheduled CC across this set of monitoring occasions for FDD Processing one unicast DCI scheduling DL and two unicast DCI scheduling UL per scheduled CC across this set of monitoring occasions for TDD Processing two unicast DCI scheduling DL and one unicast DCI scheduling UL per scheduled CC across this set of monitoring occasions for TDD The number of different start symbol indices of spans for all PDCCH monitoring occasions per slot, including PDCCH monitoring occasions of FG-3-1, is no more than floor(14/X) (X is minimum among values reported by UE). The number of different start symbol indices of PDCCH monitoring occasions per slot including PDCCH monitoring occasions of FG-3-1, is no more than 7. The number of different start symbol indices of PDCCH monitoring occasions per half-slot including PDCCH monitoring occasions of FG-3-1 is no more than 4 in SCell. | |

The terminal may report whether UE capability 2 and/or UE capability 3 described above are supported and related parameters to the base station. The base station may perform time axis resource allocation for a common search space and a UE-specific search space, based on the reported UE capability. During the resource allocation, the base station may prevent an MO from being located in a position where the terminal cannot perform monitoring.

[PDCCH: BD/CCE Limit]

When multiple search space sets are configured for the terminal, the following conditions may be considered for a method of determining a search space set required to be monitored by the terminal.

If the terminal is configured with a value of monitoringCapabilityConfig-r16, which is higher-layer signaling, via r15monitoringcapability, the terminal may define, for each slot, a maximum value for the number of PDCCH candidates that may be monitored and for the number of CCEs constituting the entire search space (here, the entire search space refers to all CCE sets corresponding to a union area of multiple search space sets), and if a value of monitoringCapabilityConfig-16 is configured via r16monitoringcapability, the terminal may define, for each span, a maximum value for the number of PDCCH candidates that may be monitored and for the number of CCEs constituting the entire search space (here, the entire search space may refer to all CCE sets corresponding to a union area of multiple search space sets).

[Condition 1: Limiting the Maximum Number of PDCCH Candidates]

As described above, according to a configuration value of higher-layer signaling, $M^{\mu}$ which is the maximum number of PDCCH candidates that may be monitored by the terminal may, for example, conform to Table 12-1 below when defined based on slots, and may conform to Table 12-2 below when defined based on spans, in a cell configured with a subcarrier spacing of $15 \cdot 2^{\mu}$ kHz.

TABLE 12-1

| $\mu$ | Maximum number of PDCCH candidates per slot and per serving cell ($M^{\mu}$) |
|---|---|
| 0 | 44 |
| 1 | 36 |

TABLE 12-1-continued

| μ | Maximum number of PDCCH candidates per slot and per serving cell ($M^\mu$) |
|---|---|
| 2 | 22 |
| 3 | 20 |

TABLE 12-2

Maximum number $M^\mu$ of monitored PDCCH candidates per span for combination (X, Y) and per serving cell

| μ | (2, 2) | (4, 3) | (7, 4) |
|---|---|---|---|
| 0 | 14 | 28 | 44 |
| 1 | 12 | 24 | 36 |

[Condition 2: Limiting the Maximum Number of CCEs]

As described above, according to a configuration value of higher-layer signaling, $C^\mu$ which is the maximum number of CCEs constituting the entire search space (here, the entire search space refers to all CCE sets corresponding to a union area of multiple search space sets) may, for example, conform to Table 12-3 below when defined based on slots, and may conform to Table 12-4 below when defined based on spans, in a cell configured with a subcarrier spacing of $15 \cdot 2^\mu$ kHz.

TABLE 12-3

| μ | Maximum number of non-overlapped CCEs per slot and per serving cell ($C^\mu$) |
|---|---|
| 0 | 56 |
| 1 | 56 |
| 2 | 48 |
| 3 | 32 |

TABLE 12-4

Maximum number $C^\mu$ of non-overlapped CCEs per span for combination (X, Y) and per serving cell

| μ | (2, 2) | (4, 3) | (7, 4) |
|---|---|---|---|
| 0 | 18 | 36 | 56 |
| 1 | 18 | 36 | 56 |

For the convenience of description, a situation in which both conditions 1 and 2 are satisfied at a specific time point is defined as "condition A". Therefore, not satisfying condition A may refer to not satisfying at least one of conditions 1 and 2.

[PDCCH: Overbooking]

According to configurations of the search space sets by the base station, a case in which condition A is not satisfied at a specific time point may occur. If condition A is not satisfied at a specific time point, the terminal may select and monitor only some of the search space sets configured to satisfy condition A at the corresponding time point, and the base station may transmit a PDCCH in the selected search space sets.

The method of selecting some search spaces from the entire configured search space set may conform to the following methods.

If condition A for a PDCCH is not satisfied at a specific time point (slot), the terminal (or base station) may select a search space set, in which a search space type is configured to be a common search space, preferentially over a search space set configured to be a UE-specific search space, from among search space sets existing at the corresponding time point.

If all the search space sets configured to be the common search space are selected (that is, if condition A is satisfied even after all the search spaces configured to be the common search space are selected), the terminal (or base station) may select the search space sets configured to be the UE-specific search space. In this case, if there are multiple search space sets configured to be the UE-specific search spaces, a search space set having a low search space set index may have a higher priority. In consideration of the priority, the UE-specific search space sets may be selected within a range in which condition A is satisfied.

[QCL, TCI State]

In the wireless communication system, one or more different antenna ports (alternatively, the different antenna ports can be replaced with one or more channels, signals, and combinations thereof, but in the description of the disclosure below, for convenience, reference is made collectively to different antenna ports) may be associated with each other by a quasi-co-location (QCL) configuration as shown in [Table 13] below. The TCI state is for announcement of a QCL relation between a PDCCH (or PDCCH DMRS) and another RS or channel wherein certain reference antenna port A (reference RS #A) and another target antenna port B (target RS #B) being QCLed each other indicates that the terminal is allowed to apply some or all of large-scale channel parameters estimated at antenna port A to channel measurement from antenna port B. For QCL, it may be necessary to associate different parameters depending on situations, such as 1) time tracking affected by an average delay and a delay spread. 2) frequency tracking affected by Doppler shift and Doppler spread, 3) radio resource management (RRM) affected by average gain, and 4) beam management (BM) affected by a spatial parameter. Accordingly, NR supports four types of QCL relations as shown in Table 13 below.

TABLE 13

| QCL type | Large-scale characteristics |
|---|---|
| A | Doppler shift, Doppler spread, average delay, delay spread |
| B | Doppler shift, Doppler spread |
| C | Doppler shift, average delay |
| D | Spatial Rx parameter |

The spatial RX parameter may refer to some or all of various parameters, such as angle of arrival (AoA), power angular spectrum (PAS) of AoA, angle of departure (AoD), PAS of AoD, transmission/reception channel correlation, transmission/reception beamforming, and spatial channel correlation.

The QCL relation is configurable for the terminal via RRC parameters TCI-State and QCL-Info, as shown in Table 14 below. Referring to Table 14, the base station may configure one or more TCI states for the terminal so as to inform about up to two QCL relations (qcl-Type1 and qcl-Type2) for an RS, i.e., a target RS, referring to IDs of the TCI states. In this case, each piece of QCL information (QCL-Info) included in each TCI state includes a serving cell index and a BWP index of a reference RS indicated by corresponding QCL information, a type and an ID of the reference RS, and a QCL type as shown in Table 13.

TABLE 14

```
TCI-State ::=                    SEQUENCE {
tci-StateId                      TCI-StateId,
qcl-Type1                            QCL-Info,
(QCL information of first reference RS of RS (target RS) referring to
corresponding TCI state ID)
qcl-Type2                            QCL-Info
OPTIONAL,   -- Need R
(QCL information of second reference RS of RS (target RS) referring to
corresponding TCI state ID)
...
}
QCL-Info ::=                     SEQUENCE {
cell                             ServCellIndex
OPTIONAL,   -- Need R
(Serving cell index of reference RS indicated by corresponding QCL information)
bwp-Id                               BWP-Id
OPTIONAL, -- Cond CSI-RS-Indicated
(BWP index of reference RS indicated by corresponding QCL information)
referenceSignal                      CHOICE {
csi-rs                           NZP-CSI-RS-ResourceId,
ssb                              SSB-Index
(either CSI-RS ID or SSB ID indicated by corresponding QCL information)
},
qcl-Type                         ENUMERATED {typeA, typeB, typeC,
typeD},
...
}
```

Figure 7:
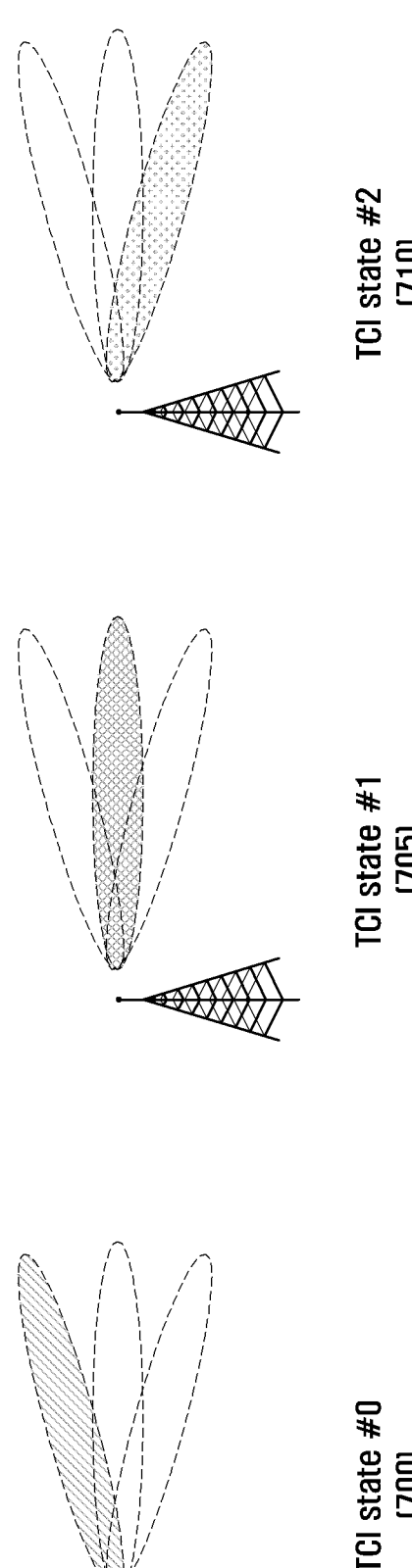
FIG. 7 shows diagrams illustrating examples of base station beam assignment according to a transmission configuration indicator (TCI) state configuration in the wireless communication system according to an embodiment of the disclosure.

FIG. 7 is a diagram illustrating an example of base station beam assignment according to a TCI state configuration. Referring to FIG. 7, a base station may transfer information on N different beams to a terminal via N different TCI states. For example, if N=3 as shown in FIG. 7, the base station may cause qcl-Type2 parameters included in three TCI states 700, 705, and 710 to be associated with CSI-RSs or SSBs corresponding to different beams and to be configured to be QCL type D, so as to announce that antenna ports referring to the different TCI states 700, 705, or 710 are associated with different spatial Rx parameters, i.e., different beams.

Table 15-1 to Table 15-5 below show valid TC state configurations according to a target antenna port type.

Table 15-1 shows a valid TC state configuration when the target antenna port is a CSI-RS for tracking (TRS). The TRS refers to an NZP CSI-RS, in which a repetition parameter is not configured and trs-Info is configured to be true, among CSI-RSs. Configuration No. 3 in Table 15-1 may be used for an aperiodic TRS.

[Table 15-1] Valid TCI state configuration when a target antenna port is CSI-RS for tracking (TRS)

TABLE 15-1

| Valid TCI state Configuration | DL RS 1 | qcl-Type1 | DL RS 2 (if configured) | qcl-Type2 (if configured) |
|---|---|---|---|---|
| Valid TCI state configuration when a target antenna port is CSI-RS for tracking (TRS) | | | | |
| 1 | SSB | QCL-TypeC | SSB | QCL-TypeD |
| 2 | SSB | QCL-TypeC | CSI-RS (BM) | QCL-TypeD |
| 3 | TRS (periodic) | QCL-TypeA | TRS (same as DL RS 1) | QCL-TypeD |

Table 15-2 shows valid TCI state configurations when a target antenna port is a CSI-RS for CSI. The CSI-RS for CSI refers to an NZP CSI-RS, in which a parameter (e.g., repetition parameter) indicating repetition is not configured and trs-Info is not configured to be true either, from among CSI-RSs.

TABLE 15-2

| Valid TCI state Configuration | DL RS 1 | qcl-Type1 | DL RS 2 (if configured) | qcl-Type2 (if configured) |
|---|---|---|---|---|
| Valid TCI state configuration when target antenna port is CSI-RS for CSI | | | | |
| 1 | TRS | QCL-TypeA | SSB | QCL-TypeD |
| 2 | TRS | QCL-TypeA | CSI-RS for BM | QCL-TypeD |
| 3 | TRS | QCL-TypeA | TRS (same as DL RS 1) | QCL-TypeD |
| 4 | TRS | QCL-TypeB | | |

Table 15-3 shows valid TCI state configurations when a target antnna port is a CSI-RS for beam management (BM, same meaning as a CSI-RS for L1 RSRP reporting). The CSI-RS for BM refers to an NZP CSI-RS, in which a repetition parameter is configured and has a value of On or Off, and trs-Info is not configured to be true, among CSI-RSs.

TABLE 15-3

| Valid TCI state Configuration | DL RS 1 | qcl-Type1 | DL RS 2 (if configured) | qcl-Type2 (if configured) |
|---|---|---|---|---|
| Valid TCI state configuration when a target antenna port is a CSI-RS for BM (for L1 RSRP reporting) | | | | |
| 1 | TRS | QCL-TypeA | TRS (same as DL RS 1) | QCL-TypeD |
| 2 | TRS | QCL-TypeA | CSI-RS (BM) | QCL-TypeD |
| 3 | SS/PBCH Block | QCL-TypeC | SS/PBCH Block | QCL-TypeD |

Table 15-4 shows a valid TCI state configuration when a target antenna port is a PDCCH DMRS.

TABLE 15-4

| Valid TCI state Configuration | DL RS 1 | qcl-Type1 | DL RS 2 (if configured) | qcl-Type2 (if configured) |
|---|---|---|---|---|
| 1 | TRS | QCL-TypeA | TRS (same as DL RS 1) | QCL-TypeD |
| 2 | TRS | QCL-TypeA | CSI-RS (BM) | QCL-TypeD |
| 3 | CSI-RS (CSI) | QCL-TypeA | CSI-RS (same as DL RS 1) | QCL-TypeD |

*Valid TCI state configuration when a target antenna port is a PDCCH DMRS*

Table 15-5 shows a valid TCI state configuration when a target antenna port is a PDSCH DMRS.

TABLE 15-5

| Valid TCI state Configuration | DL RS 1 | qcl-Type1 | DL RS 2 (if configured) | qcl-Type2 (if configured) |
|---|---|---|---|---|
| 1 | TRS | QCL-TypeA | TRS | QCL-TypeD |
| 2 | TRS | QCL-TypeA | CSI-RS (BM) | QCL-TypeD |
| 3 | CSI-RS (CSI) | QCL-TypeA | CSI-RS (CSI) | QCL-TypeD |

*Valid TCI state configuration when a target antenna port is a PDSCH DMRS*

In typical QCL configuration methods according to Table 15-1 to table 15-5 above, the target antenna port and the reference antenna port for each operation are configured and operated as in "SSB"→"TRS"→"CSI-RS for CSI, CSI-RS for BM, PDCCH DMRS, or PDSCH DMRS". Based on this, it is possible to assist a reception operation of the terminal by associating, with respective antenna ports, statistical characteristics measurable from the SSB and the TRS.

[PDCCH: Relating to TCI State]

Specifically, TCI state combinations applicable to a PDCCH DMRS antenna port are as shown in Table 15-6 below. In Table 15-6, a fourth row is a combination assumed by the terminal before RRC configuration and cannot be configured after the RRC configuration.

TABLE 15-6

| Valid TCI state Configuration | DL RS 1 | qcl-Type1 | DL RS 2 (if configured) | qcl-Type2 (if configured) |
|---|---|---|---|---|
| 1 | TRS | QCL-TypeA | TRS | QCL-TypeD |
| 2 | TRS | QCL-TypeA | CSI-RS (BM) | QCL-TypeD |
| 3 | CSI-RS (CSI) | QCL-TypeA | | |
| 4 | SS/PBCH Block | QCL-TypeA | SS/PBCH Block | QCL-TypeD |

Figure 8:
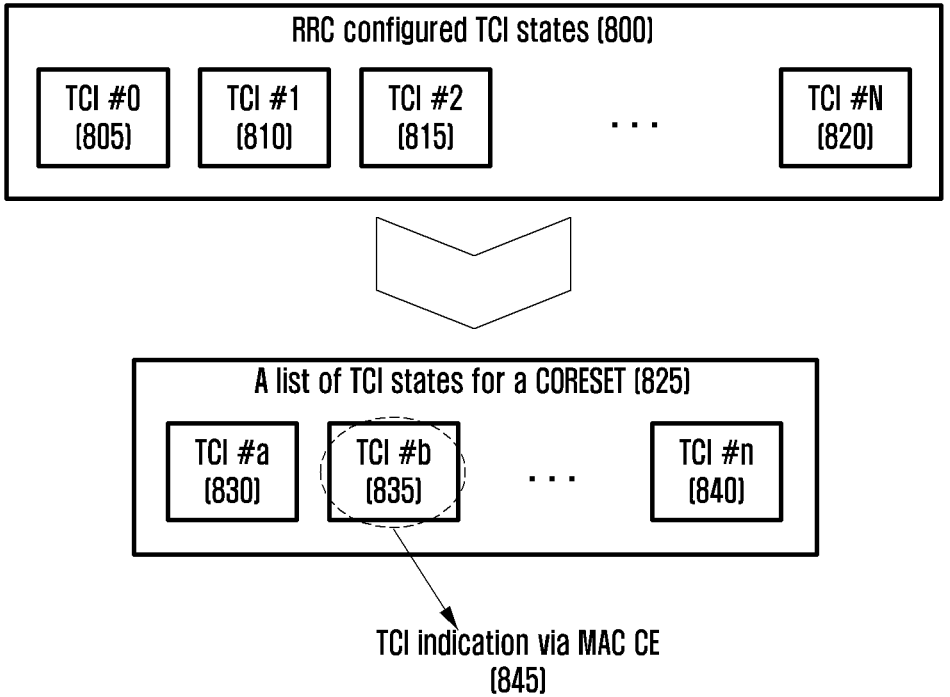
FIG. 8 is a diagram illustrating an example of a TCI state assignment method for a PDCCH in the wireless communication system according to an embodiment of the disclosure.

In NR, a hierarchical signaling method as illustrated in FIG. 8 is supported for dynamic PDCCH beam assignment. Referring to FIG. 8, a base station may configure N TCI states 805, 810, . . . , 820 for a terminal via RRC signaling 800, and some of these may be configured 825 as TC states for CORESET. The base station may then indicate 845 one of TCI states 830, 835, and 840 for CORESET to the terminal via MAC CE signaling. Thereafter, the terminal receives a PDCCH, based on beam information included in the TCI state indicated by the MAC CE signaling.

Figure 9:
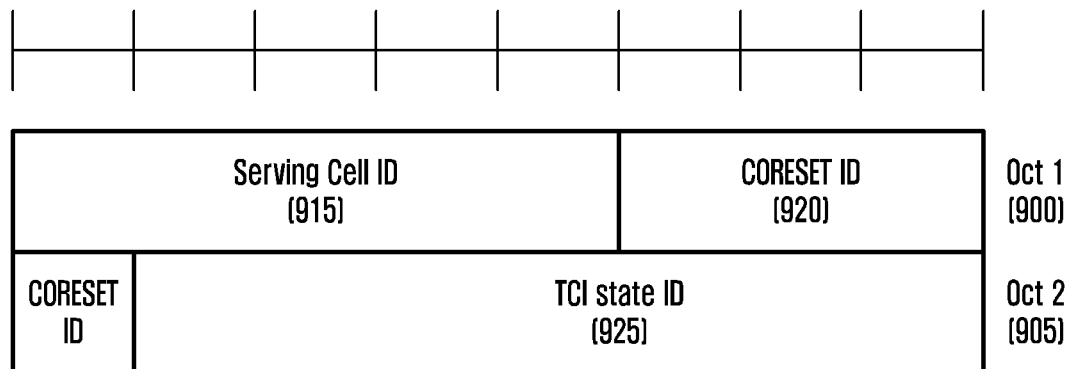
FIG. 9 is a diagram illustrating a TCI indication medium access control (MAC) control element (CE) signaling structure for a PDCCH demodulation reference signal (DMRS) in the wireless communication system according to an embodiment of the disclosure.

FIG. 9 is a diagram illustrating a TCI indication MAC CE signaling structure for the PDCCH DMRS. Referring to FIG. 9, TCI indication MAC CE signaling for the PDCCH DMRS is configured by 2 bytes (16 bits), and includes a 5-bit serving cell ID 915, a 4-bit CORESET ID 920, and a 7-bit TCI state ID 925.

FIG. 10 is a diagram illustrating an example of CORESET and search space beam configurations according to the description above. Referring to FIG. 10, a base station may indicate 1005 one in a TC state list included in a CORESET 1000 configuration via MAC CE signaling. Then, until another TCI state is indicated to a corresponding CORESET via another MAC CE signaling, the terminal considers that the same QCL information (beam #1) 1005 is applied to all of one or more search spaces 1010, 1015, and 1020 connected to the CORESET. In the PDCCH beam assignment method described above, it is difficult to indicate a beam change faster than a MAC CE signaling delay, and there is a problem that flexible PDCCH beam operation is difficult due to a disadvantage of the same beam being collectively applied to each CORESET regardless of search space characteristics. Hereinafter, embodiments of the disclosure provide a more flexible PDCCH beam configuration and operation method. Hereinafter, in description of embodiments of the disclosure, several distinct examples are provided for convenience of the description, but the examples are not mutually exclusive and are applicable by appropriately combining with each other according to situations.

The base station may configure one or multiple TCI states for the terminal with respect to a specific control resource set, and may activate one of the configured TCI states via a MAC CE activation command. For example, {TCI state #0, TCI state #1, TCI state #2} may be configured as TCI states for control resource set #1, and the base station may transmit, to the terminal via the MAC CE, a command for activation so that TCI state #0 is assumed to be the TCI state for control resource set #1. Based on the activation command for the TCI state, which is received via the MAC CE, the terminal may correctly receive a DMRS of the control resource set, based on QCL information within the activated TC state.

For a control resource set (control resource set #0) the index of which is configured to be 0, if the terminal has failed to receive the MAC CE activation command for the TCI state of control resource set #0, the terminal may assume that a DMRS transmitted in control resource set #0 has been QCLed with an SS/PBCH block identified in a non-contention-based random-access procedure that is not triggered by a PDCCH command or an initial access procedure.

For a control resource set (control resource set #X) the index of which is configured to be a value other than 0, if the terminal has failed to be configured with a TCI state for control resource set #X, or has been configured with one or more TCI states but has failed to receive a MAC CE activation command to activate one of the configured TCI states, the terminal may assume that a DMRS transmitted in control resource set #X has been QCLed with the SS/PBCH block identified during the initial access procedure.

[PDCCH: Relating to QCL Prioritization Rule]

In the following, QCL prioritization for a PDCCH will be described in detail.

When the terminal operates in carrier aggregation within a single cell or band, and multiple control resource sets existing in an activated bandwidth part within a single cell or multiple cells overlap in time while having the same QCL-TypeD characteristic or different QCL-TypeD characteristics in a specific PDCCH monitoring occasion, the terminal may select a specific control resource set according to QCL prioritization, and may monitor control resource sets having the same QCL-TypeD characteristic as that of the corresponding control resource set. That is, when multiple control resource sets overlap in time, only one QCL-TypeD characteristic may be received. In this case, criteria for QCL prioritization may be as follows.

Criterion 1. A control resource set associated with a common search space of a lowest index within a cell corresponding to a lowest index from among cells including the common search space Criterion 2. A control resource set associated with a UE-specific search space of a lowest index within a cell corresponding to a lowest index from among cells including the UE-specific search space As described above, if a corresponding criterion of the criterion is not satisfied, the following criteria are applied. For example, when control resource sets overlap in time in a specific PDCCH monitoring occasion, if all the control resource sets are associated with a UE-specific search space without being associated with a common search space, that is, if criterion 1 is not satisfied, the terminal may omit application of criterion 1 and apply criterion 2.

When a control resource set is selected according to the described criteria, the terminal may additionally consider two matters as below for QCL information configured in the control resource set. First, if control resource set 1 has CSI-RS 1 as a reference signal having a QCL-TypeD relationship, a reference signal having a QCL-TypeD relationship with CSI-RS 1 is SSB 1, and a reference signal having a QCL-TypeD relationship with another control resource set 2 is SSB 1, the terminal may consider that two control resource sets 1 and 2 have different QCL-TypeD characteristics. Second, if control resource set 1 has CSI-RS 1, which is configured in cell 1, as a reference signal having a QCL-TypeD relationship, a reference signal having a QCL-TypeD relationship with CSI-RS 1 is SSB 1, control resource set 2 has CSI-RS 2, which is configured in cell 2, as a reference signal having a QCL-TypeD relationship, and a reference signal having a QCL-TypeD relationship with CSI-RS 2 is the same SSB 1, the terminal may consider that the two control resource sets have the same QCL-TypeD characteristic.

FIG. 11 is a diagram for illustrating a method of selecting a receivable control resource set in consideration of a priority when a terminal receives a downlink control channel in the wireless communication system according to an embodiment of the disclosure. For example, a terminal may be configured with reception of multiple control resource sets overlapping in time in a specific PDCCH monitoring occasion 1110, and these multiple control resource sets may be associated with a common search space or a UE-specific search space for multiple cells. In the PDCCH monitoring occasion, control resource set #1 1115 associated with common search space #1 may exist in bandwidth part #1 1100 of cell #1, and control resource set #1 1120 associated with common search space #1 and control resource set #2 1125 associated with UE-specific search space #2 may exist in bandwidth part #1 1105 of cell #2. The control resource sets 1115 and 1120 may have a QCL-TypeD relationship with CSI-RS resource #1 configured in bandwidth part #1 of cell #1, and the control resource set 1125 may have a QCL-TypeD relationship with CSI-RS resource #1 configured in bandwidth part #1 1105 of cell #2. Therefore, when criterion 1 is applied to the PDCCH monitoring occasion 1110, the terminal may receive all other control resource sets having the same QCL-TypeD reference signal as that for control resource set #1 1115. Therefore, the terminal may receive the control resource sets 1115 and 1120 in the PDCCH monitoring occasion 1110. As another example, the terminal may be configured with reception of multiple control resource sets overlapping in time in a specific PDCCH monitoring occasion 1140, and these multiple control resource sets may be associated with a common search space or a UE-specific search space for multiple cells. In the PDCCH monitoring occasion, control resource set #1 1145 associated with UE-specific search space #1 and control resource set #2 1150 associated with UE-specific search space #2 may exist in bandwidth part #1 1130 of cell #1, and control resource set #1 1155 associated with UE-specific search space #1 and control resource set #2 1160 associated with UE-specific search space #3 may exist in bandwidth part #1 1135 of cell #2. The control resource sets 1145 and 1155 may have a QCL-TypeD relationship with CSI-RS resource #1 configured in bandwidth part #1 of cell #1, the control resource set 1155 may have a QCL-TypeD relationship with CSI-RS resource #1 configured in bandwidth part #1 of cell #2, and the control resource set 1160 may have a QCL-TypeD relationship with CSI-RS resource #2 configured in bandwidth part #1 of cell #2. However, when criterion 1 is applied to the PDCCH monitoring occasion 1140, since there is no common search space, criterion 2 which is the subsequent criterion may be applied. When criterion 2 is applied to the PDCCH monitoring occasion 1140, all other control resource sets having the same QCL-TypeD reference signal as that for control resource set #1 1145 may be received. Therefore, the terminal may receive the control resource sets 1145 and 1150 in the PDCCH monitoring occasion 1140.

[Relating to Rate Matching/Puncturing]

In the following, rate matching and puncturing will be described in detail.

When time and frequency resource A, in which certain symbol sequence A is to be transmitted, overlaps certain time and frequency resource B, rate matching or puncturing may be considered as transmission/reception of channel A in consideration of domain resource C in which resource A and resource B overlap. Detailed operations may conform to the following contents.

Rate Matching Operation

The base station may transmit, to the terminal, channel A by mapping the same only to resource areas remaining after excluding resource C corresponding to an area overlapping with resource B, from the entire resource A in which symbol sequence A is to be transmitted. For example, when symbol sequence A includes {symbol #1, symbol #2, symbol #3, symbol #4}, resource A is {resource #1, resource #2, resource #3, resource #4}, and resource B is {resource #3, resource #5}, the base station may sequentially map symbol sequence A to resources {resource #1, resource #2, resource #4} remaining after excluding, from resource A, {resource #3} which corresponds to resource C, so as to transmit the same. As a result, the base station may map a symbol sequence of {symbol #1, symbol #2, symbol #3} to {resource #1, resource #2, resource #4}, respectively, so as to transmit the same.

The terminal may determine resource A and resource B from scheduling information for symbol sequence A from the base station, and may determine, based thereon, resource C that is an area in which resource A and resource B overlap. The terminal may receive symbol sequence A, based on an assumption that symbol sequence A has been mapped to and transmitted in the areas remaining after excluding resource C from the entire resource A. For example, when symbol sequence A includes {symbol #1, symbol #2, symbol #3, symbol #4}, resource A is {resource #1, resource #2, resource #3, resource #4}, and resource B is {resource #3, resource #5}, the terminal may receive symbol sequence A, based on an assumption that symbol sequence A has been sequentially mapped to resources {resource #1, resource #2, resource #4} remaining after excluding, from resource A, {resource #3} which corresponds to resource C. As a result, the terminal may perform a series of reception operations later based on an assumption that a symbol sequence of {symbol #1, symbol #2, symbol #3} is mapped to and transmitted in {resource #1, resource #2, resource #4}, respectively.

Puncturing Operation

When there is resource C, which corresponds to an area overlapping with resource B, in the entire resource A in which symbol sequence A is to be transmitted to the terminal, the base station may map symbol sequence A to the entire resource A, but may perform transmission only in resource areas remaining after excluding resource C from resource A, without performing transmission in a resource area corresponding to resource C. For example, when symbol sequence A includes {symbol #1, symbol #2, symbol #3, symbol #4}, resource A is {resource #1, resource #2, resource #3, resource #4}, and resource B is {resource #3, resource #5}, the base station may map symbol sequence A {symbol #1, symbol #2, symbol #3, symbol #4} to resource A {resource #1, resource #2, resource #3, resource #4}, respectively, and may transmit only a symbol sequence of {symbol #1, symbol #2, symbol #4} corresponding to resources {resource #1, resource #2, resource #4} which remain after excluding, from resource A, {resource #3} corresponding to resource C, without transmitting {symbol #3} mapped to {resource #3} corresponding to resource C. As a result, the base station may map the symbol sequence of {symbol #1, symbol #2, symbol #4} to {resource #1, resource #2, resource #4}, respectively, so as to transmit the same.

The terminal may determine resource A and resource B from scheduling information for symbol sequence A from the base station, and may determine, based thereon, resource C that is an area in which resource A and resource B overlap. The terminal may receive symbol sequence A, based on an assumption that symbol sequence A has been mapped to the entire resource A but is transmitted only in areas remaining after excluding resource C from resource area A. For example, when symbol sequence A includes {symbol #1, symbol #2, symbol #3, symbol #4}, resource A is {resource #1, resource #2, resource #3, resource #4}, and resource B is {resource #3, resource #5}, the terminal may assume that symbol sequence A {symbol #1, symbol #2, symbol #3, symbol #4} is mapped to resource A {resource #1, resource #2, resource #3, resource #4}, respectively, but {symbol #3} mapped to {resource #3} corresponding to resource C is not transmitted, and may perform reception based on an assumption that a symbol sequence of {symbol #1, symbol #2, symbol #4}, which corresponds to resources {resource #1, resource #2, resource #4} remaining after excluding, from resource A, {resource #3} corresponding to resource C, is mapped and transmitted. As a result, the terminal may perform a series of reception operations later based on an assumption that a symbol sequence of {symbol #1, symbol #2, symbol #4} is mapped to and transmitted in {resource #1, resource #2, resource #4}, respectively.

Hereinafter, a method of configuring a rate matching resource for the purpose of rate matching in the 5G communication system will be described. Rate matching refers to a signal magnitude being adjusted by considering the amount of resources in which a signal is transmittable. For example, rate matching of a data channel may refer to a data size being adjusted according to the amount of resources, without transmission of the data channel by mapping the same to a specific time and frequency resource area.

Figure 12:
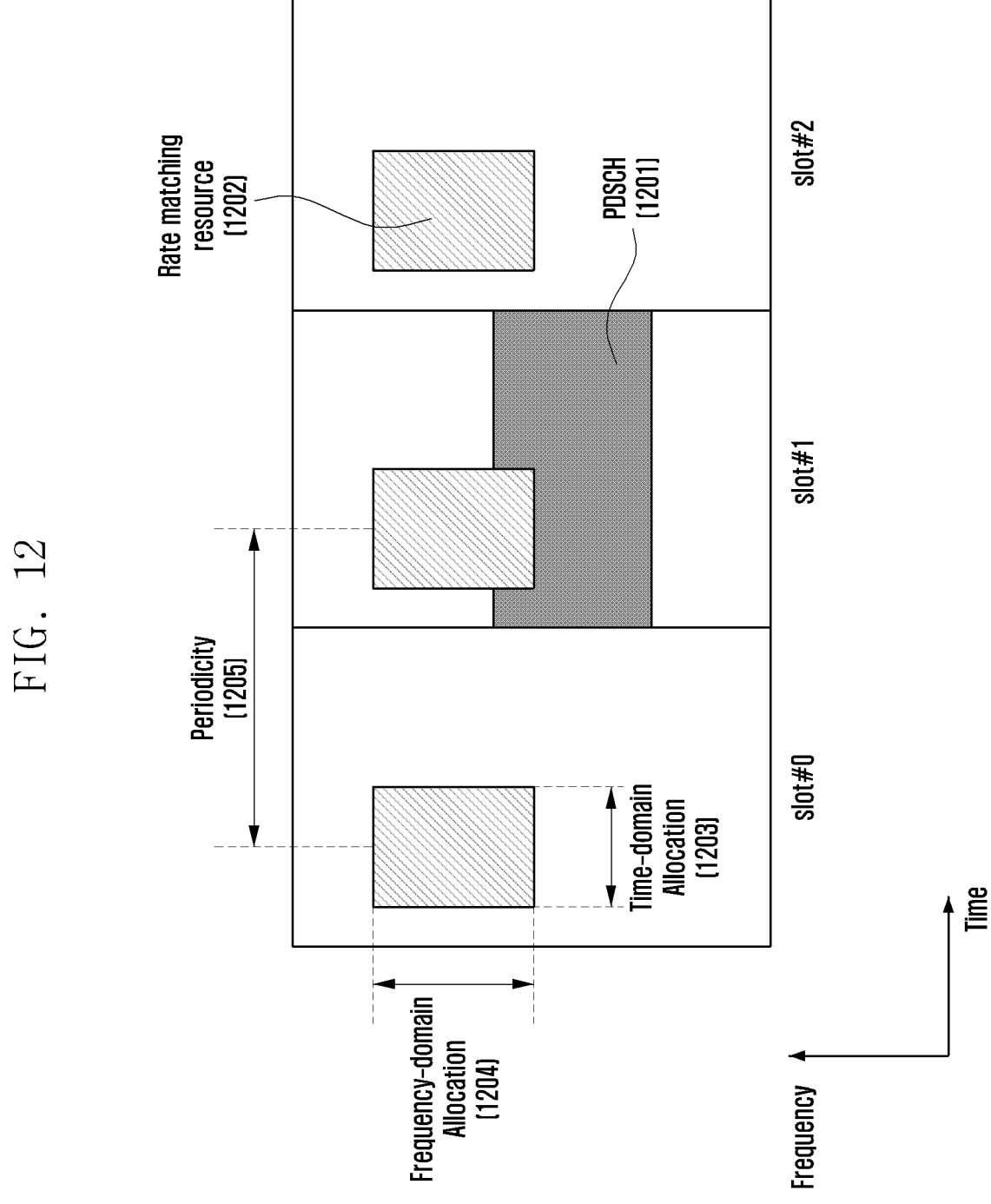
FIG. 12 is a diagram for illustrating a method of transmitting or receiving data by a base station and a terminal in consideration of a downlink data channel and a rate matching resource in the wireless communication system according to an embodiment of the disclosure.

FIG. 12 is a diagram for illustrating a method of transmitting or receiving data by a base station and a terminal in consideration of a downlink data channel and a rate matching resource.

FIG. 12 illustrates a downlink data channel (PDSCH) 1201 and a rate matching resource 1202. A base station may configure one or multiple rate matching resources 1202 for a terminal via higher-layer signaling (e.g., RRC signaling). Configuration information of the rate matching resource 1202 may include time axis resource allocation information 1203, frequency axis resource allocation information 1204, and periodicity information 1205. Hereinafter, a bitmap corresponding to the frequency axis resource allocation information 1204 is referred to as a "first bitmap", a bitmap corresponding to the time axis resource allocation information 1203 is referred to as a "second bitmap", and a bitmap corresponding to the periodicity information 1205 is referred to as a "third bitmap". When all or some of the time and frequency resources of the scheduled data channel 1201 overlap the configured rate matching resource 1102, the base station may rate-match and transmit the data channel 1201 in the rate matching resource 1202 part, and the terminal may perform reception and decoding based on an assumption that the data channel 1201 is rate-matched in the rate matching resource 1202 part.

The base station may dynamically notify, via DCI, the terminal of whether to rate-match the data channel in the configured rate matching resource part via an additional configuration (corresponding to a "rate matching indicator" in the aforementioned DCI format). Specifically, the base station may select some of the configured rate matching resources, group the same into a rate matching resource group, and indicate the terminal of whether to perform rate matching of a data channel for each rate matching resource group, via DCI by using a bitmap scheme. For example, when four rate matching resources of RMR #1, RMR #2, RMR #3, and RMR #4 are configured, the base station may configure rate matching groups of RMG #1={RMR #1. RMR #2} and RMG #2={RMR #3, RMR #4}, and may indicate, to the terminal via a bitmap, whether to perform rate matching in each of RMG #1 and RMG #2, by using 2 bits within a DCI field. For example, the base station may indicate "1" when rate matching is needed, and may indicate "0" when rate matching is not needed.

In 5G, granularity at an "RB symbol level" and granularity at an "RE level" are supported as the aforementioned method of configuring a rate matching resource for the terminal. More specifically, the following configuration method may be used.

RB Symbol Level

The terminal may be configured with up to four RateMatchPattern for each bandwidth part via higher-layer signaling, and one RateMatchPattern may include the following content.

As reserved resources within a bandwidth part, resources in which time and frequency resource areas of the corresponding reserved resources are configured may be included in a combination of an RB-level bitmap and a symbol-level bitmap on the frequency axis. The reserved resources may span one or two slots. A time domain pattern (periodicityAndPattern), in which the time and frequency domains including each RB-level and symbol-level bitmap pair are repeated, may be additionally configured.

Time and frequency domain resource areas configured as a control resource set within a bandwidth part and a resource area corresponding to a time domain pattern configured by a search space configuration in which the corresponding resource areas are repeated may be included.

RE Level

The terminal may be configured with the following contents via higher-layer signaling.

As configuration information (lte-CRS-ToMatchAround) for REs corresponding to an LTE cell-specific reference signal or common reference signal (CRS) pattern, the number (nrofCRS-Ports) of LTE CSR ports, values (v-shift) of LTE-CRS-vshift(s), information (carrier-FreqDL) on a center subcarrier position of an LTE carrier from a frequency point that is a reference (e.g., reference point A), information on a bandwidth size (carrierBandwidthDL) of an LTE carrier, subframe configuration information (mbsfn-SubframConfigList) corresponding to a multicast-broadcast single-frequency network (MBSFN), and the like may be included. The terminal may determine a CRS position within an NR slot corresponding to the LTE subframe, based on the aforementioned information.

Configuration information for a resource set corresponding to one or multiple zero power (ZP) CSI-RSs within a bandwidth part may be included.

[Relating to LTE CRS Rate Match]

Subsequently, rate matching for LTE CRS described above will be described in detail. For the coexistence of long-term evolution (LTE) and new RAT (NR) (LTE-NR coexistence). NR provides a function of configuring a cell-specific reference signal (CRS) pattern of LTE for an NR terminal. More specifically, the CRS pattern may be provided by RRC signaling including at least one parameter in ServingCellConfigCommon IE or ServingCellConfig IE (information element). Examples of the parameter may include lte-CRS-ToMatchAround, lte-CRS-PatternList1-r16, lte-CRS-PatternList2-r16, crs-RateMatch-PerCORESET-PoolIndex-r16, and the like.

Rel-15 NR provides a function in which one CRS pattern may be configured per serving cell via parameter lte-CRS-ToMatchAround. In Rel-16 NR, the function has been extended to enable configuration of multiple CRS patterns per serving cell. More specifically, a single-transmission and reception point (TRP) configuration terminal may be configured with one CRS pattern per one LTE carrier, and a multi-TRP configuration terminal may be configured with two CRS patterns per one LTE carrier. For example, up to three CRS patterns per serving cell may be configured for the single-TRP configuration terminal via parameter lte-CRS-PatternList1-r16. For another example, a CRS may be configured for each TRP in the multi-TRP configuration terminal. That is, a CRS pattern for TRP1 may be configured via parameter lte-CRS-PatternList1-r16, and a CRS pattern for TRP2 may be configured via parameter lte-CRS-PatternList2-r16. When two TRPs are configured as above, whether to apply both the CRS patterns of TRP1 and TRP2 to a specific physical downlink shared channel (PDSCH) or whether to apply only a CRS pattern for one TRP is determined via parameter crs-RateMatch-PcrCORESET-PoolIndex-r16, wherein only the CRS pattern of one TRP is applied if parameter crs-RateMatch-PerCORESETPoolIndex-r16 is configured to be enabled, and both the CRS patterns of the two TRPs are applied on other cases.

Table 16 shows ServingCellConfig IE including the CRS pattern, and Table 17 shows RateMatchPatternLTE-CRS EE including at least one parameter for the CRS pattern.

TABLE 16

```
ServingCellConfig ::=              SEQUENCE {
    tdd-UL-DL-ConfigurationDedicated   TDD-UL-DL-ConfigDedicated
    OPTIONAL,           -- Cond TDD
    initialDownlinkBWP                 BWP-DownlinkDedicated
    OPTIONAL,           -- Need M
    downlinkBWP-ToReleaseList          SEQUENCE (SIZE (1..maxNrofBWPs)) OF BWP-Id
    OPTIONAL,           -- Need N
    downlinkBWP-ToAddModList               SEQUENCE (SIZE (1..maxNrofBWPs)) OF BWP-Downlink
    OPTIONAL,           -- Need N
    firstActiveDownlinkBWP-Id          BWP-Id
    OPTIONAL,           -- CondSyncAndCellAdd
    bwp-InactivityTimer                ENUMERATED     {ms2,ms3,ms4,ms5,ms6,ms8,ms10,ms20,ms30,
                                                      ms40,ms50,ms60,ms80,ms100,ms200,ms300,ms500,
                                                      ms750,ms1280,ms1920,ms2560,spare10,spare9,spare8,
                                                      spare7,spare6,spare5,spare4,spare3,spare2,spare1 }
    OPTIONAL,           -- Need R
    defaultDownlinkBWP-Id              BWP-Id
    OPTIONAL,           -- Need S
    uplinkConfig                       UplinkConfig
    OPTIONAL,           -- Need M
    supplementaryUplink                UplinkConfig
    OPTIONAL,           -- Need M
    pdcch-ServingCellConfig            SetupRelease { PDCCH-ServingCellConfig }
    OPTIONAL,           -- Need M
    pdsch-ServingCellConfig            SetupRelease { PDSCH-ServingCellConfig }
    OPTIONAL,           -- Need M
    csi-MeasConfig                         SetupRelease { CSI-MeasConfig }
    OPTIONAL,           -- Need M
    sCellDeactivationTimer             ENUMERATED     { ms20,ms40,ms80,ms160,ms200,ms240,
                                                      ms320,ms400,ms480,ms520,ms640,ms720,
                                                      ms840,ms1280,spare2,spare1 }   OPTIONAL,
    Cond ServingCellWithoutPUCCH
    crossCarrierSchedulingConfig       CrossCarrierSchedulingConfig
    OPTIONAL,           -- Need M
    tag-Id                             TAG-Id,
```

TABLE 16-continued

```
dummy                                ENUMERATED {enabled}
OPTIONAL,              -- Need R
pathlossReferenceLinking             ENUMERATED {spCell, sCell}
OPTIONAL,              -- Cond SCellOnly
servingCellMO                        MeasObjectId
OPTIONAL,              -- Cond MeasObject
...,
[[
lte-CRS-ToMatchAround                SetupRelease { RateMatchPatternLTE-CRS }
OPTIONAL,              -- Need M
rateMatchPatternToAddModList         SEQUENCE (SIZE (1..maxNrofRateMatchPatterns)) OF RateMatchPattern
OPTIONAL,              -- Need N
rateMatchPatternToReleaseList        SEQUENCE (SIZE (1..maxNrofRateMatchPatterns)) OF RateMatchPatternId
OPTIONAL;              -- Need N
downlinkChannelBW-PerSCS-List        SEQUENCE (SIZE (1..maxSCSs)) OF SCS-SpecificCarrier
OPTIONAL               -- Need S
]],
[[
supplementaryUplinkRelease           ENUMERATED {true}
OPTIONAL,              -- Need N
tdd-UL-DL-ConfigurationDedicated-IAB-MT-r16      TDD-UL-DL-ConfigDedicated-IAB-MT-r16
OPTIONAL,              -- Cond TDD_IAB
dormantBWP-Config-r16                SetupRelease { DormantBWP-Config-r16 }
OPTIONAL,              -- Need M
ca-SlotOffset-r16                    CHOICE {
  refSCS15kHz                                INTEGER (-2..2),
  refSCS30KHz                                INTEGER (-5..5),
  refSCS60KHz                                INTEGER (-10..10),
  refSCS120KHz                               INTEGER (-20..20)
}
OPTIONAL,              --Cond AsyncCA
channelAccessConfig-r16              SetupRelease { ChannelAccessConfig-r16 }
OPTIONAL,              -- Need M
intraCellGuardBandsDL-List-r16       SEQUENCE (SIZE (1..maxSCSs)) OF IntraCellGuardBandsPerSCS-r16
OPTIONAL,              -- Need S
intraCellGuardBandsUL-List-r16       SEQUENCE (SIZE (1..maxSCSs)) OF IntraCellGuardBandsPerSCS-r16
OPTIONAL,              -- Need S
csi-RS-ValidationWith-DCI-r16        ENUMERATED {enabled}
OPTIONAL,              -- Need R
lte-CRS-PatternList1-r16             SetupRelease { LTE-CRS-PatternList-r16 }
OPTIONAL,              -- Need M
lte-CRS-PatternList2-r16             SetupRelease { LTE-CRS-PatternList-r16 }
OPTIONAL,              -- Need M
crs-RateMatch-PerCORESETPoolIndex-r16 ENUMERATED {enabled}
OPTIONAL,              -- Need R
enableTwoDefaultTCI-States-r16       ENUMERATED {enabled}
OPTIONAL,              -- Need R
enableDefaultTCI-StatePerCoresetPoolIndex-r16 ENUMERATED {enabled}
OPTIONAL,              -- Need R
enableBeamSwitchTiming-r16           ENUMERATED {true}
OPTIONAL,              -- Need R
cbg-TxDiffTBsProcessingType1-r16     ENUMERATED {enabled}
OPTIONAL,              -- Need R
cbg-TxDiffTBsProcessingType2-r16     ENUMERATED {enabled}
OPTIONAL               -- Need R
]]
}
```

TABLE 17

```
- RateMatchPatternLTE-CRS
The IE RateMatchPatternLTE-CRS is used to configure a pattern to rate match around LTE CRS. See TS 38.214 [19], clause
5.1.4.2.
                              RateMatchPatternLTE-CRS information element
-- ASN1START
-- TAG-RATEMATCHPATTERNLTE-CRS-START
RateMatchPatternLTE-CRS ::=       SEQUENCE {
  carrierFreqDL                     INTEGER (0..16383),
  carrierBandwidthDL                ENUMERATED {n6,n15,n25,n50,n75,n100,spare2,spare1},
  mbsfn-SubframeConfigLst           EUTRA-MBSFN-SubframeConfigList
OPTIONAL,    -- Need M
  nrofCRS-Ports                     ENUMERATED {n1,n2,n4},
  v-Shift                           ENUMERATED {n0,n1,n2,n3,n4,n5}
}
```

TABLE 17-continued

| | |
|---|---|
| LTE-CRS-PatternList-r16 ::= | SEQUENCE (SIZE (1..maxLTE-CRS-Patterns-r16)) OF RateMatchPatternLTE-CRS |
| -- TAG-RATEMATCHPATTERNLTE-CRS-STOP | |
| -- ASN1STOP | |

RateMatchPatternLTE-CRS field descriptions carrierBandwidthDL
BW ofthe LTE carrier in number of PRBs (see TS 38.214 [19], clause 5.1.4.2).
carrierFreqDL
Center of the LTE carrier (see TS 38.214 [19], clause 5.1.4.2).
mbsfn-SubframeConfigList
LTE MBSFN subframe configuration (see TS 38.214 [19], clause 5.1.4.2).
nrofCRS-Posts
Number of LTE CRS antenna port to rate-match around (see TS 38.214 [19], clause 5.1.4.2).
v-Shift
Shifting value v shift in LTE to rate match around LTE CRS (see TS 38.214 [19], clause 5.1.4.2).

[PDSCH: Relating to Frequency Resource Allocation]

Figure 13:
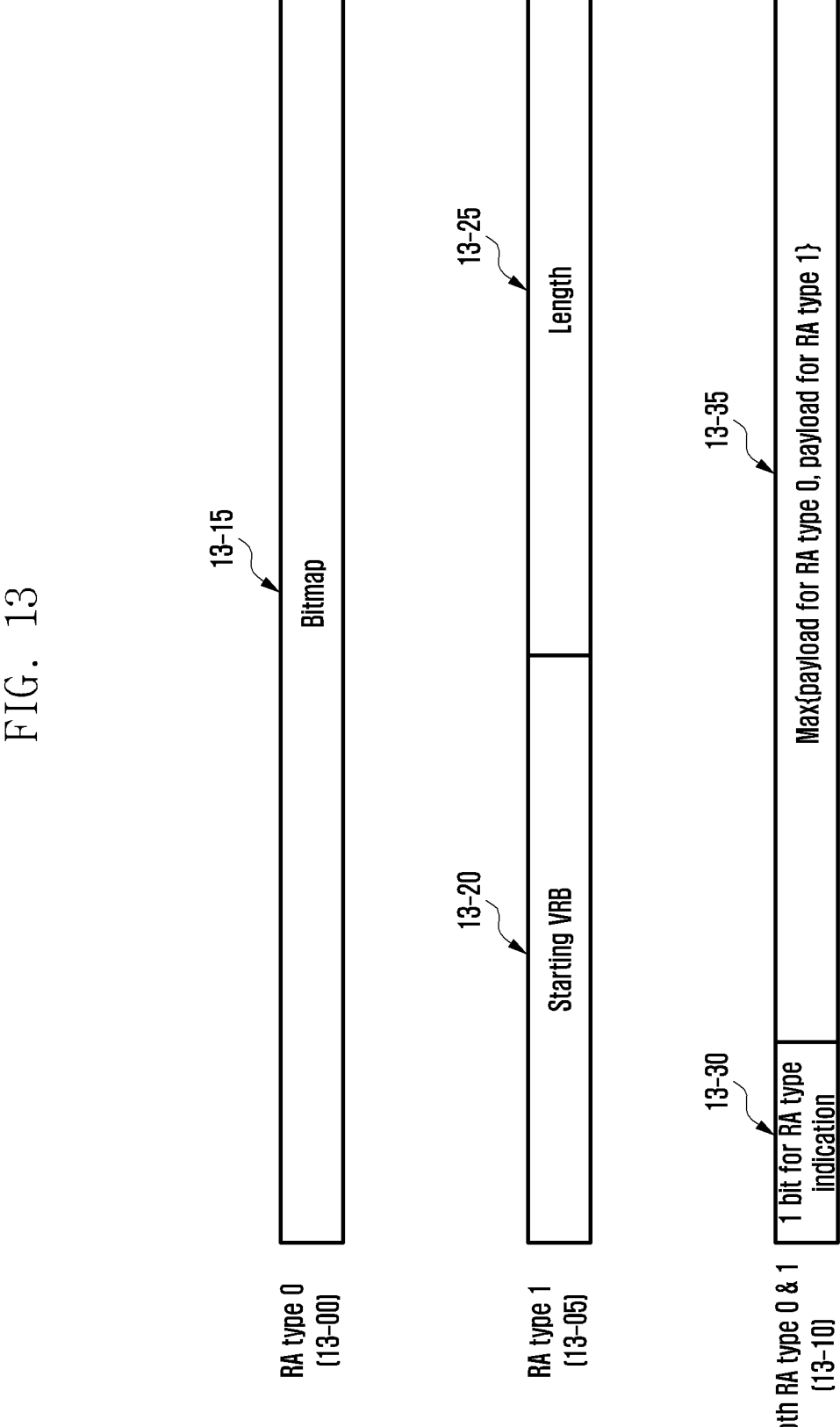
FIG. 13 shows diagrams illustrating examples of frequency axis resource allocation of a physical downlink shared channel (PDSCH) in the wireless communication system according to an embodiment of the disclosure.

FIG. 13 is a diagram illustrating an example of frequency axis resource allocation of a physical downlink shared channel (PDSCH) in the wireless communication system according to an embodiment of the disclosure.

FIG. 13 is a diagram illustrating three frequency axis resource allocation methods of type 0 13-00, type 1 13-05, and a dynamic switch 13-10 which are configurable via a higher layer in the NR wireless communication system.

Referring to FIG. 13, if a terminal is configured 13-00, via higher-layer signaling, to use only resource type 0, some downlink control information (DCI) for allocation of a PDSCH to the terminal has a bitmap including NRBG bits. Conditions for this will be described later. In this case, NRBG refers to the number of resource block groups (RBG) determined as shown in [Table 18] below according to a BWP size assigned by a BWP indicator and higher-layer parameter rbg-Size, and data is transmitted to the RBG indicated to be 1 by a bit map.

TABLE 18

| Bandwidth Part Size | Configuration 1 | Configuration 2 |
|---|---|---|
| 1-36 | 2 | 4 |
| 37-72 | 4 | 8 |
| 73-144 | 8 | 16 |
| 145-275 | 16 | 16 |

If the terminal is configured 13-05, via higher-layer signaling, to use only resource type 1, a part of DCI for allocation of a PDSCH to the terminal includes frequency axis resource allocation information including $$\lceil \log_2(N_{RB}^{DL,BWP}(N_{RB}^{DL,BWP}+1)/2) \rceil$$

bits. Conditions for this will be described later. Based on this, the base station may configure a starting VRB 13-20 and a length 13-25 of frequency axis resources continuously allocated therefrom.

If the terminal is configured 13-10, via higher-layer signaling, to use both resource type 0 and resource type 1, some DCI for assigning of a PDSCH to the terminal includes frequency axis resource allocation information including bits of a larger value 13-35 among payloads 13-20 and 13-25 for configuring resource type 1 and a payload 13-15 for configuring resource type 0. Conditions for this will be described later. In this case, one bit may be added 13-30 to a first part (MSB) of the frequency axis resource allocation information in the DCI, wherein use of resource type 0 may be indicated for the corresponding bit having a value of "0", and use of resource type 1 may be indicated for the bit having a value of "1".

[PDSCH/PUSCH: Relating to Time Resource Allocation]

Hereinafter, a method of time domain resource allocation for a data channel in the next-generation mobile communication system (5G or NR system) is described.

The base station may configure, for the terminal via higher-layer signaling (e.g., RRC signaling), a table for time domain resource allocation information on a downlink data channel (physical downlink shared channel (PDSCH)) and an uplink data channel (physical uplink shared channel (PUSCH)). A table including up to 16 entries (maxNrofDL-Allocations=16) may be configured for the PDSCH, and a table including up to 16 entries (maxNrofUL-Allocations=16) may be configured for the PUSCH. In an embodiment, the time domain resource allocation information may include a PDCCH-to-PDSCH slot timing (denoted as K0, and corresponding to a time interval in units of slots between a time point at which a PDCCH is received and a time point at which a PDSCH scheduled by the received PDCCH is transmitted), a PDCCH-to-PUSCH slot timing (denoted as K2, and corresponding to a time interval in units of slots between a time point at which a PDCCH is received and a time point at which a PUSCH scheduled by the received PDCCH is transmitted), information on a position and a length of a start symbol in which the PDSCH or PUSCH is scheduled within a slot, a mapping type of the PDSCH or PUSCH, or the like. For example, information as shown in [Table 19] or [Table 20] below may be transmitted from the base station to the terminal.

TABLE 19

PDSCH-TimeDomainResourceAllocationList information element
PDSCH-TimeDomainResourceAllocationList ::= SEQUENCE
(SIZE(1..maxNrofDL-Allocations)) OF PDSCH-TimeDomainResourceAllocation
PDSCH-TimeDomainResourceAllocation ::= SEQUENCE {
k0                          INTEGER(0..32)
OPTIONAL, -- Need S TABLE 19-continued

| (PDCCH-to-PDSCH timing, slot unit) | |
|---|---|
| mappingType | ENUMERATED { typeA, typeB }, |
| (PDSCH mapping type) | |
| startSymbolAndLength | INTEGER (0..127) |
| (PDSCH start symbol and length) | |
| } | |

TABLE 20

PUSCH-TimeDomainResourceAllocation information element
PUSCH-TimeDomainResourceAllocationList ::= SEQUENCE
(SIZE(1..maxNrofUL-Allocations)) OF PUSCH-TimeDomainResourceAllocation
PUSCH-TimeDomainResourceAllocation ::= SEQUENCE {
k2                          INTEGER(0..32)    OPTIONAL,
-- Need S
(PDCCH-to-PUSCH timing, slot unit)
mappingType                 ENUMERATED {typeA, typeB},
(PUSCH mapping type)
startSymbolAndLength        INTEGER (0..127)
(PUSCH start symbol and length)
}

The base station may notify one of the entries in the tables relating to the time domain resource allocation information described above to the terminal via L1 signaling (e.g., DCI) (e.g., the entry may be indicated by a "time domain resource allocation" field in the DCI). The terminal may acquire the time domain resource allocation information for the PDSCH or PUSCH, based on the DCI received from the base station.

Figure 14:
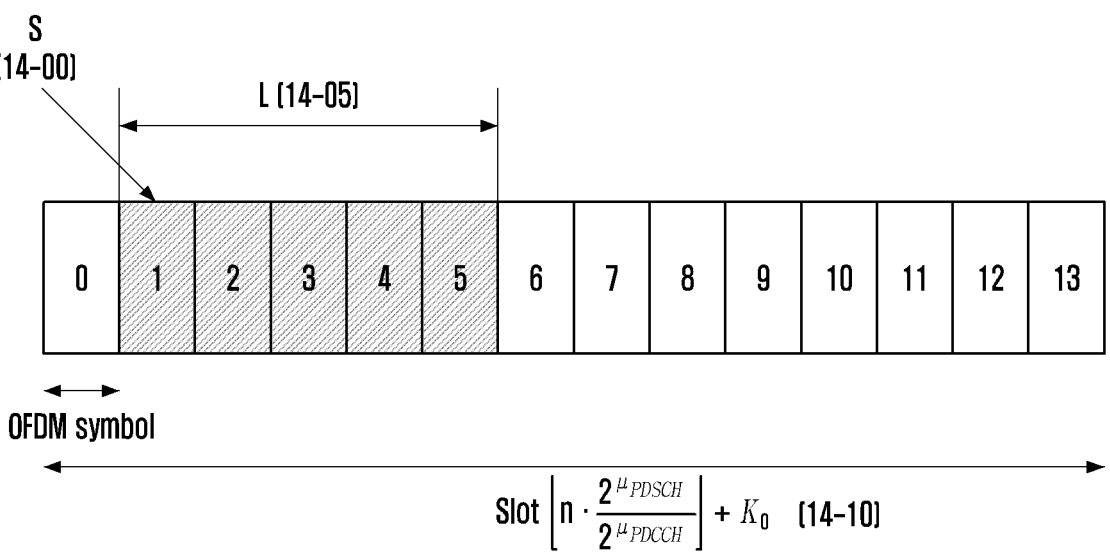
FIG. 14 is a diagram illustrating an example of time axis resource allocation of a PDSCH in the wireless communication system according to an embodiment of the disclosure.

FIG. 14 is a diagram illustrating an example of time domain resource allocation of a PDSCH in the wireless communication system according to an embodiment of the disclosure.

Referring to FIG. 14, a base station may indicate a time axis position of a PDSCH resource according to subcarrier spacings (SCSs) (μPDSCH, μPDCCH) of a data channel and a control channel, which are configured using a higher layer, a scheduling offset (K0) value, and an OFDM symbol start position 14-00 and length 14-05 within one slot 14-10 dynamically indicated via DCI.

Figure 15A:
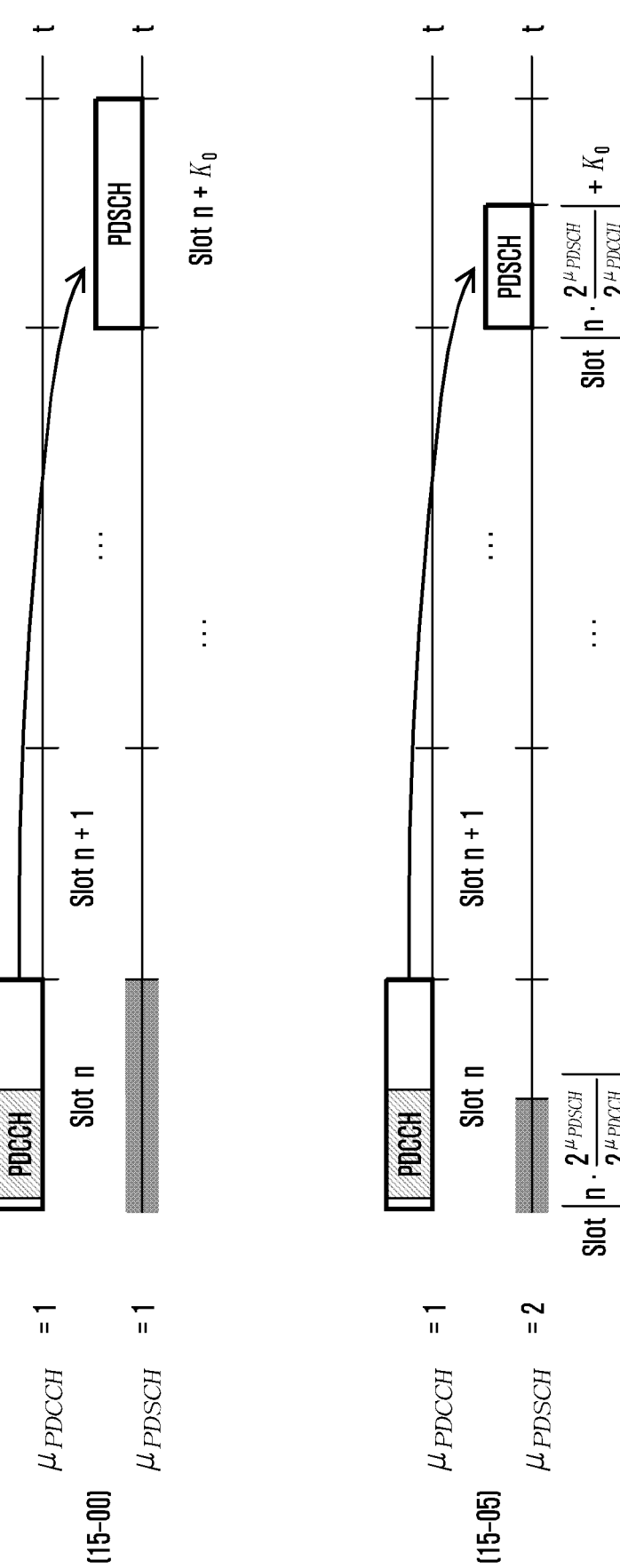
FIG. 15A shows diagrams illustrating examples of time axis resource allocation according to subcarrier spacings of a data channel and a control channel in the wireless communication system according to an embodiment of the disclosure.

FIG. 15A is a diagram illustrating an example of time axis resource allocation according to subcarrier spacings of a data channel and a control channel in the wireless communication system according to an embodiment of the disclosure.

Referring to FIG. 15A, if subcarrier spacings of a data channel and a control channel are the same 15-00 (μPDSCH=μPDCCH), since slot numbers for data and control are the same, the base station and the terminal may generate a scheduling offset according to a predetermined slot offset K0. On the other hand, if subcarrier spacings of a data channel and a control channel are different 15-05 (μPDSCH≠μPDCCH), since slot numbers for data and control are different, the base station and the terminal may generate a scheduling offset according to a predetermined slot offset K0, based on a subcarrier spacing of a PDCCH.
[PDSCH: Processing Time]

Next, a PDSCH processing time (PDSCH processing procedure time) is described. If the base station schedules PDSCH transmission using DCI format 1_0, 1_1, or 1_2 for the terminal, the terminal may require a PDSCH processing procedure time to receive a PDSCH by applying the transmission method (modulation and coding instruction index (MCS), demodulation reference signal-related information, time and frequency resource allocation information, etc.) indicated via DCI. In NR, the PDSCH processing procedure time is defined in consideration of the same. The PDSCH processing procedure time of the terminal may conform to [Equation 3] below.

$$T_{proc,1} = (N_1 + d_{1,1} + d_2)(2048 + 144)\kappa2^{-\mu}T_c + T_{ext} \quad \text{[Equation 3]}$$

Each variable in $T_{proc,1}$ described above via Equation 3 may have the following meaning.

$N_1$: The number of symbols determined according to UE processing capability 1 or 2 and numerology μ according to capability of the terminal. If UE processing capability 1 is reported according to UE capability reporting of the terminal, $N_1$ may have values of [Table x2-2], and if UE processing capability 2 is reported and it is configured, via higher-layer signaling, that UE processing capability 2 is available, $N_1$ may have values of [Table 21]. Numerology μ may correspond to a minimum value among $\mu_{PDCCH}$, $\mu_{PDSCH}$, and $\mu_{UL}$ so as to maximize $T_{proc,1}$, $\mu_{PDCCH}$, $\mu_{PDSCH}$, and $\mu_{UL}$ may denote a numerology of a PDCCH used for scheduling of a PDSCH, a numerology of the scheduled PDSCH, and a numerology of an uplink channel on which HARQ-ACK is to be transmitted, respectively.

TABLE 21

| | PDSCH processing procedure time for PDSCH processing capability 1 | |
|---|---|---|
| | PDSCH decoding time $N_1$ [symbols] | |
| $\mu$ | In case of dmrs-AdditionalPosition = pos0 in DMRS-DownlinkConfig, which is higher-layer signaling, for both PDSCH mapping types A and B | dmrs-AdditionalPosition ≠ pos0 in DMRS-DownlinkConfig in either of dmrs-DownlinkForPDSCH-MappingTypeA, dmrs-DownlinkForPDSCH-MappingTypeB or if the higher layer parameter is not configured |
| 0 | 8 | $N_{1,0}$ |
| 1 | 10 | 13 |
| 2 | 17 | 20 |
| 3 | 20 | 24 |

TABLE 22

| | PDSCH processing procedure time for PDSCH processing capability 2 |
|---|---|
| $\mu$ | PDSCH decoding time $N_1$ [symbols] In case of dmrs-AdditionalPosition = pos0 in DMRS-DownlinkConfig, which is higher-layer signaling, for both PDSCH mapping types A and B |
| 0 | 3 |
| 1 | 4.5 |
| 2 | 9 for frequency range 1 |

κ: 64

$T_{ext}$: When the terminal uses a shared spectrum channel access scheme, the terminal may calculate Tea and apply the same to a PDSCH processing time. Otherwise, $T_{ext}$ is assumed to be 0.

If $l_1$ denoting a PDSCH DMRS position value is 12, N1,0 in [Table x2-2] has a value of 14, and otherwise, N1,0 has a value of 13.

For PDSCH mapping type A, if a last symbol of a PDSCH is an i-th symbol in a slot in which the PDSCH is transmitted, and i<7, then $d_{1,1}$ is 7-i, and otherwise $d_{1,1}$ is 0.

$d_2$: If a PUCCH having a high priority index and a PUCCH or PUSCH having a low priority index overlap in time, $d_2$ of the PUCCH having a high priority index may be configured to be a value reported from the terminal. Otherwise, $d_2$ is 0.

If PDSCH mapping type B is used for UE processing capability 1, a value of $d_{1,1}$ may be determined as follows according to L that is the number of symbols of a scheduled PDSCH, and d that is the number of overlapping symbols between a PDCCH for scheduling of the PDSCH and the scheduled PDSCH.

If L≥7, $d_{1,1}$=0.

If L≥4 and L≤6, then $d_{1,1}$=7−L.

If L=3, $d_{1,1}$=min (d, 1).

If L=2, $d_{1,1}$=3+d.

If PDSCH mapping type B is used for UE processing capability 2, a value of $d_{1,1}$ may be determined as follows according to L that is the number of symbols of a scheduled PDSCH, and d that is the number of overlapping symbols between a PDCCH for scheduling of the PDSCH and the scheduled PDSCH.

If L≥7, $d_{1,1}$=0.

If L≥4 and L≤6, then $d_{1,1}$=7−L.

If L=2,

If the PDCCH for scheduling exists in a CORESET including 3 symbols, and the CORESET and the scheduled PDSCH have the same start symbol, $d_{1,1}$=3.

Otherwise, $d_{1,1}$=d.

For a terminal supporting capability 2 within a given serving cell, a PDSCH processing procedure time according to UE processing capability 2 may be applied when, for the terminal, processingType2Enabled, which is higher-layer signaling, is configured to be enabled for the cell.

If a position of a first uplink transmission symbol of the PUCCH including HARQ-ACK information (for the position, $K_1$ which is defined to be an HARQ-ACK transmission time point, a PUCCH resource used for HARQ-ACK transmission, and a timing advance effect may be considered) does not start earlier than a first uplink transmission symbol that appears after a time of $T_{proc,1}$ subsequent to the last symbol of the PDSCH, the terminal needs to transmit a valid HARQ-ACK message. That is, the terminal needs to transmit the PUCCH including HARQ-ACK only when the PDSCH processing procedure time is sufficient. Otherwise, the terminal cannot provide valid HARQ-ACK information corresponding to the scheduled PDSCH to the base station. The $T_{proc,1}$ may be used for both general or extended CP cases. For a PDSCH including two PDSCH transmission positions within one slot, $d_{1,1}$ is calculated based on a first PDSCH transmission position within the corresponding slot.

[PDSCH: Reception Preparation Time for Cross-Carrier Scheduling]

Next, for cross-carrier scheduling, in which $\mu_{PDCCH}$ that is a numerology via which a PDCCH for scheduling is transmitted and $\mu_{PDSCH}$ that is a numerology via which a PDSCH scheduled via the PDCCH is transmitted are different from each other, a PDSCH reception preparation time $N_{pdsch}$, of the terminal, which is defined for a time interval between the PDCCH and the PDSCH will be described.

If $\mu_{PDCCH}$<$\mu_{PDSCH}$, the scheduled PDSCH cannot be transmitted before a first symbol of a slot that appears after $N_{pdsch}$ symbols subsequent to a last symbol of the PDCCH via which the PDSCH has been scheduled. A transmission symbol of the PDSCH may include a DM-RS.

If $\mu_{PDCCH}$>$\mu_{PDSCH}$, the scheduled PDSCH may be transmitted after $N_{pdsch}$ Symbols Subsequent to the last symbol of the PDCCH via which the PDSCH has been scheduled. A transmission symbol of the PDSCH may include a DM-RS.

TABLE 23

| $N_{pdsch}$ according to scheduled PDCCH subcarrier spacing | |
|---|---|
| $\mu_{PDCCH}$ | $N_{pasch}$ [symbols] |
| 0 | 4 |
| 1 | 5 |

TABLE 23-continued

| $N_{pdsch}$ according to scheduled PDCCH subcarrier spacing | |
| --- | --- |
| $\mu_{PDCCH}$ | $N_{pasch}$ [symbols] |
| 2 | 10 |
| 3 | 14 |

[Relating to SRS]

Next, a method for uplink channel estimation using sounding reference signal (SRS) transmission of the terminal will be described. The base station may configure at least one SRS configuration for each uplink BWP to transfer configuration information for SRS transmission to the terminal, and may also configure at least one SRS resource set for each SRS configuration. As an example, the base station and the terminal may transmit and receive higher signaling information as follows to transfer information on the SRS resource set.

srs-ResourceSetId: an SRS resource set index srs-ResourceIdList: a set of SRS resource indexes referenced by an SRS resource set resourceType: a time axis transmission configuration of an SRS resource referenced by an SRS resource set, wherein resourceType may be configured to be one of "periodic", "semi-persistent", and "aperiodic". If resourceType is configured to be "periodic" or "semi-persistent", associated CSI-RS information may be provided according to a usage of the SRS resource set. If resourceType is configured to be "aperiodic", an aperiodic SRS resource trigger list and slot offset information may be provided, and associated CSI-RS information may be provided according to a usage of the SRS resource set.

usage: a configuration for a usage of an SRS resource referenced by an SRS resource set, wherein the usage may be configured to be one of "beamManagement", "codebook", "nonCodebook", and "antennaSwitching".

alpha, p0, pathlossReferenceRS, srs-PowerControlAdjustmentStates: providing parameter configurations for transmission power adjustment of an SRS resource referenced by an SRS resource set.

The terminal may understand that an SRS resource included in a set of SRS resource indexes referenced by an SRS resource set conforms to information included in the SRS resource set.

In addition, the base station and the terminal may transmit or receive higher-layer signaling information in order to transfer individual configuration information for the SRS resource. As an example, the individual configuration information for the SRS resource may include time-frequency axis mapping information within a slot of the SRS resource, which may include information on frequency hopping within a slot or between slots of the SRS resource. In addition, the individual configuration information for the SRS resource may include a time axis transmission configuration of the SRS resource, and may be configured to be one of "periodic", "semi-persistent", and "aperiodic". This may be limited to having the time axis transmission configuration, such as the SRS resource set including the SRS resource. If the time axis transmission configuration of the SRS resource is configured to be "periodic" or "semi-persistent", an additional SRS resource transmission period and slot offset (e.g. perinodicityAndOffset) may be included in the time axis transmission configuration.

The base station may activate, deactivate, or trigger SRS transmission to the terminal via L1 signaling (e.g., DCI) or higher-layer signaling including MAC CE signaling or RRC signaling. For example, the base station may activate or deactivate periodic SRS transmission for the terminal via higher-layer signaling. The base station may indicate to activate an SRS resource set in which resourceType is configured to be periodic via higher-layer signaling, and the terminal may transmit an SRS resource referenced by the activated SRS resource set. Time-frequency axis resource mapping within a slot of the transmitted SRS resource conforms to resource mapping information configured in the SRS resource, and slot mapping including a transmission period and a slot offset conforms to periodicityAndOffset configured in the SRS resource. In addition, a spatial domain transmission filter applied to the transmitted SRS resource may refer to spatial relation info configured in the SRS resource, or may refer to associated CSI-RS information configured in the SRS resource set including the SRS resource. The terminal may transmit the SRS resource in an uplink BWP activated for the periodic SRS resource activated via higher-layer signaling.

For example, the base station may activate or deactivate semi-persistent SRS transmission for the terminal via higher-layer signaling. The base station may indicate to activate an SRS resource set via MAC CE signaling, and the terminal may transmit an SRS resource referenced by the activated SRS resource set. The SRS resource set activated via MAC CE signaling may be limited to the SRS resource set in which resourceType is configured to be semi-persistent. Time-frequency axis resource mapping within a slot of the transmitted SRS resource conforms to resource mapping information configured in the SRS resource, and slot mapping including a transmission period and a slot offset conforms to periodicityAndOffset configured in the SRS resource. In addition, a spatial domain transmission filter applied to the transmitted SRS resource may refer to spatial relation info configured in the SRS resource, or may refer to associated CSI-RS information configured in the SRS resource set including the SRS resource. If spatial relation info is configured in the SRS resource, instead of conforming to the same, the spatial domain transmission filter may be determined by referring to configuration information on spatial relation info transferred via MAC CE signaling for activation of semi-persistent SRS transmission. The terminal may transmit the SRS resource in an uplink BWP activated for the semi-persistent SRS resource activated via higher-layer signaling.

For example, the base station may trigger aperiodic SRS transmission to the terminal via DCI. The base station may indicate one of aperiodic SRS resource triggers (aperiodicSRS-ResourceTrigger) via an SRS request field of the DCI. The terminal may understand that an SRS resource set has been triggered, the SRS resource set including an aperiodic SRS resource trigger indicated via the DCI in an aperiodic SRS resource trigger list in configuration information of the SRS resource set. The terminal may transmit an SRS resource referenced by the triggered SRS resource set. Time-frequency axis resource mapping within a slot of the transmitted SRS resource conforms to resource mapping information configured in the SRS resource. In addition, slot mapping of the transmitted SRS resource may be determined via a slot offset between a PDCCH including the DCI and the SRS resource, which may refer to value(s) included in a slot offset set configured in the SRS resource set. Specifically, the slot offset between the PDCCH including the DCI and the SRS resource, a value indicated by a time domain resource assignment field of the DCI from among offset value(s) included in the slot offset set configured in the SRS resource set may be applied. In addition, a spatial domain transmission filter applied to the transmitted SRS resource may refer to spatial relation info configured in the SRS resource, or may refer to associated CSI-RS information configured in the SRS resource set including the SRS resource. The terminal may transmit the SRS resource in an uplink BWP activated for the aperiodic SRS resource triggered via the DCI.

When the base station triggers aperiodic SRS transmission to the terminal via the DCI, in order for the terminal to transmit an SRS by applying configuration information for the SRS resource, a minimum time interval between a PDCCH including the DCI triggering aperiodic SRS transmission and the transmitted SRS may be required. A time interval for SRS transmission of the terminal may be defined to be the number of symbols between the last symbol of the PDCCH including the DCI triggering aperiodic SRS transmission and the first symbol to which a first transmitted SRS resource among the transmitted SRS resource(s) is mapped. The minimum time interval may be determined by referring to a PUSCH preparation procedure time required for the terminal to prepare for PUSCH transmission. In addition, the minimum time interval may have a different value depending on a usage of the SRS resource set including the transmitted SRS resource. For example, the minimum time interval may be defined to be N2 symbols defined in consideration of terminal processing capability according to the capability of the terminal by referring to the PUSCH preparation procedure time of the terminal. In addition, if the usage of the SRS resource set is configured to be "codebook" or "antennaSwitching" in consideration of the usage of the SRS resource set including the transmitted SRS resource, the minimum time interval may be determined to be N2 symbols, and if the usage of the SRS resource set is configured to be "nonCodebook" or "beamManagement", the minimum time interval may be determined to be N2+14 symbols. If the time interval for aperiodic SRS transmission is greater than or equal to the minimum time interval, the terminal may transmit an aperiodic SRS, and if the time interval for aperiodic SRS transmission is less than the minimum time interval, the terminal may disregard the DCI triggering an aperiodic SRS.

TABLE 24

```
SRS-Resource ::=                    SEQUENCE {
    srs-ResourceId                      SRS-ResourceId,
    nrofSRS-Ports                       ENUMERATED {port1,ports2,ports4},
    ptrs-PortIndex                      ENUMERATED {n0,n1 }
OPTIONAL,    -- Need R
    transmissionComb                        CHOICE {
        n2                                      SEQUENCE {
            combOffset-n2                           INTEGER (0..1),
            cyclicShift-n2                          INTEGER (0..7)
        },
        n4                                      SEQUENCE {
            combOffset-n4                           INTEGER (0..3),
            cyclicShift-n4                          INTEGER (0..11)
        }
    },
    resourceMapping                     SEQUENCE {
        startPosition                       INTEGER (0..5),
        nrofSymbols                         ENUMERATED {n1,n2,n4},
        repetitionFactor                    ENUMERATED {n1,n2,n4}
    },
    freqDomainPosition              INTEGER (0..67),
    freqDomainShift                 INTEGER (0..268),
    freqHopping                     SEQUENCE {
        c-SRS                               INTEGER (0..63),
        b-SRS                               INTEGER (0..3),
        b-hop                               INTEGER (0..3)
    },
    groupOrSequenceHopping              ENUMERATED { neither, groupHopping, sequenceHopping },
    resourceType                    CHOICE {
        aperiodic                           SEQUENCE {
            ...
        },
        semi-persistent                     SEQUENCE {
            periodicityAndOffset-sp                 SRS-PeriodicityAndOffset,
            ...
        },
        periodic                            SEQUENCE {
            periodicityAndOffset-p                  SRS-PeriodicityAndOffset.
            ...
        }
    },
    sequenceId                      INTEGER (0..1023),
    spatialRelationInfo             SRS-SpatialRelationInfo
OPTIONAL,    -- Need R
    ...
}
```

53

54

The spatialRelationInfo configuration information in [Table 24] refers to one reference signal and applies beam information of the reference signal to a beam used for corresponding SRS transmission. For example, the configuration of spatialRelationInfo may include information as shown in [Table 25] below.

TABLE 25

| | |
|---|---|
| SRS-SpatialRelationInfo ::= | SEQUENCE { |
| servingCellId | ServCellIndex      OPTIONAL,    -- Need S |
| referenceSignal | CHOICE { |
| ssb-Index | SSB-Index, |
| csi-RS-Index | NZP-CSI-RS-ResourceId, |
| srs | SEQUENCE { |
| resourceId | SRS-ResourceId, |
| uplinkBWP | BWP-Id |
| } | |
| } | |
| } | | ing to csi-RS-Index. If the value of higher signaling referenceSignal is configured to be "srs", the terminal may apply, as a transmission beam of the SRS transmission, a transmission beam used when transmitting an SRS corresponding to srs.

Referring to the spatialRelationInfo configuration, an SS/PBCH block index, a CSI-RS index, or an SRS index may be configured as an index of a reference signal to be referenced in order to use beam information of a specific reference signal. Higher signaling referenceSignal is configuration information indicating beam information of which reference signal is to be referenced for corresponding SRS transmission, ssb-Index refers to an SS/PBCH block index, csi-RS-Index refers to a CSI-RS index, and srs refers to an SRS index. If a value of higher signaling referenceSignal is configured to be "ssb-Index", the terminal may apply, as a transmission beam of the SRS transmission, a reception beam used when receiving an SS/PBCH block corresponding to ssb-Index. If the value of higher signaling referenceSignal is configured to be "csi-RS-Index", the terminal may apply, as a transmission beam of the SRS transmission, a reception beam used when receiving a CSI-RS correspond

[PUSCH: Relating to Transmission Scheme]

Next, a scheduling scheme of PUSCH transmission will be described. PUSCH transmission may be dynamically scheduled by a UL grant in DCI or may be operated by configured grant Type 1 or Type 2. Dynamic scheduling indication for PUSCH transmission is possible with DCI format 0_0 or 0_1.

For configured grant Type 1 PUSCH transmission, the UL grant in DCI may not be received, and configuration may be performed semi-statically via reception of configuredGrantConfig including rrc-ConfiguredUplinkGrant of [Table 26] via higher signaling. Configured grant Type 2 PUSCH transmission may be semi-persistently scheduled by the UL grant in DCI after reception of configuredGrantConfig that does not include rrc-ConfiguredUplinkGrant of [Table 26] via higher signaling. When PUSCH transmission is operated by the configured grant, parameters applied to PUSCH transmission are applied via configuredGrantConfig that is higher signaling in [Table 33], except for dataScramblingIdentityPUSCH, txConfig, codebookSubset, maxRank, and scaling of UCI-OnPUSCH provided via pusch-Config that is higher signaling in [Table 27]. If the terminal is provided with transformPrecoder in configuredGrantConfig which is higher signaling in [Table 26], the terminal applies tp-pi2BPSK in pusch-Config of [Table 27] to PUSCH transmission operated by the configured grant.

TABLE 26

| | |
|---|---|
| ConfiguredGrantConfig ::= | SEQUENCE { |
| frequency Hopping | ENUMERATED {intraSlot, |
| interSlot} | OPTIONAL,   -- Need |
| S, | |

55 56

TABLE 26-continued

| | |
|---|---|
| cg-DMRS-Configuration | DMRS-UplinkConfig, |
| mcs-Table | ENUMERATED {qam256, |
| qam64LowSE} | OPTIONAL, - |
| - Need S | |
| mcs-TableTransformPrecoder | ENUMERATED {qam256, |
| qam64LowSE} | OPTIONAL,- |
| - Need S | |
| uci-OnPUSCH | SetupRelease {CG-UCI- |
| OnPUSCH } | OPTIONAL, -- |
| Need M | |
| resourceAllocation | ENUMERATED |
| { resourceAllocationType0, resourceAllocationType1, dynamicSwitch }, | |
| rbg-Size | ENUMERATED {config2} |
| OPTIONAL, -- Need S | |
| powerControlLoopToUse | ENUMERATED {n0, n1}, |
| p0-PUSCH-Alpha | P0-PUSCH-AlphaSetId, |
| transformPrecoder | ENUMERATED {enabled, |
| disabled} | OPTIONAL, -- |
| Need S | |
| nrofHARQ-Processes | INTEGER(1..16), |
| repK | ENUMERATED {n1, n2, n4, n8}, |
| repK-RV | ENUMERATED {s1-0231, s2- |
| 0303, s3-0000} | OPTIONAL, -- Need |
| R | |
| periodicity | ENUMERATED { |
| | sym2, sym7, sym1x14, |
| sym2x14, sym4x14, sym5x14, sym8x14, sym10x14, sym16x14, sym20x14, | |
| | sym32x14, sym40x14, |
| sym64x14, sym80x14, sym128x14, sym 160x14, sym256x14, sym320x14, | |
| sym512x14, | |
| | sym640x14, |
| sym 1024x14, sym1280x14, sym2560x14, sym5120x14, | |
| | sym6, sym1x12, |
| sym2x12, sym4x12, sym5x12, sym8x12, sym10x12, sym16x12, sym20x12, | |
| sym32x12, | |
| | sym40x12, sym64x12, |
| sym80x12, sym128x12, sym160x12, sym256x12, sym320x12, sym512x12, | |
| sym640x12, | |
| | sym1280x12, |
| sym2560x12 | |
| }, | |
| configuredGrantTimer | INTEGER (1..64) |
| OPTIONAL, -- Need R | |
| rrc-ConfiguredUplinkGrant | SEQUENCE { |
| timeDomainOffset | INTEGER (0..5119), |
| timeDomainAllocation | INTEGER (0..15), |
| frequency DomainAllocation | BIT STRING (SIZE(18)), |
| antennaPort | INTEGER (0..31), |
| dmrs-SeqInitialization | INTEGER (0..1) |
| OPTIONAL, -- Need R | |
| precodingAndNumberOfLayers | INTEGER (0..63), |
| srs-ResourceIndicator | INTEGER (0..15) |
| OPTIONAL, -- Need R | |
| mcsAndTBS | INTEGER (0..31), |
| frequency HoppingOffset | INTEGER (1.. |
| maxNrofPhysicalResourceBlocks-1) | OPTIONAL, |
| Need R | |
| pathlossReferenceIndex | INTEGER |
| (0..maxNrofPUSCH-PathlossReferenceRSs-1), | |
| ... | |
| } | |
| OPTIONAL, -- Need R | |
| ... | |
| } | |

55

Next, a PUSCH transmission method will be described. A DMRS antenna port for PUSCH transmission is the same as an antenna port for SRS transmission. PUSCH transmission may follow each of a codebook-based transmission method and a non-codebook-based transmission method, depending on whether a value of txConfig in pusch-Config of [Table x2-4], which is higher signaling, is "codebook" or "non-Codebook".

As described above, PUSCH transmission may be dynamically scheduled via DCI format 0_0 or 0_1, and may be semi-statically configured by a configured grant. If the terminal is indicated with scheduling for PUSCH transmis-sion via DCI format 0_0, the terminal performs beam configuration for PUSCH transmission by using pucch-spatialRelationInfoID corresponding to a UE-specific PUCCH resource which corresponds to a minimum ID within an enabled uplink BWP in a serving cell, in which case the PUSCH transmission is based on a single antenna port. The terminal does not expect scheduling for PUSCH transmission via DCI format 0_0, within a BWP in which a PUCCH resource including pucch-spatialRelationInfo is not configured. If the terminal is not configured with txConfig in pusch-Config of [Table 27], the terminal does not expect to be scheduled via DCI format 0_1.

TABLE 27

```
PUSCH-Config ::=                          SEQUENCE {
    dataScramblingIdentityPUSCH             INTEGER (0..1023)
OPTIONAL, -- Need S
    txConfig                                ENUMERATED {codebook, nonCodebook}
OPTIONAL, -- Need S
    dmrs-UplinkForPUSCH-MappingTypeA          SetupRelease { DMRS-UplinkConfig }
OPTIONAL, -- Need M
    dmrs-UplinkForPUSCH-MappingTypeB          SetupRelease { DMRS-UplinkConfig )
OPTIONAL, -- Need M
    pusch-PowerControl                      PUSCH-PowerControl
OPTIONAL, -- Need M
    frequencyHopping                        ENUMERATED {intraSlot, interSlot}
OPTIONAL, -- Need S
    frequencyHoppingOffsetLists         SEQUENCE (SIZE (1..4)) OF INTEGER (1..
maxNrofPhysicalResourceBlocks-1)
OPTIONAL, -- Need M
    resourceAllocation                      ENUMERATED { resourceAllocationType0,
resourceAllocationType1, dynamicSwitch),
    pusch-TimeDomainAllocationList          SetupRelease { PUSCH-TimeDomainResourceAllocationList }
OPTIONAL, -- Need M
    pusch-AggregationFactor                 ENUMERATED {n2, n4, n8}
OPTIONAL, -- Need S
    mcs-Table                               ENUMERATED {qam256, qam64LowSE}
OPTIONAL, -- Need S
    mcs-TableTransformPrecoder              ENUMERATED {qam256, qam64LowSE}
OPTIONAL, -- Need S
    transformPrecoder                       ENUMERATED {enabled, disabled}
OPTIONAL, -- Need S
    codebookSubset                          ENUMERATED {fullyAndPartialAndNonCoherent,
partialAndNonCoherent,nonCoherent}
OPTIONAL, -- Cond codebookBased
    maxRank                                     INTEGER (1..4)
OPTIONAL, -- Cond codebookBased
    rbg-Size                                ENUMERATED { config2}
OPTIONAL, -- Need S
    uci-OnPUSCH                               SetupRelease { UCI-OnPUSCH}
OPTIONAL, -- Need M
    tp-pi2BPSK                              ENUMERATED {enabled}
OPTIONAL, -- Need S
    ...
}
```

Next, codebook-based PUSCH transmission will be described. Codebook-based PUSCH transmission may be dynamically scheduled via DCI format 0_0 or 0_1 and may operate semi-statically by a configured grant. If a codebook-based PUSCH is dynamically scheduled by DCI format 0_1 or is configured semi-statically by a configured grant, the terminal determines a precoder for PUSCH transmission, based on an SRS resource indicator (SRI), a transmission precoding matrix indicator (TPMI), and a transmission rank (the number of PUSCH transmission layers).

In this case, the SRI may be given via a field, SRS resource indicator, in DCI or may be configured via srs-ResourceIndicator that is higher signaling. The terminal is configured with at least one SRS resource at codebook-based PUSCH transmission, and may be configured with up to two SRS resources. When the terminal is provided with the SRI via DCI, an SRS resource indicated by the SRI refers to an SRS resource corresponding to the SRI from among SRS resources transmitted before a PDCCH including the SRI. In addition, the TPMI and the transmission rank may be given via a field, precoding information and number of layers, in DCI or may be configured via precodingAndNumberOfLayers that is higher signaling. The TPMI is used to indicate a precoder applied to PUSCH transmission. If the terminal is configured with one SRS resource, the TPMI is used to indicate a precoder to be applied in the configured one SRS resource. If the terminal is configured with multiple SRS resources, the TPMI is used to indicate a precoder to be applied in the SRS resource indicated via the SRI.

A precoder to be used for PUSCH transmission is selected from an uplink codebook having the same number of antenna ports as a value of nrofSRS-Ports in SRS-Config which is higher signaling. In codebook-based PUSCH transmission, the terminal determines a codebook subset, based on codebookSubset in pusch-Config which is higher signaling and the TPMI, codebookSubset in pusch-Config, which is higher signaling, may be configured with one of "fullyAndPartialAndNonCoherent", "partialAndNonCoherent", or "nonCoherent", based on UE capability reported to the base station by the terminal. If the terminal has reported "partialAndNonCoherent" as UE capability, the terminal does not expect that a value of codebookSubset which is higher signaling is configured to be "fullyAndPartialAndNonCoherent". In addition, if the terminal has reported "nonCoherent" as UE capability, the terminal does not expect that the value of codebookSubset which is higher signaling is configured to be "fullyAndPartialAndNonCoherent" or "partialAndNonCoherent". If nrofSRS-Ports in SRS-ResourceSet that is higher signaling indicates two SRS antenna ports, the terminal does not expect that the value of codebookSubset which is higher signaling is configured to be "partialAndNonCoherent".

The terminal may be configured with one SRS resource set, in which a value of usage in SRS-ResourceSet that is higher signaling is configured to "codebook", and one SRS resource in the corresponding SRS resource set may be indicated via the SRI. If multiple SRS resources are configured in the SRS resource set in which the usage value in SRS-ResourceSet that is higher signaling is configured to be "codebook", the terminal expects that the value of nrofSRS-Ports in SRS-Resource that is higher signaling is configured to be the same for all SRS resources.

The terminal transmits one or multiple SRS resources included in the SRS resource set, in which the value of usage is configured to be "codebook", to the base station according to higher signaling, and the base station selects one of the SRS resources transmitted by the terminal and indicates the terminal to perform PUSCH transmission using transmission beam information of the corresponding SRS resource. In this case, in codebook-based PUSCH transmission, the SRI is used as information for selecting of an index of one SRS resource and is included in the DCI. Additionally, the base station adds, to the DCI, information indicating the rank and TPMI to be used by the terminal for PUSCH transmission. The terminal uses the SRS resource indicated by the SRI to perform PUSCH transmission by applying the precoder indicated by the TPMI and the rank, which has been indicated based on a transmission beam of the SRS resource.

Next, non-codebook-based PUSCH transmission will be described. Non-codebook-based PUSCH transmission may be dynamically scheduled via DCI format 0_0 or 0_1 and may operate semi-statically by a configured grant. If at least one SRS resource is configured in an SRS resource set, in which the value of usage in SRS-ResourceSet that is higher signaling is configured to be "nonCodebook", the terminal may be scheduled with non-codebook-based PUSCH transmission, via DCI format 0_1.

For the SRS resource set in which the value of usage in SRS-ResourceSet that is higher signaling is configured to be "nonCodebook", the terminal may be configured with one connected non-zero power (NZP) CSI-RS resource. The terminal may perform calculation on a precoder for SRS transmission via measurement for the NZP CSI-RS resource connected to the SRS resource set. If a difference between a last reception symbol of an aperiodic NZP CSI-RS resource connected to the SRS resource set and a first symbol of aperiodic SRS transmission in the terminal is less than 42 symbols, the terminal does not expect information on the precoder for SRS transmission to be updated.

If a value of resourceType in SRS-ResourceSet that is higher signaling is configured to be "aperiodic", the connected NZP CSI-RS is indicated via an SRS request which is a field in DCI format 0_1 or 1_1. In this case, if the connected NZP CSI-RS resource is an aperiodic NZP CSI-RS resource, an indication is made to the presence of the connected NZP CSI-RS in a case where a value of the field, SRS request, in DCI format 0_1 or 1_1 is not "00". In this case, the corresponding DCI should indicate neither a cross carrier nor cross BWP scheduling. In addition, if the value of the SRS request indicates the presence of the NZP CSI-RS, the NZP CSI-RS is located at a slot in which a PDCCH including the SRS request field has been transmitted. TCI states configured in scheduled subcarriers are not configured to QCL-TypeD.

If a periodic or semi-persistent SRS resource set is configured, the connected NZP CSI-RS may be indicated via associatedCSI-RS in SRS-ResourceSet that is higher signaling. For non-codebook-based transmission, the terminal does not expect that spatialRelationInfo, which is higher signaling for the SRS resource, and associatedCSI-RS in SRS-ResourceSet that is higher signaling are configured together.

If multiple SRS resources are configured, the terminal may determine the precoder and transmission rank to be applied to PUSCH transmission, based on the SRI indicated by the base station. In this case, the SRI may be indicated via the field, SRS resource indicator, in DCI or may be configured via srs-ResourceIndicator that is higher signaling. Like the aforementioned codebook-based PUSCH transmission, when the terminal receives the SRI via the DCI, the SRS resource indicated by the SRI refers to an SRS resource corresponding to the SRI from among SRS resources transmitted before the PDCCH including the SRI. The terminal may use one or multiple SRS resources for SRS transmission, and the maximum number of SRS resources simultaneously transmittable in the same symbol within one SRS resource set is determined by UE capability reported to the base station by the terminal. In this case, the SRS resources that the terminal simultaneously transmits occupy the same RB. The terminal configures one SRS port for each SRS resource. Only one SRS resource set, in which the value of usage in SRS-ResourceSet that is higher signaling is configured to be "nonCodebook", may be configured, and up to 4 SRS resources for the non-codebook-based PUSCH transmission may be configured.

The base station transmits one NZP CSI-RS connected to the SRS resource set to the terminal, and the terminal calculates, based on a result of measurement at reception of the NZP CSI-RS, the precoder to be used during transmission of one or multiple SRS resources in the SRS resource set. The terminal applies the calculated precoder when transmitting, to the base station, one or multiple SRS resources in the SRS resource set in which usage is configured to be "nonCodebook", and the base station selects one or multiple SRS resources from among the received one or multiple SRS resources. In non-codebook-based PUSCH transmission, the SRI refers to an index capable of representing one SRS resource or a combination of multiple SRS resources, and the SRI is included in the DCI. The number of SRS resources indicated by the SRI transmitted by the base station may be the number of transmission layers of the PUSCH, and the terminal transmits the PUSCH by applying, to each layer, the precoder applied to SRS resource transmission.

[PUSCH: Preparation Procedure Time]

Next, a PUSCH preparation procedure time will be described. If the base station uses DCI format 0_0, 0_1, or 0_2 to schedule the terminal to transmit the PUSCH, the terminal may require a PUSCH preparation procedure time for transmitting the PUSCH by applying a transmission method (a transmission precoding method of an SRS resource, the number of transmission layers, and a spatial domain transmission filter) indicated via the DCI. In NR, the PUSCH preparation procedure time is defined in consideration of the same. The PUSCH preparation procedure time of the terminal may conform to [Equation 4] below.

$$T_{proc,2} = \qquad \text{[Equation 4]}$$
$$\max((N_2 + d_{2,1} + d_2)(2048 + 144)\kappa 2^{-\mu} T_c + T_{ext} + T_{switch}, d_{2,2})$$

Each variable in $T_{proc,2}$ described above using Equation 4 may have the following meaning.

N₂: The number of symbols determined according to UE processing capability 1 or 2 and numerology μ according to capability of the terminal. If UE processing capability 1 is reported according to a capability report of the terminal, N2 may have values of [Table 28], and if UE processing capability 2 is reported and it is configured, via higher-layer signaling, that UE processing capability 2 is available, N2 may have values of [Table 29].

TABLE 28

| μ | PUSCH preparation time $N_2$ [symbols] |
| --- | --- |
| 0 | 10 |
| 1 | 12 |
| 2 | 23 |
| 3 | 36 |

TABLE 29

| μ | PUSCH preparation time $N_2$ [symbols] |
| --- | --- |
| 0 | 5 |
| 1 | 5.5 |
| 2 | 11 for frequency range 1 |

$d_{2,1}$: The number of symbols determined to be 0 when all resource elements of a first OFDM symbol of PUSCH transmission are configured to include only DM-RS, and to be 1 otherwise

κ: 64

μ: μ follows one of $\mu_{DL}$ or $\mu_{UL}$, at which $T_{proc,2}$ has a greater value. $\mu_{DL}$ indicates a numerology of a downlink in which a PDCCH including DCI for scheduling of a PUSCH is transmitted, and $\mu_{UL}$ indicates a numerology of an uplink in which $$T_c\colon 1/(\Delta f_{max} \cdot N_f),\ \Delta f_{max} = 480 \cdot 10^3 \text{Hz},\ N_f = 4096$$

$d_{2,2}$: Following a BWP switching time when DCI for scheduling of the PUSCH indicates BWP switching, and 0 otherwise $d_2$: When a PUSCH having a high priority index with a PUCCH and an OFDM symbol of a PUCCH having a low priority index overlap on time, a $d_2$ value of the PUSCH having the high priority index is used. Otherwise, $d_2$ is 0.

$T_{ext}$: When the terminal uses a shared spectrum channel access scheme, the terminal may calculate $T_{ext}$ and apply the same to a PUSCH preparation procedure time. Otherwise, $T_{ext}$ is assumed to be 0.

$T_{switch}$: If an uplink switching interval is triggered, $T_{switch}$ is assumed to be a switching interval time. Otherwise, $T_{switch}$ is assumed to be 0.

The base station and the terminal determine that the PUSCH preparation procedure time is not sufficient when a first symbol of the PUSCH starts before a first uplink symbol in which a CP starts after Tproc,2 from a last symbol of the PDCCH including the DCI for scheduling of the PUSCH, in consideration of time axis resource mapping information of the PUSCH scheduled via the DCI and a timing advance effect between the uplink and the downlink. Otherwise, the base station and the terminal determine that the PUSCH preparation procedure time is sufficient. If the PUSCH preparation procedure time is sufficient, the terminal transmits the PUSCH, and if the PUSCH preparation procedure time is not sufficient, the terminal may disregard the DCI for scheduling of the PUSCH.

[PUSCH: Relating to Repeated Transmission]

Hereinafter, repeated transmission of an uplink data channel in the 5G system will be described in detail. In the 5G system, repeated PUSCH transmission type A and repeated PUSCH transmission type B are supported as two types of the method for repeated transmission of an uplink data channel. The terminal may be configured with one of repeated PUSCH transmission type A or B via higher-layer signaling.

Repeated PUSCH Transmission Type A

As described above, within one slot, a position of a start symbol and a symbol length of an uplink data channel are determined by a time domain resource allocation method, and the base station may notify the terminal of the number of repeated transmissions via higher-layer signaling (e.g., RRC signaling) or L1 signaling (e.g., DCI).

The terminal may repeatedly transmit an uplink data channel, which has the same length and start symbol as the configured length and start symbol of the uplink data channel, in consecutive slots, based on the number of repeated transmissions received from the base station. In this case, when at least one symbol in symbols of the uplink data channel configured for the terminal or a slot configured for downlink for the terminal by the base station is configured for downlink, the terminal omits uplink data channel transmission, but counts the number of repeated transmissions of the uplink data channel.

Repeated PUSCH Transmission Type B

As described above, within one slot, a start symbol and a length of an uplink data channel are determined by the time domain resource allocation method, and the base station may notify the terminal of the number of repeated transmissions, numberofrepetitions, via higher-layer signaling (e.g., RRC signaling) or L1 signaling (e.g., DCI).

First, nominal repetition of the uplink data channel is determined as follows, based on the configured start symbol and length of the uplink data channel. A slot in which n-th nominal repetition starts is given by $$K_s + \left\lfloor \frac{S + n \cdot L}{N_{symb}^{slot}} \right\rfloor,$$

and a symbol starting in the slot is given by $$\mathrm{mod}(S + n \cdot L,\ N_{symb}^{slot}).$$

A slot in which n-th nominal repetition ends is given by $$K_s + \left\lfloor \frac{S + (n+1) \cdot (L-1)}{\lambda_{symb}^{slot}} \right\rfloor,$$

and a symbol ending in the slot is given by $$\mathrm{mod}(S + (n+1) \cdot L - 1,\ N_{symb}^{slot}).$$

Here, n=0, . . . , numberofrepetitions−1, S is the configured start symbol of the uplink data channel, and L indicates the configured symbol length of the uplink data channel. $K_s$ indicates a slot in which PUSCH transmission starts, and $$N_{symb}^{slot}$$

indicates the number of symbols per slot.

The terminal determines an invalid symbol for repeated PUSCH transmission type B. A symbol configured for downlink by tdd-UL-DL-ConfigurationCommon or tdd-UL-DL-ConfigurationDedicated is determined as an invalid symbol for repeated PUSCH transmission type B. In addition, an invalid symbol may be configured by a higher-layer parameter (e.g., InvalidSymbolPattern). A higher-layer parameter (e.g., InvalidSymbolPattern) provides a symbol level bitmap over one slot or two slots so that an invalid symbol may be configured. 1 in the bitmap indicates an invalid symbol. In addition, a period and a pattern of the bitmap may be configured via a higher-layer parameter (e.g., periodicityAndPattern). If the higher-layer parameter (e.g., InvalidSymbolPattern) is configured and parameter InvalidSymbolPatternIndicator-ForDCIFormat0_1 or InvalidSymbolPatternIndicator-ForDCIFormat0_2 indicates 1, the terminal applies an invalid symbol pattern, and if the parameter indicates 0, the terminal does not apply the invalid symbol pattern. If the higher-layer parameter (e.g., InvalidSymbolPattern) is configured and parameter InvalidSymbolPatternindicator-ForDCIFormat0_1 or InvalidSymbolPatternIndicator-ForDCIFormat0_2 is not configured, the terminal applies the invalid symbol pattern.

After an invalid symbol is determined, for each nominal repetition, the terminal may consider symbols other than the invalid symbol to be valid symbols. If one or more valid symbols are included in each nominal repetition, the nominal repetition may include one or more actual repetitions. Here, each actual repetition includes "a consecutive set of" valid symbols available for repeated PUSCH transmission type B within one slot.

Figure 15B:
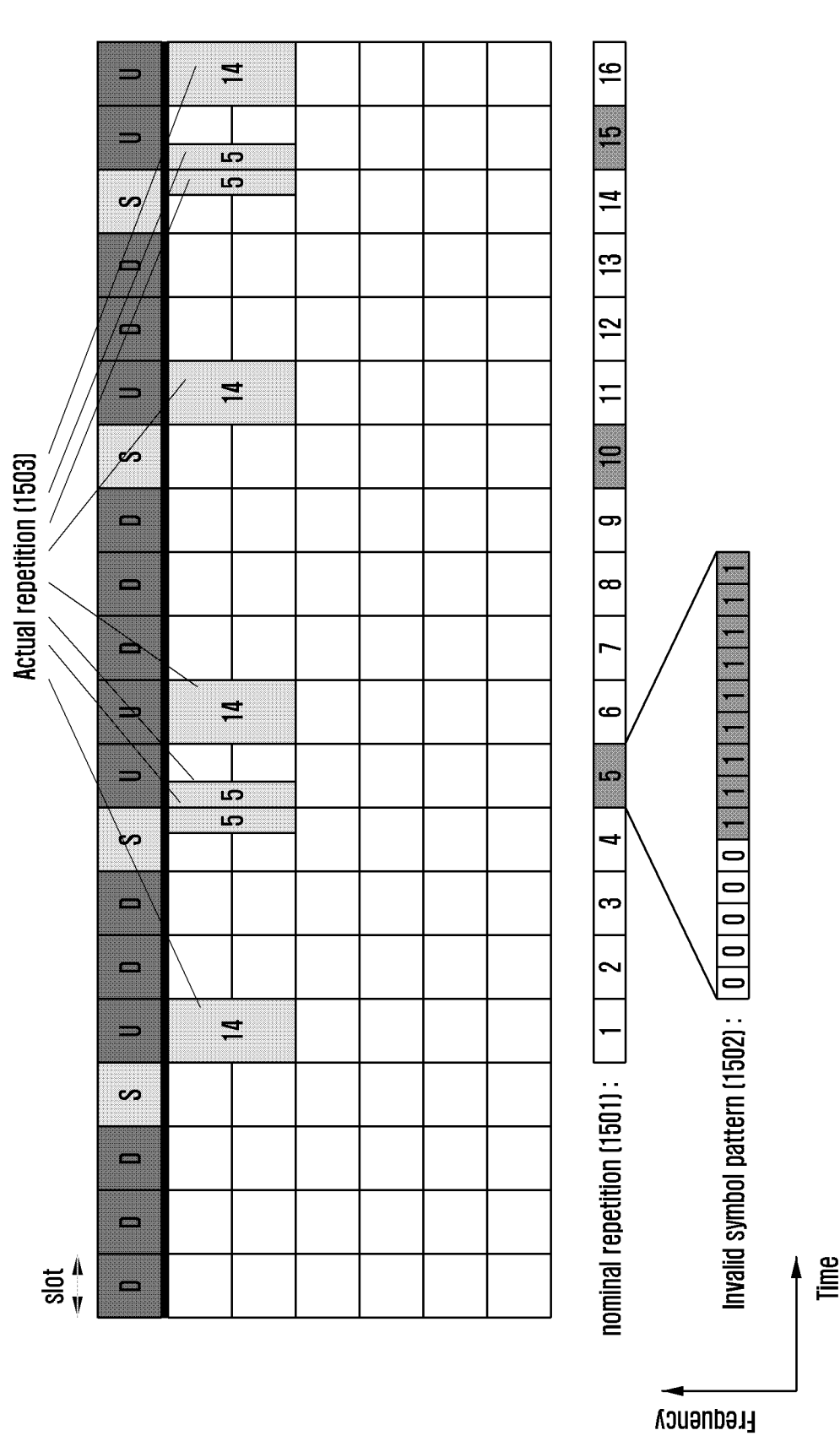
FIG. 15B is a diagram illustrating an example of repeated physical uplink shared channel (PUSCH) transmission type B in the wireless communication system according to an embodiment of the disclosure.

FIG. 15B is a diagram illustrating an example of repeated PUSCH transmission type B in the wireless communication system according to an embodiment of the disclosure. For a terminal, a start symbol S of an uplink data channel may be configured to be 0, a length L of the uplink data channel may be configured to be 14, and the number of repeated transmissions may be configured to be 15. In this case, nominal repetition 1501 is indicated in 16 consecutive slots. Then, the terminal may determine, as an invalid symbol, a symbol configured to be a downlink symbol in each nominal repetition 1501. In addition, the terminal determines, as invalid symbols, symbols configured to be 1 in an invalid symbol pattern 1502. In each nominal repetition, if valid symbols that are not invalid symbols include one or more consecutive symbols in one slot, actual repetition 1503 is configured and transmission is performed.

In addition, with respect to repeated PUSCH transmission, in NR Release 16, the following additional methods may be defined for UL grant-based PUSCH transmission and configured grant-based PUSCH transmission over slot boundaries.

Method 1 (mini-slot level repetition): Via one UL grant, two or more repeated PUSCH transmissions are scheduled within one slot or over boundaries of consecutive slots. In addition, with respect to method 1, time domain resource allocation information in DCI indicates a resource of a first repeated transmission. In addition, time domain resource information of the remaining repeated transmissions may be determined according to time domain resource information of the first repeated transmission and an uplink or downlink direction determined for each symbol of each slot. Each repeated transmission occupies consecutive symbols.

Method 2 (multi-segment transmission): Via one UL grant, two or more repeated PUSCH transmissions are scheduled in consecutive slots. In this case, one transmission is designated for each slot, and start points or repetition lengths may be different for each transmission. In addition, with respect to method 2, time domain resource allocation information in the DCI indicates start points and repetition lengths of all repeated transmissions. In addition, when repeated transmission is performed within a single slot via method 2, if there are multiple bundles of consecutive uplink symbols in the slot, each repeated transmission is performed for each bundle of uplink symbols. If a bundle of consecutive uplink symbols exists uniquely in the slot, one repeated PUSCH transmission is performed according to the method of NR Release 15.

Method 3: Via two or more UL grants, two or more repeated PUSCH transmissions are scheduled in consecutive slots. In this case, one transmission is designated for each slot, and an n-th UL grant may be received before PUSCH transmission scheduled via an (n−1)th UL grant ends.

Method 4: Via one UL grant or one configured grant, one or multiple repeated PUSCH transmissions within a single slot, or two or more repeated PUSCH transmissions over the boundaries of consecutive slots may be supported. The number of repetitions indicated to the terminal by the base station is merely a nominal value, and the number of repeated PUSCH transmissions actually performed by the terminal may be greater than the nominal number of repetitions. Time domain resource allocation information in DCI or in the configured grant refers to a resource of a first repeated transmission indicated by the base station. Time domain resource information of the remaining repeated transmissions may be determined by referring, at least in part, to resource information of the first repeated transmission and uplink or downlink directions of symbols. If the time domain resource information of repeated transmission indicated by the base station spans a slot boundary or includes an uplink/downlink switching point, the repeated transmission may be divided into multiple repeated transmissions. In this case, one repeated transmission may be included for each uplink period in one slot.

[PUSCH: Frequency Hopping Procedure]

Hereinafter, frequency hopping of an uplink data channel (physical uplink shared channel (PUSCH)) in the 5G system will be described in detail.

In 5G, as a frequency hopping method of an uplink data channel, two methods are supported for each repeated PUSCH transmission type. First, repeated PUSCH transmission type A supports intra-slot frequency hopping and inter-slot frequency hopping, and repeated PUSCH transmission type B supports inter-repetition frequency hopping and inter-slot frequency hopping.

The intra-slot frequency hopping method supported by repeated PUSCH transmission type A is a method by which the terminal changes an allocated resource of the frequency domain by a configured frequency offset in two hops within one slot and performs transmission. In intra-slot frequency hopping, a starting RB of each hop may be expressed via Equation 4.

$$RB_{start} = \begin{cases} RB_{start} & i = 0 \\ (RB_{start} + RB_{offset}) \bmod N_{BWP}^{size} & i = 1 \end{cases} \quad \text{[Equation 4]}$$

In Equation 4, i=0 and i=1 indicate a first hop and a second hop, respectively, and $RB_{start}$ indicates a starting RB in a UL BWP and is calculated based on a frequency resource allocation method. $RB_{offset}$ indicates a frequency offset between two hops via a higher-layer parameter. The number of symbols of the first hop may be indicated by $$\lfloor N_{symb}^{PUSCH,s} / 2 \rfloor,$$

and the number of symbols of the second hop may be indicated by $$N_{symb}^{PUSCH,s} - \lfloor N_{symb}^{PUSCH,s} / 2 \rfloor. \; N_{symb}^{PUSCH,s}$$

is a length of PUSCH transmission within one slot and is represented by the number of OFDM symbols.

In the following, the inter-slot frequency hopping method supported by repeated PUSCH transmission types A and B is a method in which the terminal changes an allocated resource of the frequency domain by a configured frequency offset for each slot and performs transmission. In inter-slot frequency hopping, during $$n_s^\mu$$

slots, a starting RB may be expressed via Equation 5.

$$RB_{start}(n_s^\mu) = \begin{cases} RB_{start} & n_s^\mu \bmod 2 = 0 \\ (RB_{start} + RB_{offset}) \bmod N_{BWP}^{size} & n_s^\mu \bmod 2 = 1 \end{cases} \quad \text{[Equation 5]}$$

In Equation 5, $$n_s^\mu$$

indicates a current slot number in multi-slot PUSCH transmission, and $RB_{start}$ indicates a starting RB in a UL BWP and is calculated based on the frequency resource allocation method. $RB_{offset}$ indicates a frequency offset between two hops via a higher-layer parameter.

Next, the inter-repetition frequency hopping method supported by repeated PUSCH transmission type B includes performing transmission by moving resources allocated on the frequency domain as much as a configured frequency offset for one or multiple actual repetitions within each nominal repetition. $RB_{start}$(n), which is an index of a starting RB in the frequency domain for one or multiple actual repetitions within an n-th nominal repetition, may conform to Equation 6 below.

$$RB_{start}(n_s^\mu) = \begin{cases} RB_{start} & n_s^\mu \bmod 2 = 0 \\ (RB_{start} + RB_{offset}) \bmod N_{BWP}^{size} & n_s^\mu \bmod 2 = 1 \end{cases} \quad \text{[Equation 6]}$$

In Equation 6, n indicates an index of nominal repetition, and $RB_{offset}$ indicates an RB offset between two hops via a higher-layer parameter.

[PUSCH: Multiplexing Rules During AP/SP CSI Reporting]

Hereinafter, a method of measuring and reporting a channel state in the 5G communication system will be described in detail. The channel state information (CSI) may include a channel quality indicator (channel quality information (CQI)), a precoding matrix index (precoding matrix indicator (PMI)), a CSI-RS resource indicator (CRI), an SS/PBCH block resource indicator (SSBRI), a layer indicator (LI), a rank indicator (RI), a reference signal received power (L1-RSRP), and/or the like. The base station may control time and frequency resources for the aforementioned CSI measurement and report of the terminal.

For the aforementioned CSI measurement and reporting, the terminal may be configured, via higher-layer signaling, with setting information (CSI-ReportConfig) for N (≥) CSI reports, setting information (CSI-ResourceConfig) for M (≥) RS transmission resources, and list information of one or two trigger states (CSI-AperiodicTriggerStateList, CSI-SemiPersistentOnPUSCH-TriggerStateList). The configuration information for CSI measurement and reporting described above may be, more specifically, as described in [Table 30] to [Table 36] below.

The IE CSI-ReportConfig is used to configure a periodic or semi-persistent report sent on PUCCH on the cell in which the CSI-ReportConfig is included, or to configure a semi-persistent or aperiodic report sent on PUSCH triggered by DCI received on the cell in which the CSI-ReportConfig is included (in this case, the cell on which the report is sent is determined by the received DCI). Sec TS 38.214 [19], clause 5.2.1.

CSI-ReportConfig Information Element

TABLE 30

| CSI-ReportConfig |
| --- |
| -- ASN1START |
| -- TAG-CSI-REPORTCONFIG-START |
| CSI-ReportConfig ::=                    SEQUENCE { |
|     reportConfigId                    CSI-ReportConfigId, |
|     carrier                    ServCellIndex |
| OPTIONAL,    -- Need S |
|     resourcesForChannelMeasurement                    CSI-ResourceConfigId, |
|     csi-IM-ResourcesForInterference                    CSI-ResourceConfigId |
| OPTIONAL,    -- Need R |
|     nzp-CSI-RS-ResourcesForInterference                    CSI-ResourceConfigId |
| OPTIONAL,    -- Need R |
|     reportConfigType                    CHOICE { |

TABLE 30-continued

| CSI-ReportConfig |
|---|

```
        periodic                              SEQUENCE {
            reportSlotConfig                        CSI-
ReportPeriodicityAndOffset,
            pucch-CSI-ResourceList              SEQUENCE
(SIZE (1..maxNrofBWPs)) OF PUCCH-CSI-Resource
        },
        semiPersistentOnPUCCH                SEQUENCE {
            reportSlotConfig                        CSI-
ReportPeriodicityAndOffset,
              pucch-CSI-ResourceList            SEQUENCE
(SIZE (1..maxNrofBWPs)) OF PUCCH-CSI-Resource
        },
        semiPersistentOnPUSCH               SEQUENCE {
            reportSlotConfig                   ENUMERATED
{sl5, sl10, sl20, sl40, sl80, sl160, sl320},
            reportSlotOffsetList          SEQUENCE (SIZE (1..
maxNrofUL-Allocations)) OF INTEGER(0..32),
            p0alpha                             P0-PUSCH-
AlphaSetId
        },
        aperiodic                            SEQUENCE {
            reportSlotOffsetList             SEQUENCE (SIZE
(1..maxNrofUL-Allocations)) OF INTEGER(0..32)
        }
    },
    reportQuantity                       CHOICE {
        none                                 NULL,
        cri-RI-PMI-CQI                       NULL,
        cri-RI-i1                            NULL,
        cri-RI-i1-CQI                        SEQUENCE {
            pdsch-BundleSizeForCSI
ENUMERATED                        {n2,             n4}
OPTIONAL    -- Need S
        },
        cri-RI-CQI                           NULL,
        cri-RSRP                             NULL,
        ssb-Index-RSRP                       NULL,
        cri-RI-LI-PMI-CQI                    NULL
    },
    reportFreqConfiguration              SEQUENCE {
        cqi-FormatIndicator                 ENUMERATED
{ widebandCQI, subbandCQI }            OPTIONAL,
-- Need R
        pmi-FormatIndicator                 ENUMERATED
{ widebandPMI, subbandPMI }            OPTIONAL,
-- Need R
        csi-ReportingBand                   CHOICE {
            subbands3                            BIT
STRING(SIZE(3)),
            subbands4                            BIT
STRING(SIZE(4)),
            subbands5                            BIT
STRING(SIZE(5)),
            subbands6                            BIT
STRING(SIZE(6)),
            subbands7                            BIT
STRING(SIZE(7)),
            subbands8                            BIT
STRING(SIZE(8)),
            subbands9                            BIT
STRING(SIZE(9)),
            subbands10                           BIT
STRING(SIZE(10)),
            subbands11                           BIT
STRING(SIZE(11)),
            subbands12                           BIT
STRING(SIZE(12)),
            subbands13                           BIT
STRING(SIZE(13)),
            subbands14                           BIT
STRING(SIZE(14)),
            subbands15                           BIT
STRING(SIZE(15)),
            subbands16                           BIT
STRING(SIZE(16)),
            subbands17                           BIT
STRING(SIZE(17)),
            subbands18                           BIT
```

TABLE 30-continued

| CSI-ReportConfig |
|---|

```
STRING(SIZE(18)),
            ...,
                subbands19-v1530                        BIT
STRING(SIZE(19))
        }   OPTIONAL    -- Need S
    }
OPTIONAL,   -- Need R
        timeRestrictionForChannelMeasurements           ENUMERATED
{configured, notConfigured},
        timeRestrictionForInterferenceMeasurements          ENUMERATED
{configured, notConfigured},
        codebookConfig
CodebookConfig
OPTIONAL,    -- Need R
        dummy
ENUMERATED                          {n1,                    n2}
OPTIONAL,    -- Need R
        groupBasedBeamReporting                      CHOICE {
            enabled                                      NULL,
            disabled                                     SEQUENCE {
                nrofReportedRS
ENUMERATED            {n1          n2,          n3,          n4}
OPTIONAL    -- Need S
            }
        },
        cqi-Table                   ENUMERATED {table1, table2, table3,
spare 1}                                OPTIONAL,   -- Need
R
        subbandSize                 ENUMERATED {value1, value2},
        non-PMI-PortIndication          SEQUENCE (SIZE (1..maxNrofNZP-
CSI-RS-ResourcesPerConfig)) OF PortIndexFor8Ranks OPTIONAL,    --
Need R
        ...,
        [[
        semiPersistentOnPUSCH-v1530                SEQUENCE {
            reportSlotConfig-v1530                     ENUMERATED {sl4, sl8,
sl16}
        }
OPTIONAL     -- Need R
        ]],
        [[
        semiPersistentOnPUSCH-v1610            SEQUENCE {
            reportSlotOffsetListDCI-0-2-r16            SEQUENCE (SIZE (1..
maxNrofUL-Allocations-r16)) OF INTEGER(0..32)     OPTIONAL,     --
Need R
            reportSlotOffsetListDCI-0-1-r16            SEQUENCE (SIZE (1..
maxNrofUL-Allocations-r16)) OF INTEGER(0..32)     OPTIONAL       --
Need R
        }
OPTIONAL,    -- Need R
        aperiodic-v1610                             SEQUENCE {
            reportSlotOffsetListDCI-0-2-r16            SEQUENCE (SIZE (1..
maxNrofUL-Allocations-r16)) OF INTEGER(0..32)     OPTIONAL,     --
Need R
            reportSlotOffsetListDCI-0-1-r16            SEQUENCE (SIZE (1..
maxNrofUL-Allocations-r16)) OF INTEGER(0..32)     OPTIONAL       --
Need R
        }
OPTIONAL,    -- Need R
        reportQuantity-r16                      CHOICE {
            cri-SINR-r16                             NULL,
            ssb-Index-SINR-r16                       NULL
        }
OPTIONAL,    -- Need R
        codebookConfig-r16                          CodebookConfig-
r16                                        OPTIONAL      -
- Need R
        ]]
}
CSI-ReportPeriodicityAndOffset ::= CHOICE {
        slots4                              INTEGER(0..3),
        slots5                              INTEGER(0..4),
        slots8                              INTEGER(0..7),
        slots10                             INTEGER(0..9),
        slots16                             INTEGER(0..15),
        slots20                             INTEGER(0..19),
        slots40                             INTEGER(0..39),
        slots80                             INTEGER(0..79),
```

TABLE 30-continued

| CSI-ReportConfig |  |
| --- | --- |
| slots160 | INTEGER(0..159), |
| slots320 | INTEGER(0..319) |
| } |  |
| PUCCH-CSI-Resource ::= | SEQUENCE { |
| uplinkBandwidthPartId | BWP-Id, |
| pucch-Resource | PUCCH-ResourceId |
| } |  |
| PortIndexFor8Ranks ::= | CHOICE { |
| portIndex8 | SEQUENCE{ |
| rank1-8 | PortIndex8 |
| OPTIONAL, -- Need R |  |
| rank2-8 | SEQUENCE(SIZE(2)) |
| OF PortIndex8 | OPTIONAL, -- |
| Need R |  |
| rank3-8 | SEQUENCE(SIZE(3)) |
| OF PortIndex8 | OPTIONAL, -- |
| Need R |  |
| rank4-8 | SEQUENCE(SIZE(4)) |
| OF PortIndex8 | OPTIONAL, -- |
| Need R |  |
| rank5-8 | SEQUENCE(SIZE(5)) |
| OF PortIndex8 | OPTIONAL, -- |
| Need R |  |
| rank6-8 | SEQUENCE(SIZE(6)) |
| OF PortIndex8 | OPTIONAL, -- |
| Need R |  |
| rank7-8 | SEQUENCE(SIZE(7)) |
| OF PortIndex8 | OPTIONAL, -- |
| Need R |  |
| rank8-8 | SEQUENCE(SIZE(8)) |
| OF PortIndex8 | OPTIONAL -- |
| Need R |  |
| }, |  |
| portIndex4 | SEQUENCE{ |
| rank1-4 | PortIndex4 |
| OPTIONAL, -- Need R |  |
| rank2-4 | SEQUENCE(SIZE(2)) |
| OF PortIndex4 | OPTIONAL, -- |
| Need R |  |
| rank3-4 | SEQUENCE(SIZE(3)) |
| OF PortIndex4 | OPTIONAL, -- |
| Need R |  |
| rank4-4 | SEQUENCE(SIZE(4)) |
| OF PortIndex4 | OPTIONAL -- |
| Need R |  |
| }, |  |
| portIndex2 | SEQUENCE{ |
| rank1-2 | PortIndex2 |
| OPTIONAL, -- Need R |  |
| rank2-2 | SEQUENCE(SIZE(2)) |
| OF PortIndex2 | OPTIONAL -- |
| Need R |  |
| }, |  |
| portIndex1 | NULL |
| } |  |
| PortIndex8::= | INTEGER (0..7) |
| PortIndex4::= | INTEGER (0..3) |
| PortIndex2::= | INTEGER (0..1) |
| -- TAG-CSI-REPORTCONFIG-STOP |  |

-- ASN1STOP

CSI-ReportConfig field descriptions carrier
Indicates in which serving cell the CSI-ResourceConfig indicated below are to be found. If
the field is absent, the resources are on the same serving cell as this report configuration.

codebookConfig
Codebook configuration for Type-1 or Type-2 including codebook subset restriction.
Network does not configure codebookConfig and codebookConfig-r16 simultaneously to
a UE cqi-FormatIndicator
Indicates whether the UE shall report a single (wideband) or multiple (subband) CQI. (see
TS 38.214 [19], clause 5.2.1.4).

cqi-Table
Which CQI table to use for CQI calculation (see TS 38.214 [19], clause 5.2.2.1).

csi-IM-ResourcesForInterference
CSI IM resources for interference measurement. csi-ResourceConfigId of a CSI-
ResourceConfig included in the configuration of the serving cell indicated with the field
"carrier" above. The CSI-ResourceConfig indicated here contains only CSI-IM resources.
The bwp-Id in that CSI-ResourceConfig is the same value as the bwp-Id in the CSI- TABLE 30-continued

| CSI-ReportConfig |
| --- |

ResourceConfig indicated by resourcesForChannelMeasurement.
csi-ReportingBand
Indicates a contiguous or non-contiguous subset of subbands in the bandwidth part which
CSI shall be reported for. Each bit in the bit-string represents one subband. The right-most
bit in the bit string represents the lowest subband in the BWP. The choice determines the
number of subbands (subbands3 for 3 subbands, subbands4 for 4 subbands, and so on) (see
TS 38.214 [19], clause 5.2.1.4). This field is absent if there are less than 24 PRBs (no sub
band) and present otherwise, the number of sub bands can be from 3 (24 PRBs, sub band
size 8) to 18 (72 PRBs, sub band size 4).
dummy
This field is not used in the specification. If received it shall be ignored by the UE.
groupBasedBeamReporting
Turning on/off group beam based reporting (see TS 38.214 [19], clause 5.2.1.4).
non-PMI-PortIndication
Port indication for RI/CQI calculation. For each CSI-RS resource in the linked
ResourceConfig for channel measurement, a port indication for each rank R, indicating
which R ports to use. Applicable only for non-PMI feedback (see TS 38.214 [19], clause
5.2.1.4.2).
The first entry in non-PMI-PortIndication corresponds to the NZP-CSI-RS-Resource
indicated by the first entry in nzp-CSI-RS-Resources in the NZP-CSI-RS-ResourceSet
indicated in the first entry of nzp-CSI-RS-ResourceSetList of the CSI-ResourceConfig
whose CSI-ResourceConfigId is indicated in a CSI-MeasId together with the above CSI-
ReportConfigId; the second entry in non-PMI-PortIndication corresponds to the NZP-
CSI-RS-Resource indicated by the second entry in nzp-CSI-RS-Resources in the NZP-
CSI-RS-ResourceSet indicated in the first entry of nzp-CSI-RS-ResourceSetList of the
same CSI-ResourceConfig, and so on until the NZP-CSI-RS-Resource indicated by the
last entry in nzp-CSI-RS-Resources in the in the NZP-CSI-RS-ResourceSet indicated in
the first entry of nzp-CSI-RS-ResourceSetList of the same CSI-ResourceConfig. Then the
next entry corresponds to the NZP-CSI-RS-Resource indicated by the first entry in nzp-
CSI-RS-Resources in the NZP-CSI-RS-ResourceSet indicated in the second entry of nzp-
CSI-RS-ResourceSetList of the same CSI-ResourceConfig and so on.
nrofReportedRS
The number (N) of measured RS resources to be reported per report setting in a non-
group-based report. N <= N_max, where N_max is either 2 or 4 depending on UE
capability.
(see TS 38.214 [19], clause 5.2.1.4) When the field is absent the UE applies the value 1.
nzp-CSI-RS-ResourcesForInterference
NZP CSI RS resources for interference measurement. csi-ResourceConfigId of a CSI-
ResourceConfig included in the configuration of the serving cell indicated with the field
"carrier" above. The CSI-ResourceConfig indicated here contains only NZP-CSI-RS
resources. The bwp-Id in that CSI-ResourceConfig is the same value as the bwp-Id in the
CSI-ResourceConfig indicated by resourcesForChannelMeasurement.
p0alpha
Index of the p0-alpha set determining the power control for this CSI report transmission
(see TS 38.214 [19], clause 6.2.1.2).
pdsch-BundleSizeForCSI
PRB bundling size to assume for CQI calculation when reportQuantity is CRI/RI/i1/CQI.
If the field is absent, the UE assumes that no PRB bundling is applied (see TS 38.214
[19], clause 5.2.1.4.2).
pmi-FormatIndicator
Indicates whether the UE shall report a single (wideband) or multiple (subband) PMI.
(see TS 38.214 [19], clause 5.2.1.4).
pucch-CSI-ResourceList
Indicates which PUCCH resource to use for reporting on PUCCH.
reportConfigType
Time domain behavior of reporting configuration.
reportFreqConfiguration
Reporting configuration in the frequency domain. (see TS 38.214 [19], clause 5.2.1.4).
reportQuantity
The CSI related quantities to report. see TS 38.214 [19], clause 5.2.1. If the field
reportQuantity-r16 is present, UE shall ignore reportQuantity (without suffix).
reportSlotConfig
Periodicity and slot offset (see TS 38.214 [19], clause 5.2.1.4). If the field
reportSlotConfig-v1530 is present, the UE shall ignore the value provided in
reportSlotConfig (without suffix).
reportSlotOffsetList, reportSlotOffsetListDCI-0-1, reportSlotOffsetListDCI-0-2
Timing offset Y for semi persistent reporting using PUSCH. This field lists the allowed
offset values. This list must have the same number of entries as the pusch-
TimeDomainAllocationList in PUSCH-Config. A particular value is indicated in DCI. The
network indicates in the DCI field of the UL grant, which of the configured report slot
offsets the UE shall apply. The DCI value 0 corresponds to the first report slot offset in
this list, the DCI value 1 corresponds to the second report slot offset in this list, and so on.
The first report is transmitted in slot n + Y, second report in n + Y + P, where P is the
configured periodicity.
Timing offset Y for aperiodic reporting using PUSCH. This field lists the allowed offset
values. This list must have the same number of entries as the pusch-
TimeDomainAllocationList in PUSCH-Config. A particular value is indicated in DCI. The
network indicates in the DCI field of the UL grant, which of the configured report slot TABLE 30-continued

| CSI-ReportConfig |
| --- |
| offsets the UE shall apply. The DCI value 0 corresponds to the first report slot offset in this list, the DCI value 1 corresponds to the second report slot offset in this list, and so on (see TS 38.214 [19], clause 6.1.2.1). The field reportSlotOffsetList applies to DCI format 0_0, the field reportSlotOffsetListDCI-0-1 applies to DCI format 0_1 and the field reportSlotOffsetListDCI-0-2 applies to DCI format 0_2 (see TS 38.214 [19], clause 6.1.2.1). |
| resourcesForChannelMeasurement |
| Resources for channel measurement. csi-ResourceConfigId of a CSI-ResourceConfig included in the configuration of the serving cell indicated with the field "carrier" above. The CSI-ResourceConfig indicated here contains only NZP-CSI-RS resources and/or SSB resources. This CSI-ReportConfig is associated with the DL BWP indicated by bwp-Id in that CSI-ResourceConfig. |
| subbandSize |
| Indicates one out of two possible BWP-dependent values for the subband size as indicated in TS 38.214 [19], table 5.2.1.4-2 . If csi-ReportingBand is absent, the UE shall ignore this field. |
| timeRestrictionForChannelMeasurements |
| Time domain measurement restriction for the channel (signal) measurements (see TS 38.214 [19], clause 5.2.1.1). |
| timeRestrictionForInterferenceMeasurements |
| Time domain measurement restriction for interference measurements (see TS 38.214 [19], clause 5.2.1.1). |

The IE CSI-ResourceConfig defines a group of one or more NZP-CSI-RS-ResourceSet, CSI-IM-ResourceSet and/or CSI-SSB-ResourceSet.

The IE NZP-CSI-RS-ResourceSet is a set of Non-Zero-Power (NZP) CSI-RS resources (their IDs) and set-specific parameters.

TABLE 31

| CSI-ResourceConfig |
| --- |
| -- ASN1START |
| -- TAG-CSI-RESOURCECONFIG-START |
| CSI-ResourceConfig ::=               SEQUENCE { |
|     csi-ResourceConfigId               CSI-ResourceConfigId, |
|     csi-RS-ResourceSetList             CHOICE { |
|       nzp-CSI-RS-SSB                       SEQUENCE { |
|         nzp-CSI-RS-ResourceSetList SEQUENCE (SIZE (1..maxNrofNZP-CSI-RS-ResourceSetsPerConfig)) OF NZP-CSI-RS-ResourceSetId |
| OPTIONAL, - Need R |
|         csi-SSB-ResourceSetList                   SEQUENCE (SIZE (1..maxNrofCSI-SSB-ResourceSetsPerConfig)) OF CSI-SSB-ResourceSetId OPTIONAL -- Need R |
|       }, |
|       csi-IM-ResourceSetList                 SEQUENCE (SIZE (1..maxNrofCSI-IM-ResourceSetsPerConfig)) OF CSI-IM-ResourceSetId |
|     }, |
|     bwp-Id                             BWP-Id, |
|     resourceType                       ENUMERATED { apenodic, semiPersistent, periodic }, |
|     ... |
| } |
| -- TAG-CSI-RESOURCECONFIG-STOP |
| -- ASN1STOP |

| CSI-ResourceConfig field descriptions |
| --- |
| bwp-Id |
| The DL BWP which the CSI-RS associated with this CSI-ResourceConfig are located in (see TS 38.214[19], clause 5.2.1.2). |
| csi-IM-ResourceSetList |
| List of references to CSI-IM resources used for beam measurement and reportingin a CSI-RS resource set. Contains up to maxNrofCSI-IM-ResourceSetsPerConfig resource sets if resourceType is 'aperiodic' and 1 otherwise (see TS 38.214 [19], clause 5.2.1.2). |
| csi-ResourceConfigId |
| Used in CSI-ReporConfig to refer to an instance of CSI-ResourceConfig. |
| csi-SSB-ResourceSetList |
| List of references to SSB resources used for beam measurement and reporting in a CSI-RS resource set (see TS 38.214 [19]. clause 5.2.1.2). |
| nzp-CSI-RS-ResourceSetList |
| List of references to NZP CSI-RS resources used for beam measurement and reporting in a CSI-RS resource set. Contains up to maxNrofNZP-CSI-RS-ResourceSetsPerConfig resource sets if resourceType is 'aperiodic' and 1 otherwise (see TS 38.214 [19]. clause 5.2.1.2). |
| resourceType |
| Time domain behavior of resource configuration (see TS 38.214 [19], clause 5.2.1.2). It does not apply to resources provided in the czi-SSB-ResourceSetList. |

NZP-CSI-RS-ResourceSet Information Element

TABLE 32

```
-- ASN1START
-- TAG-NZP-CSI-RS-RESOURCESET-START
NZP-CSI-RS-ResourceSet ::=          SEQUENCE {
    nzp-CSI-ResourceSetId              NZP-CSI-RS-ResourceSetId,
    nzp-CSI-RS-Resources               SEQUENCE (SIZE (1..maxNrofNZP-
CSI-RS-ResourcesPerSet)) OF NZP-CSI-RS-ResourceId,
    repetition                         ENUMERATED { on, off }
OPTIONAL,    -- Need S
    aperiodicTriggeringOffset                       INTEGER(0..6)
OPTIONAL,    -- Need S
    trs-Info                        ENUMERATED {true}
OPTIONAL,    -- Need R
    ...,
    [[
    aperiodicTriggeringOffset-r16                   INTEGER(0..31)
OPTIONAL    -- Need S
    ]]
}
-- TAG-NZP-CSI-RS-RESOURCESET-STOP
-- ASN1STOP
NZP-CSI-RS-ResourceSet field descriptions
aperiodicTriggeringOffset, aperiodicTriggeringOffset-r16
Offset X between the slot containing the DCI that triggers a set of aperiodic NZP CSI-RS
resources and the slot in which the CSI-RS resource set is transmitted. For
aperiodicTriggeringOffset, the value 0 corresponds to 0 slots, value 1 corresponds to 1 slot,
value 2 corresponds to 2 slots, value 3 corresponds to 3 slots, value 4 corresponds to 4 slots,
value 5 corresponds to 16 slots, value 6 corresponds to 24 slots. For
aperiodicTriggeringOffset-r16, the value indicates the number of slots. The network
configures only one of the fields. When neither field is included, the UE applies the value
0.
nzp-CSI-RS-Resources
NZP-CSI-RS-Resources associated with this NZP-CSI-RS resource set (see TS 38.214
[19], clause 5.2). For CSI, there are at most 8 NZP CSI RS resources per resource set.
repetition
Indicates whether repetition is on/off. If the field is set to off or if the field is absent, the UE
may not assume that the NZP-CSI-RS resources within the resource set are transmitted with
the same downlink spatial domain transmission filter (see TS 38.214 [19], clauses 5.2.2.3.1
and 5.1.6.1.2). It can only be configured for CSI-RS resource sets which are associated with
CSI-ReportConfig with report of L1 RSRP or "no report".
trs-Info
Indicates that the antenna port for all NZP-CSI-RS resources in the CSI-RS resource set is
same. If the field is absent or released the UE applies the value false (see TS 38.214 [19],
clause 5.2.2.3.1).
```

The IE CSI-SSB-ResourceSet is used to configure one SS/PBCH block resource set which refers to SS/PBCH as indicated in ServingCellConfigCommon.

TABLE 33

| CSI-SSB-ResourceSet |
| --- |

```
-- ASN1START
-- TAG-CSI-SSB-RESOURCESET-START
CSI-SSB-ResourceSet ::= SEQUENCE {
  csi-SSB-ResourceSetId     CSI-SSB-ResourceSetId,
  csi-SSB-ResourceList      SEQUENCE (SIZE(1..maxNrofCSI-SSB-ResourcePerSet)) OF SSB-Index,
  ...
}
-- TAG-CSI-SSB-RESOURCESET-STOP
-- ASN1STOP
```

The IE CSI-IM-ResourceSet is used to configure a set of one or more CSI Interference Management (IM) resources (their IDs) and set-specific parameters.

CSI-IM-ResourceSet Information Element

TABLE 34

| CSI-IM-ResourceSet |
| --- |
| -- ASN1START<br>-- TAG-CSI-IM-RESOURCESET-START<br>CSI-IM-ResourceSet ::= SEQUENCE {<br>  csi-IM-ResourceSetId     CSI-IM-ResourceSetId,<br>  csi-IM-Resources          SEQUENCE (SIZE(1..maxNrofCSI-IM-ResourcesPerSet)) OF<br>CSI-IM-ResourceId,<br>  ...<br>}<br>-- TAG-CSI-IM-RESOURCESET-STOP<br>-- ASN1STOP |

| CSI-IM-ResourceSet field descriptions |
| --- |
| csi-IM-Resources<br>CSI-IM-Resources associated with this CSI-IM-ResourceSet (see TS 38.214 [19], clause 5.2) |

The CSI-AperiodicTriggerStateList IE is used to configure the UE with a list of aperiodic trigger states. Each codepoint of the DCI field "CSI request" is associated with one trigger state. Upon reception of the value associated with a trigger state, the UE will perform measurement of CSI-RS (reference signals) and aperiodic reporting on L1 according to all entries in the associatedReportConfigInfoList for that trigger state.

TABLE 35

| CSI-AperiodicTriggerStateList |
| --- |
| CSI-AperiodicTriggerStateList information element<br>-- ASN1START<br>-- TAG-CSI-APERIODICTRIGGERSTATELIST-START<br>CSI-AperiodicTriggerStateList ::=          SEQUENCE  (SIZE  (1..maxNrOfCSI-<br>AperiodicTriggers)) OF CSI-AperiodicTriggerState<br>CSI-AperiodicTriggerState ::=      SEQUENCE {<br>    associatedReportConfigInfoList                SEQUENCE<br>(SIZE(1..maxNrofReportConfigPerAperiodicTrigger))         OF          CSI-<br>AssociatedReportConfigInfo,<br>    ...<br>}<br>CSI-AssociatedReportConfigInfo ::=    SEQUENCE {<br>    reportConfigId                 CSI-ReportConfigId,<br>    resourcesForChannel          CHOICE {<br>       nzp-CSI-RS                SEQUENCE {<br>         resourceSet              INTEGER (1..maxNrofNZP-<br>CSI-RS-ResourceSetsPerConfig),<br>         qcl-info                     SEQUENCE<br>(SIZE(1..maxNrofAP-CSI-RS-ResourcesPerSet)) OF TCI-StateId OPTIONAL --Cond<br>Aperiodic<br>        },<br>       csi-SSB-ResourceSet           INTEGER (1..maxNrofCSI-SSB-<br>ResourceSetsPerConfig)<br>    },<br>       csi-IM-ResourcesForInterference         INTEGER(1..maxNrofCSI-IM-<br>ResourceSetsPerConfig)       OPTIONAL, -- Cond CSI-IM-ForInterference<br>      nzp-CSI-RS-ResourcesForInterference  INTEGER  (1..maxNrofNZP-CSI-RS-<br>ResourceSetsPerConfig)      OPTIONAL, -- Cond NZP-CSI-RS-ForInterference<br>    ...<br>}<br>-- TAG-CSI-APERIODICTRIGGERSTATELIST-STOP<br>-- ASN1STOP<br>CSI-AssociatedReportConfigInfo field descriptions<br>csi-IM-ResourcesForInterference<br>CSI-IM-ResourceSet for interference measurement. Entry number in csi-IM-<br>ResourceSetList in the CSI-ResourceConfig indicated by csi-IM-ResourcesForInterference<br>in the CSI-ReportConfig indicated by reportConfigId above (1 corresponds to the first<br>entry, 2 to the second entry, and so on). The indicated CSI-IM-ResourceSet should have<br>exactly the same number of resources like the NZP-CSI-RS-ResourceSet indicated in nzp-<br>CSI-RS-ResourcesforChannel.<br>csi-SSB-ResourceSet<br>CSI-SSB-ResourceSet for channel measurements. Entry number in csi-SSB-<br>ResourceSetList in the CSI-ResourceConfig indicated by<br>resourcesForChannelMeasurement in the CSI-ReportConfig indicated by reportConfigId<br>above (1 corresponds to the first entry, 2 to the second entry, and so on).<br>nzp-CSI-RS-ResourcesForInterference<br>NZP-CSI-RS-ResourceSet for interference measurement. Entry number in nzp-CSI-RS-<br>ResourceSetList in the CSI-ResourceConfig indicated by nzp-CSI-RS- |

TABLE 35-continued

| CSI-AperiodicTriggerStateList |
| --- |
| ResourcesForInterference in the CSI-ReportConfig indicated by reportConfigId above (1 corresponds to the first entry, 2 to the second entry, and so on). |
| qcl-info |
| List of references to TCI-States for providing the QCL source and QCL type for each NZP-CSI-RS-Resource listed in nzp-CSI-RS-Resources of the NZP-CSI-RS-ResourceSet indicated by nzp-CSI-RS-ResourcesforChannel. Each TCI-StateId refers to the TCI-State which has this value for tci-StateId and is defined in tci-StatesToAddModList in the PDSCH-Config included in the BWP-Downlink corresponding to the serving cell and to the DL BWP to which the resourcesForChannelMeasurement (in the CSI-ReportConfig indicated by reportConfigId above) belong to. First entry in qcl-info-forChannel corresponds to first entry in nzp-CSI-RS-Resources of that NZP-CSI-RS-ResourceSet, second entry in qcl-info-forChannel corresponds to second entry in nzp-CSI-RS-Resources, and so on (see TS 38.214 [8 19], clause 5.2.1.5.1) |
| reportConfigId |
| The reportConfigId of one of the CSI-ReportConfigToAddMod configured in CSI-MeasConfig |
| resourceSet |
| NZP-CSI-RS-ResourceSet for channel measurements. Entry number in nzp-CSI-RS-ResourceSetList in the CSI-ResourceConfig indicated by resourcesForChannelMeasurement in the CSI-ReportConfig indicated by reportConfigId above (1 corresponds to the first entry, 2 to thesecond entry, and so on). |

| Conditional Presence | Explanation |
| --- | --- |
| Aperiodic | The field is mandatory present if the NZP-CSI-RS-Resources in the associated resourceSet have the resourceType aperiodic. The field is absent otherwise. |
| CSI-IM-ForInterference | This field is optional need M if the CSI-ReportConfig identified by reportConfigId is configured with csi-IM-ResourcesForInterference; otherwise it is absent. |
| NZP-CSI-RS-ForInterference | This field is optional need M if the CSI-ReportConfig identified by reportConfigId is configured with nzp-CSI-RS-ResourcesForInterference; otherwise it is absent. |

The CSI-SemiPersistentOnPUSCH-TriggerStateList IE is used to configure the UE with list of trigger states for semi-persistent reporting of channel state information on L1. See also TS 38.214 [19], clause 5.2.
CSI-SemiPersistentOnPUSCH-TriggerStateList Information Element

TABLE 36

| CSI-SemiPersistentOnPUSCH-TriggerStateList |
| --- |

```
-- ASN1START
-- TAG-CSI-SEMIPERSISTENTONPUSCHTRIGGERSTATELIST-START
CSI-SemiPersistentOnPUSCH-TriggerStateList ::=    SEQUENCE(SIZE (1..maxNrOfSemiPersistentPUSCH-Triggers)) OF
CSI-SemiPersistentOnPUSCH-TriggerState
CSI-SeniPersistentOnPUSCH-TriggerState ::=           SEQUENCE {
    associaredReportConfigInfo                       CSI-ReportConfigId,
    ...
}
-- TAG-CSI-SEMIPERSISTENTONPUSCHTRIGGERSTATELIST-STOP
-- ASN1STOP
```

With respect to the aforementioned CSI report settings (CSI-ReportConfig), each report setting of CSI-ReportConfig may be associated with one downlink (DL) bandwidth part identified by a higher-layer parameter bandwidth part identifier (bwp-id) given by a CSI resource setting, CSI-ResourceConfig, associated with the corresponding report setting. As a time domain report operation for each report setting of CSI-ReportConfig, "aperiodic", "semi-persistent", and "periodic" schemes may be supported, which may be configured for the terminal by the base station via parameter reportConfigType configured from a higher layer. A semi-persistent CSI reporting method may support a "PUCCH-based semi-persistent (semi-PersistentOnPUCCH)" method and a "PUSCH-based semi-persistent (semi-PersistentOn- PUSCH)" method. In the periodic or semi-persistent CSI report method, a PUCCH or PUSCH resource in which CSI is to be transmitted may be configured for the terminal by the base station via higher-layer signaling. The periodicity and slot offset of a PUCCH or PUSCH resource in which CSI is to be transmitted may be given by a numerology of an uplink (UL) bandwidth part configured to transmit CSI reporting. In the aperiodic CSI report method, a PUSCH resource in which CSI is to be transmitted may be scheduled for the terminal by the base station via L1 signaling (e.g., aforementioned DCI format 0_1).

With respect to the aforementioned CSI resource setting (CSI-ResourceConfig), each CSI resource setting of CSI-ReportConfig may include S (>1) CSI resource sets (given via higher-layer parameter csi-RS-ResourceSetList). A CSI resource set list may include a non-zero power (NZP) CSI-RS resource set and an SS/PBCH block set or a CSI-interference measurement (CSI-IM) resource set. Each CSI resource setting may be positioned in a downlink (DL) bandwidth part identified by higher-layer parameter bwp-id and may be connected to a CSI reporting setting in the same downlink bandwidth part. A time domain operation of a CSI-RS resource in CSI resource setting may be configured to be one of "aperiodic", "periodic", or "semi-persistent" from higher-layer parameter resourceType. With respect to periodic or semi-persistent CSI resource setting, the number of CSI-RS resource sets may be limited to S (S=1), and the configured periodicity and slot offset may be given based on the numerology of the downlink bandwidth part identified by bwp-id. One or more CSI resource settings for channel or interference measurement may be configured for the terminal by the base station via higher-layer signaling, and may include the following CSI resources.

CSI-IM resource for interference measurement

NZP CSI-RS resource for interference measurement

NZP CSI-RS resource for channel measurement

With respect to CSI-RS resource sets associated with resource setting in which higher-layer parameter resource-Type is configured to be "aperiodic", "periodic", or "semi-persistent", a trigger state of CSI reporting setting having reportType configured to be "aperiodic", and resource setting for channel or interference measurement on one or multiple component cells (CCs) may be configured via higher-layer parameter CSI-AperiodicTriggerStateList.

Aperiodic CSI reporting of the terminal may be performed using a PUSCH, periodic CSI reporting may be performed using a PUCCH, and semi-persistent CSI reporting may be performed using a PUSCH when triggered or activated via DCI, and may be performed using a PUCCH after activation is performed by a MAC control element (MAC CE). As described above, CSI resource setting may also be configured to aperiodic, periodic, and semi-persistent. A combination of CSI reporting setting and CSI resource setting may be supported based on [Table 37] below.

If all bits in a CSI request field are 0, this may indicate that CSI reporting is not requested.

If the number M of configured CSI trigger states in CSI-AperiodicTriggerStateLite is larger than $2NTs-1$, M CSI trigger states may be mapped to $2NTs-1$ trigger states according to a predefined mapping relation, and one trigger state among the $2NTs-1$ trigger states may be indicated by a CSI request field.

If the number M of configured CSI trigger states in CSI-AperiodicTriggerStateLite is less than or equal to $2NTs-1$, one of the M CSI trigger states may be indicated by a CSI request field.

[Table 38] below shows an example of a relationship between a CSI request indicator and a CSI trigger state that may be indicated by a corresponding indicator.

TABLE 38

| CSI request field | CSI trigger state | CSI-ReportConfigId | CSI-ResourceConfigId |
|---|---|---|---|
| 00 | no CSI request | N/A | N/A |
| 01 | CSI trigger state#1 | CSI report#1 CSI report#2 | CSI resource#1, CSI resource#2 |
| 10 | CSI trigger state#2 | CSI report#3 | CSI resource#3 |
| 11 | CSI trigger state#3 | CSI report#4 | CSI resource#4 |

A terminal may measure a CSI resource in a CSI trigger state triggered by a CSI request field, and then generate CSI (including at least one of the aforementioned CQI, PMI, CRI, SSBRI, LI, RI, or L1-RSRP). The terminal may transmit acquired CSI by using a PUSCH scheduled via corresponding DCI format 0_1. If one bit corresponding to an uplink data indicator (UL-SCH indicator) in DCI format 0_1 indicates "1", the terminal may multiplex the acquired CSI and uplink data (UL-SCH) to a PUSCH resource

TABLE 37

Table 5.2.1.4-1: Triggering/Activation of CSI Reporting for the possible CSI-RS Configurations.

| CSI-RS Configuration | Periodic CSI Reporting | Semi-Persistent CSI Reporting | Aperiodic CSI Reporting |
|---|---|---|---|
| Periodic CSI-RS | No dynamic triggering activation | For reporting on PUCCH, the UE receives an activation command [10, TS 38.321]; for reporting on PUSCH, the UE receives triggering on DCI | Triggered by DCI; additionally, activation command [10, TS 38.321] possible as defined in Subclause 5.2.1.5.1. |
| Semi-Persistent CSI-RS | Not Supported | For reporting on PUCCH, the UE receives an activation command [10, TS 38.321]; for reporting on PUSCH, the UE receives triggering on DCI | Triggered by DCI; additionally, activation command [10, TS 38.321] possible as defined in Subclause 5.2.1.5.1. |
| Aperiodic CSI-RS | Not Supported | Not Supported | Triggered by DCI; additionally, activation command [10, TS 38.323] possible as defined in Subclause 5.2.1.5.1. |

Aperiodic CSI reporting may be triggered by a "CSI request" field in DCI format 0_1 described above, which corresponds to scheduling DCI for a PUSCH. The terminal may monitor a PDCCH, may acquire DCI format 0_1, and may acquire scheduling information of a PUSCH and a CSI request indicator. A CSI request indicator may be configured to have NTS(=0, 1, 2, 3, 4, 5, or 6) bits, and may be determined by higher-layer signaling of reportTriggerSize. One trigger state among one or multiple aperiodic CSI report trigger states which may be configured via higher-layer signaling (CSI-AperiodicTriggerStateList) may be triggered by a CSI request indicator.

scheduled by DCI format 0_1 so as to transmit the same. If one bit corresponding to the uplink data indicator (UL-SCH indicator) in DCI format 0_1 indicates "0", the terminal may map only CSI to the PUSCH resource scheduled by DCI format 0_1 without uplink data (UL-SCH) so as to transmit the same.

Figure 16:
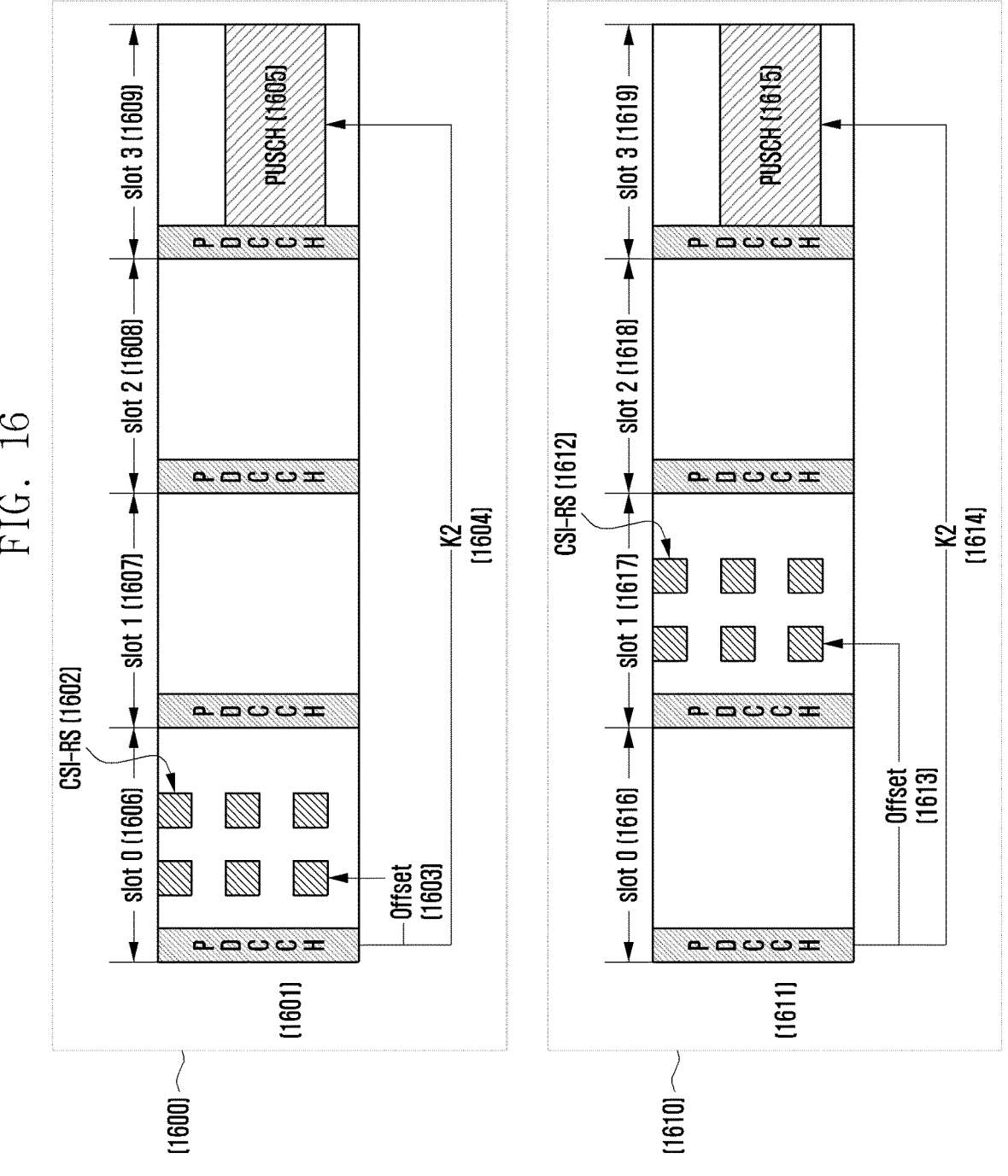
FIG. 16 shows diagrams illustrating examples of an aperiodic channel state information (CSI) reporting method according to an embodiment of the disclosure.

FIG. 16 is a diagram illustrating an example of an aperiodic CSI reporting method.

In an example 1600 of FIG. 16, a terminal may acquire DCI format 0_1 by monitoring a PDCCH 1601, and may acquire scheduling information and CSI request information for a PUSCH 1605 therefrom. The terminal may acquire resource information of a CSI-RS 1602 to be measured, from a received CSI request indicator. The terminal may determine a time point at which the terminal needs to measure a resource of the CSI-RS 1602, based on a time point at which DCI format 0_1 is received, and a parameter for an offset (e.g., aforementioned aperiodicTriggeringOffset) in a CSI resource set configuration (e.g., an NZP CSI-RS resource set configuration (NZP-CSI-RS-ResourceSet)). More specifically, the terminal may be configured with offset value X of the parameter of aperiodicTriggeringOffset in an NZP-CSI-RS resource set configuration from a base station via higher-layer signaling, and the configured offset value X may refer to an offset between a slot in which DCI triggering aperiodic CSI reporting is received, and a slot in which a CSI-RS resource is transmitted. For example, the parameter value of aperiodicTriggeringOffset and offset value X may have a mapping relation as shown in Table 39 below.

TABLE 39

| aperiodicTriggeringOffset | Offset X |
|---|---|
| 0 | 0 slot |
| 1 | 1 slot |
| 2 | 2 slots |
| 3 | 3 slots |
| 4 | 4 slots |
| 5 | 16 slots |
| 6 | 24 slots |

The example 1600 of FIG. 16 shows an example in which the aforementioned offset value X is configured to be 0 (X=0). In this case, the terminal may receive the CSI-RS 1602 in a slot (corresponding to slot 0 1606 of FIG. 16) in which DCI format 01 that triggers aperiodic CSI reporting is received, and may report CSI information, which is measured based on the received CSI-RS, to the base station via the PUSCH 1605. The terminal may acquire, from DCI format 0_1, scheduling information (information corresponding to each field of DCI format 0_1 described above)

on the PUSCH 1605 for CSI reporting. For example, in DCI format 0_9, the terminal may acquire information on a slot in which the PUSCH 1605 is to be transmitted, from time domain resource allocation information for the PUSCH 1605 described above. In the example 1600 of FIG. 16, the terminal acquires 3 as a K2 value corresponding to a slot offset value for PDCCH-to-PUSCH, and accordingly, the PUSCH 1605 may be transmitted in slot 3 1609, which is spaced 3 slots apart from slot 0 1606, i.e., a time point at which the PDCCH 1601 has been received.

In an example 1610 of FIG. 16, the terminal may acquire DCI format 0_1 by monitoring a PDCCH 1611, and may acquire scheduling information and CSI request information for a PUSCH 1615 therefrom. The terminal may acquire resource information of a CSI-RS 1612 to be measured, from a received CSI request indicator. In the example 1610 of FIG. 16, offset value X for CSI-RS described above is configured to be 1 (X=1). In this case, the terminal may receive the CSI-RS 1612 in a slot (corresponding to slot 0 1616 of FIG. 16) in which DCI format 01 that triggers aperiodic CSI reporting is received, and may report CSI information, which is measured based on the received CSI-RS, to the base station via the PUSCH 1615.

The aperiodic CSI reporting may include at least one of or both CSI part 1 and CSI part 2, and in case that the aperiodic CSI reporting is transmitted via a PUSCH, the aperiodic CSI reporting may be multiplexed to a transport block. After a CRC is inserted into an input bit of aperiodic CSI for multiplexing, encoding and rate matching may be performed, and transmission may be performed by mapping to resource elements within the PUSCH in a specific pattern. The CRC insertion may be omitted depending on a coding method or a length of the input bit. The number of modulation symbols, which is calculated for rate matching during multiplexing of CSI Part 1 or CSI part 2 included in the aperiodic CSI reporting, may be calculated as shown in [Table 40].

TABLE 40

For CSI part 1 transmission on PUSCH not using repetition type B with UL-SCH, the number of coded modulation symbols per layer for CSI part 1 transmission, denoted as $Q_{CSI\text{-}part1}'$, is determined as follows:

$$Q_{CSI-1}' = \min \left\{ \left\lceil \frac{(O_{CSI-1} + L_{CSI-1}) \cdot \beta_{offset}^{PUSCH} \cdot \sum_{l=0}^{N_{symb,all}^{PUSCH}-1} M_{sc}^{UCI}(l)}{\sum_{r=0}^{C_{UL-SCH}-1} K_r} \right\rceil, \right.$$

$$\left. \left\lceil \alpha \cdot \sum_{l=0}^{N_{symb,all}^{PUSCH}-1} M_{sc}^{UCI}(l) \right\rceil - Q_{ACK/CG-UCI}' \right\}$$

. . .

For CSI part 1 transmission on an actual repetition of a PUSCH with repetition Type B with UL-SCH, the number of coded modulation symbols per layer for CSI part I transmission, denoted as $Q_{CSI\text{-}part1}'$, is determined as follows:

$$Q_{CSI-1}' = \min \left\{ \left\lceil \frac{(O_{CSI-1} + L_{CSI-1}) \cdot \beta_{offset}^{PUSCH} \cdot \sum_{l=0}^{N_{symb,nominal}^{PUSCH}-1} M_{sc,nominal}^{UCI}(l)}{\sum_{r=0}^{C_{UL-SCH}-1} K_r} \right\rceil, \right.$$

$$\left\lceil \alpha \cdot \sum_{l=0}^{N_{symb,nominal}^{PUSCH}-1} M_{sc,nominal}^{UCI}(l) \right\rceil - Q_{ACK/CG-UCI}',$$

TABLE 40-continued $$\sum_{l=0}^{N_{symb,nominal}^{PUSCH}-1} M_{sc,actual}^{UCI}(l) - Q'_{ACK/CG-UCI} \Biggr\}$$

. . .

For CSI part 1 transmission on PUSCH without UL-SCH, the number of coded modulation symbols per layer for CSI part 1 transmission, denoted as $Q_{CSI-part1}'$, is determined as follows:
if there is CSI part 2 to be transmitted on the PUSCH, $$Q'_{CSI-1} = \min \Biggl\{ \left\lceil \frac{(O_{CSI-1} + L_{CSI-1}) \cdot \beta_{offset}^{PUSCH}}{R \cdot Q_m} \right\rceil, \ \sum_{l=0}^{N_{symb,all}^{PUSCH}-1} M_{sc}^{UCI}(l) - Q'_{ACK} \Biggr\}$$

else $$Q'_{CSI-1} = \sum_{l=0}^{N_{symb,all}^{PUSCH}-1} M_{sc}^{UCI}(l) - Q'_{ACK}$$

end if

. . .

For CSI part 2 transmission on PUSCH not using repetition type B with UL-SCH, the number of coded modulation symbols per layer for CSI part 2 transmission, denoted as $Q_{CSI-part2}'$, is determined as follows:

$$Q'_{CSI-2} = \min \Biggl\{ \left\lceil \frac{(O_{CSI-2} + L_{CSI-2}) \cdot \beta_{offset}^{PUSCH} \cdot \sum_{l=0}^{N_{symb,all}^{PUSCH}-1} M_{sc}^{UCI}(l)}{\sum_{r=0}^{C_{UL-SCH}-1} K_r} \right\rceil,$$

$$\left\lceil \alpha \cdot \sum_{l=0}^{N_{symb,all}^{PUSCH}-1} M_{sc}^{UCI}(l) \right\rceil - Q'_{ACK/CG-UCI} - Q'_{CSI-1} \Biggr\}$$

For CSI part 2 transmission on an actual repetition of a PUSCH with repetition Type B with UL-SCH, the number of coded modulation symbols per layer for CSI part 2 transmission, denoted as $Q_{CSI-part2}'$, is determined as follows:

$$Q'_{CSI-2} = \min \Biggl\{ \left\lceil \frac{(O_{CSI-2} + L_{CSI-2}) \cdot \beta_{offset}^{PUSCH} \cdot \sum_{l=0}^{N_{symb,nominal}^{PUSCH}-1} M_{sc,nominal}^{UCI}(l)}{\sum_{r=0}^{C_{UL-SCH}-1} K_r} \right\rceil,$$

$$\left\lceil \alpha \cdot \sum_{l=0}^{N_{symb,nominal}^{PUSCH}-1} M_{sc,nominal}^{UCI}(l) \right\rceil - Q'_{ACK/CG-UCI} - Q'_{CSI-1},$$

$$\sum_{l=0}^{N_{symb,actual}^{PUSCH}-1} M_{sc,actual}^{UCI}(l) - Q'_{ACK/CG-UCI} - Q'_{CSI-1} \Biggr\}$$

. . .

For CSI part 2 transmission on PUSCH without UL-SCH, the number of coded modulation symbols per layer for CSI part 2 transmission, denoted as $Q_{CSI-part2}'$, is determined as follows:

$$Q'_{CSI-2} = \sum_{l=0}^{N_{symb,all}^{PUSCH}-1} M_{sc}^{UCI}(l) - Q'_{ACK} - Q'_{CSI-1}$$

Specifically, for repeated PUSCH transmission types A and B, the terminal may multiplex the aperiodic CSI reporting only to a first repeated transmission among repeated PUSCH transmissions, so as to transmit the same. This is because the multiplexed aperiodic CSI reporting information is encoded in a polar code scheme, and in this case, in order to be multiplexed to multiple PUSCH repetitions, respective PUSCH repetitions need to have the same frequency and time resource allocation, and since respective actual repetitions may have different OFDM symbol lengths particularly for PUSCH repetition type B, the aperiodic CSI reporting may be transmitted by being multiplexed to only a first PUSCH repetition.

In addition, for repeated PUSCH transmission type B, if the terminal receives DCI for activation of semi-persistent CSI reporting or scheduling of aperiodic CSI reporting without scheduling for a transport block, a value of nominal repetition may be assumed to be 1 even if the number of repeated PUSCH transmissions, which is configured via higher-layer signaling, is greater than 1. In addition, if the aperiodic or semi-persistent CSI reporting is scheduled or activated without scheduling for the transport block, based on repeated PUSCH transmission type B, the terminal may expect that a first nominal repetition is identical to a first actual repetition. With respect to the PUSCH transmitted while including semi-persistent CSI, based on repeated PUSCH transmission type B, without scheduling for DCI after the semi-persistent CSI reporting has been activated via the DCI, if the first nominal repetition is different from the first actual repetition, the transmission for the first nominal repetition may be ignored.

[Relating to UE Capability Reporting]

In LTE and NR, in a state where a terminal is connected to a serving base station, the terminal may perform a procedure of reporting capability supported thereby to the base station. In the description below, this is referred to as a UE capability report.

The base station may transfer, to a connected terminal, a UE capability enquiry message for requesting capability reporting. The message may include a UE capability request for each radio access technology (RAT) type of the base station. The request for each RAT type may include supported frequency band combination information and the like. In addition, for the UE capability enquiry message, UE capability for each RAT type may be requested multiple times via one RRC message container transmitted by the base station, or the base station may perform transmission to the terminal by including, multiple times, the UE capability enquiry message including the UE capability for each RAT type. That is, a UE capability enquiry may be repeated multiple times within one message, and the terminal may configure a corresponding UE capability information message and report the same multiple times. In the next-generation mobile communication system, a UE capability request for multi-RAT dual connectivity (MR-DC) including NR, LTE, and E-UTRA-NR dual connectivity (EN-DC) may be made. The UE capability enquiry message is generally transmitted initially after the terminal is connected to the base station, but may be requested by the base station under any conditions when necessary.

As described above, the terminal having received, from the base station, a request for a UE capability report configures UE capability according to RAT type and band information requested from the base station. Hereinafter, a method of configuring UE capability by the terminal in the NR system is described.

1. If the terminal receives a list of LTE and/or NR bands via a UE capability request from the base station, the terminal configures a band combination (BC) for EN-DC and NR stand-alone (SA). That is, the terminal configures a candidate list of BCs for EN-DC and NR SA, based on bands requested from the base station via FreqBandList. In addition, the bands have priorities in the order described in FreqBandList.

2. If the base station requests UE capability reporting by setting an "cutra-nr-only" flag or an "eutra" flag, the terminal completely removes NR SA BCs from the configured candidate list of BCs. This may occur only when the LTE base station (eNB) requests "eutra" capability.

3. Thereafter, the terminal removes fallback BCs from the candidate list of BCs configured in the operation above. Here, the fallback BC refers to a BC obtainable by removing a band corresponding to at least one SCell from any BC, and since a BC before removal of the band corresponding to at least one SCell is already able to cover the fallback BC, this can be omitted. This operation is also applied to MR-DC, i.e., LTE bands. The remaining BCs after this operation constitute a final "candidate BC list".

4. The terminal selects BCs to be reported by selecting BCs conforming to the requested RAT type from the final "candidate BC list". In this operation, the terminal configures supportedBandCombinationList in a predetermined order. That is, the terminal configures the BCs and UE capability to be reported according to a preconfigured rat-Type order (nr→eutra-nr→eutra). In addition, the terminal configures featureSetCombination for configured supportedBandCombinationList and configures a list of "candidate feature set combinations" from the candidate BC list from which the list of fallback BCs (including equal or lower-level capabilities) has been removed. The "candidate feature set combination" may include feature set combinations for both NR and UTRA-NR BC, and may be obtained from feature set combinations of UE-NR-capabilities and UE-MRDC-capabilities containers.

5. If the requested rat Type is eutra-nr and affects, featureSetCombinations is included in both of two containers of UE-MRDC-Capabilities and UE-NR-Capabilities. However, the feature set of NR is included only in UE-NR-Capabilities.

After the UE capability is configured, the terminal transfers a UE capability information message including the UE capability to the base station. The base station performs appropriate scheduling and transmission or reception management with respect to the corresponding terminal at a later time, based on the UE capability received from the terminal.

[Relating to CA/DC]

Figure 17:
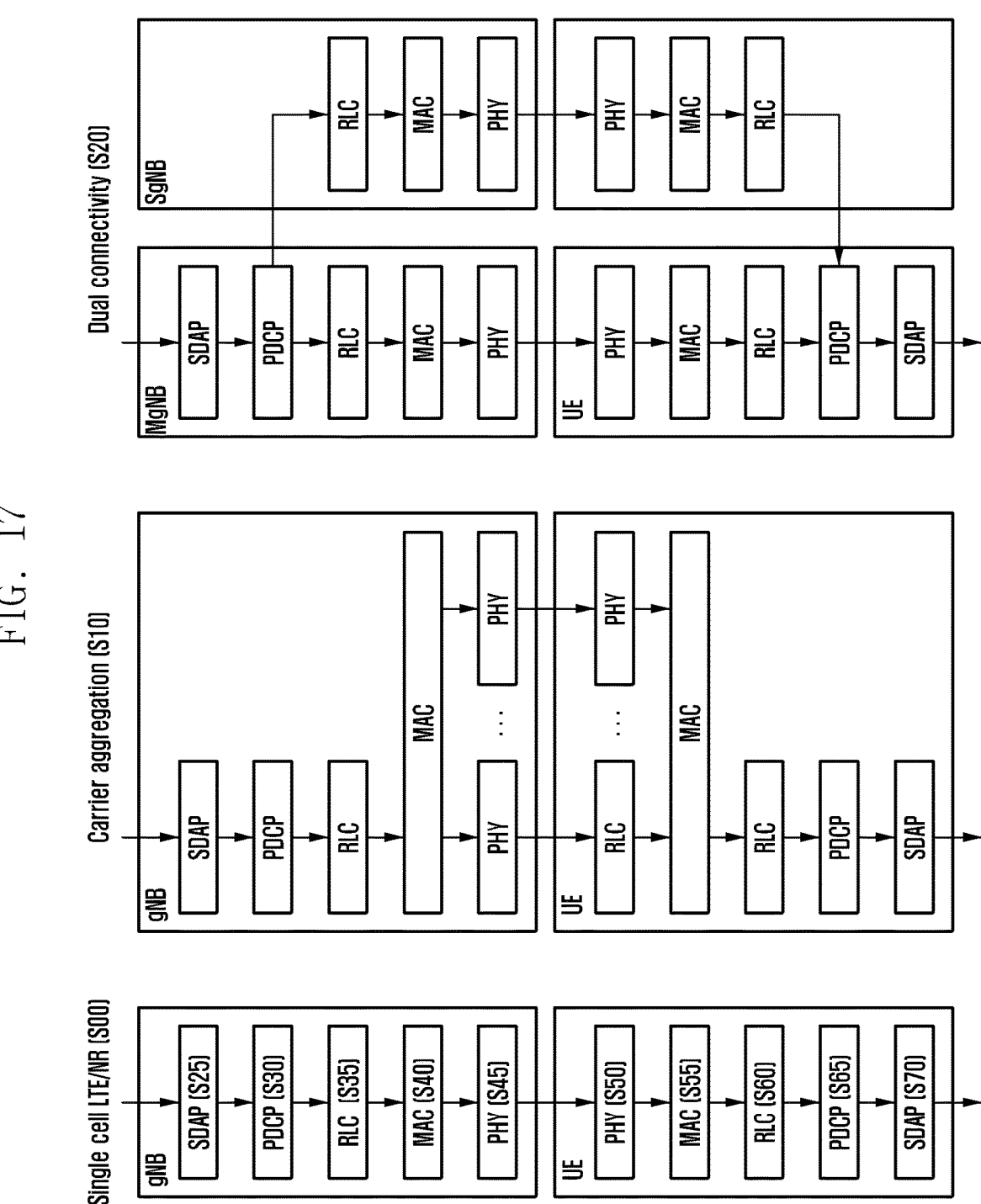
FIG. 17 is a diagram illustrating radio protocol structures of a terminal and a base station in single cell, carrier aggregation (CA), and dual connectivity (DC) situations in the wireless communication system according to an embodiment of the disclosure.

FIG. 17 is a diagram illustrating a radio protocol structure of a base station and a terminal in single cell, carrier aggregation, and dual connectivity situations according to an embodiment of the disclosure.

Referring to FIG. 17, radio protocols of a next-generation mobile communication system include NR service data adaptation protocols (SDAP) S25 and S70, NR packet data convergence protocols (PDCP) S30 and S65, NR radio link controls (RLC) S35 and S60, and NR medium access controls (MAC) S40 and S55 layers in a terminal and an NR base station, respectively.

Main functions of the NR SDAPs S25 and S70 may include some of the following functions.

User data transfer function (transfer of user plane data)

Function of mapping a QoS flow and a data bearer for an uplink and a downlink (mapping between a QoS flow and a DRB for both DL and UL)

Function of marking a QoS flow ID in an uplink and a downlink (marking QoS flow ID in both DL and UL packets)

Function of mapping reflective QoS flows to data bearers for uplink SDAP PDUs (reflective QoS flow to DRB mapping for the UL SDAP PDUs)

With respect to an SDAP layer device, the terminal may be configured, via an RRC message, whether to use a header of the SDAP layer device or whether to use a function of the SDAP layer device for each PDCP layer device, for each bearer, or for each logical channel, and if the SDAP header is configured, a NAS QoS reflection configuration 1-bit indicator (NAS reflective QoS) and an AS QoS reflection configuration 1-bit indicator (AS reflective QoS) in the SDAP header may indicate the terminal to update or reconfigure mapping information for data bearers and QoS flows in uplink and downlink. The SDAP header may include QoS flow ID information indicating QoS. The QoS information may be used as a data processing priority, scheduling information, etc. to support a smooth service.

Main functions of the NR PDCPs S30 and S65 may include some of the following functions.

Header compression and decompression function (ROHC only)

User data transmission function (transfer of user data)

Sequential delivery function (in-sequence delivery of upper layer PDUs)

Non-sequential delivery function (out-of-sequence delivery of upper layer PDUs)

Reordering function (PDCP PDU reordering for reception)

Duplicate detection function (duplicate detection of lower layer SDUs)

Retransmission function (retransmission of PDCP SDUs)

Encryption and decryption function (ciphering and deciphering)

Timer-based SDU discard function (timer-based SDU discard in uplink)

In the above, the reordering function of the NR PDCP device refers to a function of reordering PDCP PDUs received from a lower layer in order based on a PDCP sequence number (SN), and may include a function of transferring data to a higher layer according to the reordered sequence. Alternatively, the reordering function of the NR PDCP device may include a function of direct transfer without considering a sequence, may include a function of reordering the sequence to record lost PDCP PDUs, may include a function of reporting states of the lost PDCP PDUs to a transmission side, and may include a function of requesting retransmission of the lost PDCP PDUs.

Main functions of the NR RLCs S35 and S60 may include some of the following functions.

Data transmission function (transfer of upper layer PDUs)

Sequential delivery function (in-sequence delivery of upper layer PDUs)

Non-sequential delivery function (out-of-sequence delivery of upper layer PDUs)

ARQ function (error correction through ARQ)

Concatenation, segmentation, and reassembly function (concatenation, segmentation and reassembly of RLC SDUs)

Re-segmentation function (re-segmentation of RLC data PDUs)

Reordering function (reordering of RLC data PDUs)

Duplicate detection function

Error detection function (protocol error detection)

RLC SDU discard function

RLC re-establishment function

In the above, the in-sequence delivery function of the NR RLC device may refer to a function of sequentially transferring, to a higher layer, RLC SDUs received from a lower layer. The in-sequence delivery function of the NR RLC device may include a function of, when originally one RLC SDU is segmented into multiple RLC SDUs and then received, reassembling and transferring the received RLC SDUs, may include a function of reordering the received RLC PDUs according to an RLC sequence number (SN) or a PDCP sequence number (SN), may include a function of reordering a sequence and recording lost RLC PDUs, may include a function of reporting states of the lost RLC PDUs to a transmission side, and may include a function of requesting retransmission of the lost RLC PDUs. The in-sequence delivery function of the NR RLC device may include a function of, when there is a lost RLC SDU, sequentially transferring only RLC SDUs before the lost RLC SDU to a higher layer, or may include a function of, even if there is a lost RLC SDU, if a predetermined timer expires, sequentially transferring, to the higher layer, all the RLC SDUs received before the timer starts. Alternatively, the in-sequence delivery function of the NR RLC device may include a function of, even if there is a lost RLC SDU, if a predetermined timer expires, sequentially transferring all currently received RLC SDUs to the higher layer. In the above, the RLC PDUs may be processed in the order of reception thereof (in the order of arrival regardless of the order of the sequence numbers or sequence numbers) and may be delivered to the PDCP device regardless of the order (out-of-sequence delivery). In the case of segments, segments stored in a buffer or to be received at a later time may be received, reconfigured into one complete RLC PDU, processed, and then may be delivered to the PDCP device. The NR RLC layer may not include a concatenation function, and the function may be performed in an NR MAC layer or may be replaced with a multiplexing function of the NR MAC layer.

In the above, the non-sequential transfer function (out-of-sequence delivery) of the NR RLC device refers to a function of transferring RLC SDUs received from a lower layer to an immediate upper layer regardless of the order, may include a function of, when originally one RLC SDU is divided into a plurality of RLC SDUs and received, reassembling and transferring the received RLC SDUs, and may include a function of storing the RLC SN or PDCP SN of the received RLC PDUs, arranging the order thereof, and recording lost RLC PDUs.

The NR MACs S40 and S55 may be connected to multiple NR RLC layer devices included in one terminal, and main functions of the NR MACs may include some of the following functions.

Mapping function (mapping between logical channels and transport channels)

Multiplexing and demultiplexing function (multiplexing/demultiplexing of MAC SDUs)

Scheduling information reporting function

HARQ function (error correction through HARQ)

Function of priority handling between logical channels (priority handling between logical channels of one UE)

Function of priority handling between terminals (priority handling between UEs by means of dynamic scheduling)

MBMS service identification function

Transport format selection function

Padding function

The NR PHY layers S45 and S50 may perform channel-coding and modulation of higher layer data, make the channel-coded and modulated higher layer data into OFDM symbols, and transmit the OFDM symbols via a radio channel, or may perform demodulation and channel-decoding of the OFDM symbols received through the radio channel and transfer the same to the higher layer.

The detailed structure of the radio protocol structure may be variously changed according to a carrier (or cell) operating method. For example, if the base station transmits, based on a single carrier (or cell), data to the terminal, the base station and the terminal use a protocol structure having a single structure for each layer, as shown in S00. On the other hand, when the base station transmits data to the terminal, based on carrier aggregation (CA) using multiple carriers in a single TRP, the base station and the terminal use a protocol structure in which up to the RLC has a single structure but the PHY layer is multiplexed via the MAC layer, as shown in S10. As another example, when the base station transmits data to the terminal, based on dual connectivity (DC) using multiple carriers in multiple TRPs, the base station and the terminal use a protocol structure in which up to the RLC has a single structure but the PHY layer is multiplexed via the MAC layer, as shown in S20.

Referring to the aforementioned PDCCH and beam configuration-related descriptions, PDCCH repetitive transmission is not supported currently in Rel-15 and Rel-16 NR, and it is thus difficult to achieve required reliability in a scenario requiring high reliability, such as URLLC. The disclosure provides a method of repeated PDCCH transmission via multiple transmission points (TRPs) so to improve PDCCH reception reliability of a terminal. Specific methods will be described in detail in the following embodiments.

Hereinafter, embodiments of the disclosure will be described in detail with the accompanying drawings. Contents of the disclosure are applicable in FDD and TDD systems. Hereinafter, in the disclosure, higher signaling (or higher-layer signaling) is a method of transferring a signal from a base station to a terminal by using a physical layer downlink data channel or transferring a signal from a terminal to a base station by using a physical layer uplink data channel, and may be referred to as RRC signaling, PDCP signaling, or a medium access control (MAC) control element (MAC CE).

Hereinafter, in the disclosure, in determining whether to apply cooperative communication, it is possible for a terminal to use various methods, in which PDCCH(s) for assignment of a PDSCH to which the cooperative communication is applied has a specific format, PDCCH(s) for assignment of a PDSCH to which the cooperative communication is applied includes a specific indicator indicating whether the cooperative communication is applied, PDCCH(s) for assignment of a PDSCH to which the cooperative communication is applied is scrambled by a specific RNTI, applying of the cooperative communication in a specific section indicated by a higher layer is assumed, or the like. For convenience of description, a case in which a terminal receives a PDSCH to which cooperative communication has been applied based on conditions similar to the above will be referred to as a non-coherent joint transmission (NC-JT) case.

Hereinafter, in the disclosure, determination of the priority between A and B may be mentioned in various ways, such as selecting one having a higher priority according to a predetermined priority rule so as to perform an operation corresponding thereto, or omitting or dropping an operation having a lower priority.

Hereinafter, in the disclosure, descriptions of the examples will be provided via multiple embodiments, but these are not independent of each other, and it is possible that one or more embodiments are applied simultaneously or in combination.

[Related to NC-JT]

According to an embodiment of the disclosure, non-coherent joint transmission (NC-JT) may be used for the terminal to receive PDSCHs from multiple TRPs.

Unlike the conventional system, the 5G wireless communication system can support not only a service requiring a high transmission rate, but also a service having a very short transmission delay and a service requiring a high connection density. In a wireless communication network including multiple cells, transmission and reception points (TRPs), or beams, cooperative communication (coordinated transmission) between the respective cells, TRPs, or/and beams may satisfy various service requirements by enhancing the strength of a signal received by a terminal or efficiently performing interference control between the respective cells, TRPs, or/and beams.

Joint transmission (JT) is a representative transmission scheme for the aforementioned cooperative communication, and is a scheme for increasing the strength or throughput of a signal received by a terminal, by transmitting the signal to one terminal via multiple different cells, TRPs, and/or beams. In this case, channels between the terminal and the respective cells, TRPs, and/or beams may have significantly different characteristics, and in particular, non-coherent joint transmission (NC-JT) supporting non-coherent precoding between the respective cells, TRPs, and/or beams may require individual precoding, MCS, resource allocation, TCI indication, etc. according to a channel characteristic for each link between the terminal and the respective cells, TRPs, and/or beams.

The aforementioned NC-JT transmission may be applied to at least one channel among a downlink data channel (physical downlink shared channel (PDSCH)), a downlink control channel (physical downlink control channel (PDCCH)), an uplink data channel (physical uplink shared channel (PUSCH)), and an uplink control channel (physical uplink control channel (PUCCH)). During PDSCH transmission, transmission information, such as precoding, MCS, resource allocation, and TCI, is indicated via DL DCI, and for NC-JT transmission, the transmission information should be independently indicated for each cell, TRP, and/or beam. This becomes a major factor in increasing a payload required for DL DCI transmission, which may adversely affect reception performance of a PDCCH which transmits DCI. Therefore, in order to support JT of a PDSCH, it is necessary to carefully design tradeoff between the amount of DCI information and control information reception performance.

Figure 18:
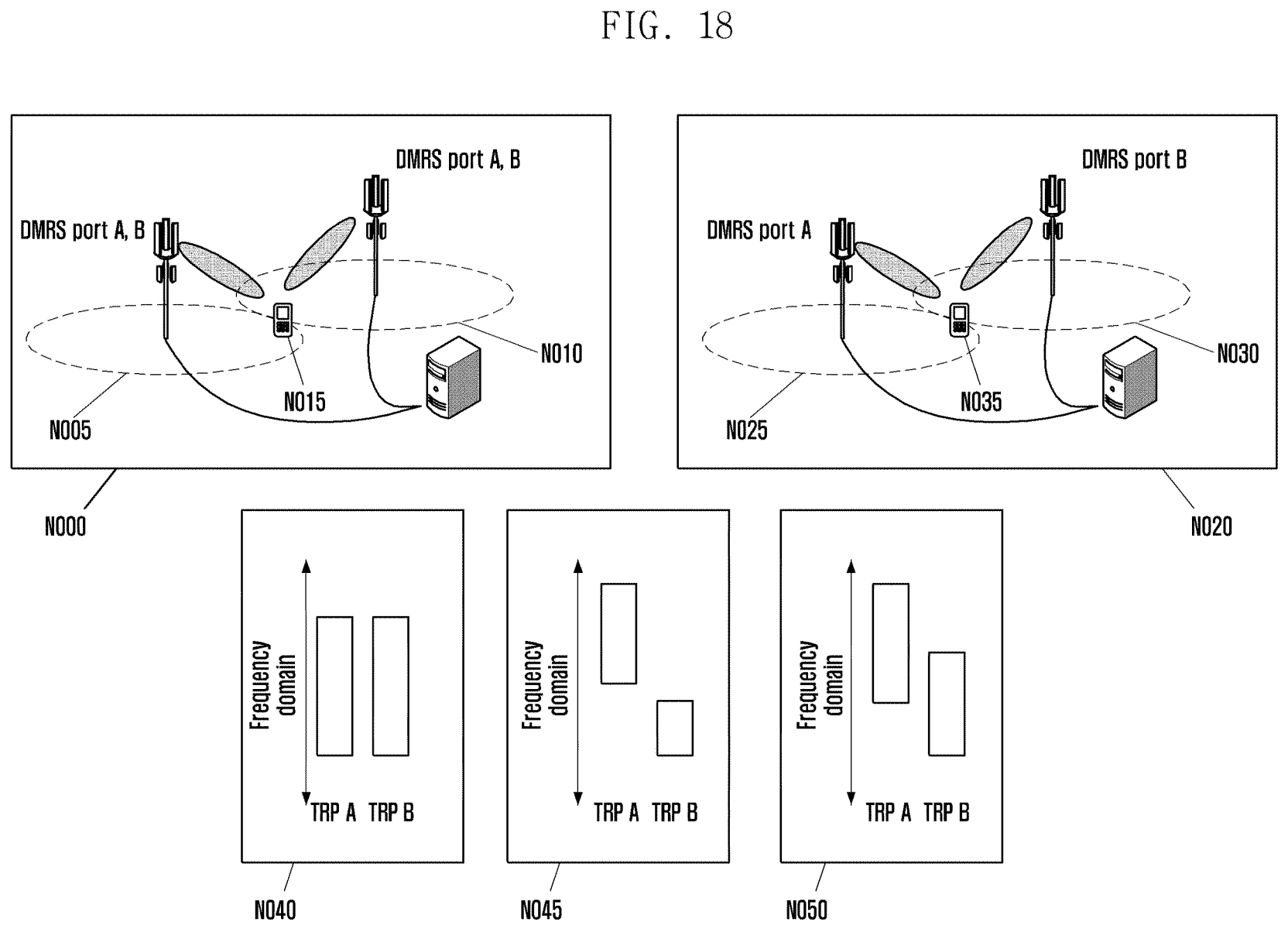

FIG. 18 is a diagram illustrating an example of an antenna port configuration and resource allocation for PDSCH transmission using cooperative communication in the wireless communication system according to an embodiment of the disclosure.

Referring to FIG. 18, an example for PDSCH transmission is described for each joint transmission (JT) scheme, and examples for radio resource allocation for each TRP are illustrated.

Referring to FIG. 18, an example N000 for coherent joint transmission (C-JT) supporting coherent precoding between respective cells, TRPs, or/and beams is illustrated.

For C-JT, TRP A N005 and TRP B N010 transmit single data (PDSCH) to a terminal N015, and joint precoding may be performed in multiple TRPs. This may indicate that DMRSs are transmitted through identical DMRS ports in order for TRP A N005 and TRP B N010 to transmit the same PDSCH. For example, TRP A N005 and TRP B N010 may transmit DRMSs to the terminal through DMRS port A and DMRS port B, respectively. In this case, the terminal may receive one piece of DCI information for reception of one PDSCH demodulated based on the DMRSs transmitted through DMRS port A and DMRS port B.

FIG. 18 shows an example N020 of non-coherent joint transmission (NC-JT) supporting non-coherent precoding between respective cells, TRPs, and/or beams for PDSCH transmission.

For NC-JT, a PDSCH is transmitted to a terminal N035 for each cell, TRP, or/and beam, and individual precoding may be applied to each PDSCH. Each cell, TRP, and/or beam transmits a different PDSCH or a different PDSCH layer to the terminal, thereby improving a throughput compared to single-cell, TRP, and/or beam transmission. Each cell, TRP, and/or beam repeatedly transmits the same PDSCH to the terminal, thereby improving reliability compared to single-cell, TRP, and/or beam transmission. For convenience of description, a cell, a TRP, and/or a beam is collectively referred to as a TRP.

In this case, various radio resource allocations may be considered, such as a case N040 where frequency and time resources used in multiple TRPs for PDSCH transmission are all identical, a case N045 where frequency and time resources used in multiple TRPs do not overlap at all, and a case N050 where some of frequency and time resources used in multiple TRPs overlap.

For NC-JT support, DCI of various types, structures, and relations may be considered to assign multiple PDSCHs simultaneously to a single terminal.

FIG. 19 is a diagram illustrating an example of a configuration of downlink control information (DCI) for NC-JT in which respective TRPs transmit different PDSCHs or different PDSCH layers to a terminal in the wireless communication system according to an embodiment of the disclosure.

Referring to FIG. 19, case #1 N100 is an example in which, in a situation where different (N−1) PDSCHs are transmitted from (N−1) additional TRPs (TRP #1 to TRP #(N−1)) in addition to a serving TRP (TRP #0) used during single-PDSCH transmission, control information for PDSCHs transmitted in the additional (N−1) TRPs is transmitted independently of control information for a PDSCH transmitted in the serving TRP. That is, the terminal may acquire control information for PDSCHs transmitted from different TRPs (TRP #0 to TRP #(N−1)) via independent pieces of DCI (DCI #0 to DCI #(N−1)). Formats between the independent pieces of DCI may be the same or different from each other, and payloads between the DCI may also be the same or different from each other. In aforementioned case #1, each PDSCH control or allocation freedom may be completely guaranteed, but if respective pieces of DCI are transmitted in different TRPs, a coverage difference per DCI occurs and reception performance may be thus deteriorated.

Case #2 N105 shows an example dependent on control information for a PDSCH, in which, in a situation where (N−1) different PDSCHs are transmitted from (N−1) additional TRPs (TRP #1 to TRP #(N−1)) in addition to a serving TRP (TRP #0) used during single-PDSCH transmission, control information (DCI) for PDSCHs of the respective additional (N−1) TRPs is transmitted, and each piece of the DCI is transmitted from the serving TRP.

For example, DCI #0, which is control information for the PDSCH transmitted from the serving TRP (TRP #0), includes all information elements of DCI format 1_0, DCI format 1_1, and DCI format 1_2, but shortened DCI (hereinafter, sDCI) (sDCI #0 to sDCI #(N−2)), which is control information for the PDSCHs transmitted from the cooperative TRPs (TRP #1 to TRP #(N−1)), may include only some of the information elements of DCI format 1_0, DCI format 1_1, and DCI format 1_2. Accordingly, for sDCI for transmission of the control information for the PDSCHs transmitted from the cooperative TRPs, a payload is small compared to normal DCI (nDCI) for transmission of the control information related to the PDSCH transmitted from the serving TRP, and it is thus possible to include reserved bits when compared to nDCI.

In aforementioned case #2, each PDSCH control or allocation freedom may be restricted according to a content of an information element included in sDCI, but since reception performance of sDCI is superior to that of nDCI, a probability that a coverage difference occurs per DCI may be lowered.

Case #3 N110 shows an example dependent on control information for a PDSCH, in which, in a situation where (N−1) different PDSCHs are transmitted from (N−1) additional TRPs (TRP #1 to TRP #(N−1)) in addition to a serving TRP (TRP #0) used during single-PDSCH transmission, one piece of control information for PDSCHs of the (N−1) additional TRPs is transmitted, and the DCI is transmitted from the serving TRP.

For example, for DCI #0 which is control information of a PDSCH transmitted from the serving TRP (TRP #0), all information elements of DCI format 1_0, DCI format 1_1, and DCI format 1_2 are included, and for control information of PDSCHs transmitted from cooperative TRPs (TRP #1 to TRP #(N−1)), only some of the information elements of DCI format 1_0, DCI format 1_1, and DCI format 1_2 can be collected in one "secondary" DCI (sDCI) so as to be transmitted. For example, the sDCI may include at least one piece of HARQ-related information, such as frequency domain resource assignment, time domain resource assignment, and MCS of cooperative TRPs. In addition, information that is not included in the sDCI, such as a bandwidth part (BWP) indicator or a carrier indicator, may be based on the DCI (DCI #0, normal DCI, or nDCI) of the serving TRP.

In case #3 N110, each PDSCH control or allocation freedom may be restricted according to a content of the information element included in the sDCI, but sDCI reception performance may be adjustable, and complexity of DCI blind decoding of the terminal may be reduced compared to case #1 N100 or case #2 N105.

Case #4 N115 is an example in which, in a situation where (N−1) different PDSCHs are transmitted from (N−1) additional TRPs (TRP #1 to TRP #(N−1)) in addition to a serving TRP (TRP #0) used during single PDSCH transmission, control information for PDSCHs transmitted from the (N−1) additional TRPs is transmitted in the same DCI (long DCI) as that for the control information for the PDSCH transmitted from the serving TRP. That is, the terminal may acquire the control information for the PDSCHs transmitted from different TRPs (TRP #0 to TRP #(N−1)) via single DCI. For case #4 N115, complexity of DCI blind decoding of the terminal may not increase, but a PDSCH control or allocation freedom may be low, such that the number of cooperative TRPs is limited according to long DCI payload restrictions.

In the following descriptions and embodiments, sDCI may refer to various auxiliary DCI, such as shortened DCI, secondary DCI, and normal DCI (aforementioned DCI formats 1_0 to 1_1) including PDSCH control information transmitted in the coordinated TRPs, and if no particular limitation is specified, the description is similarly applicable to the various auxiliary DCI.

In the following description and embodiments, aforementioned cases #1 N100, case #2 N105, and case #3 N110, in which one or more pieces of DCI (PDCCHs) are used for NC-JT support, are classified as multiple PDCCH-based NC-JT (first type), and aforementioned case #4 N115 in which single DCI (PDCCH) is used for NC-JT support may be classified as single-PDCCH-based NC-JT (second type). In multiple PDCCH-based PDSCH transmission, a CORESET in which DCI of the serving TRP (TRP #0) is scheduled and a CORESET in which DCI of the cooperative TRPs (TRP #1 to TRP #(N−1)) are scheduled may be differentiated. As a method for differentiating CORESETs, there may be a method for distinguishment via a higher-layer indicator for each CORESET, a method for distinguishment via a beam configuration for each CORESET, and the like. In addition, in the single PDCCH-based NC-JT, single DCI is for scheduling of a single PDSCH having multiple layers, instead of scheduling of multiple PDSCHs, and the aforementioned multiple layers may be transmitted from multiple TRPs. In this case, a connection relationship between a layer and a TRP for transmitting the layer may be indicated via a transmission configuration indicator (TCI) indication for the layer.

In embodiments of the disclosure, "cooperative TRP" may be replaced with various terms, such as "cooperative panel" or "cooperative beam" when actually applied.

In embodiments of the disclosure, "when NC-JT is applied" may be interpreted in various ways according to a situation such as "when a terminal receives one or more PDSCHs at the same time in one BWP", "when a terminal receives PDSCH based on two or more transmission configuration indicator (TCI) indications at the same time in one BWP", "when PDSCH received by a terminal is associated with one or more DMRS port groups", etc., but it is used as an expression for convenience of description.

In the disclosure, a radio protocol structure for NC-JT may be used in various ways according to a TRP deployment scenario. For example, if there is no backhaul delay or is a small backhaul delay between cooperative TRPs, a method (CA-like method) of using a structure based on MAC layer multiplexing is possible in a similar manner to S10 of FIG. 17. On the other hand, if a backhaul delay between cooperative TRPs is so large that the backhaul delay cannot be ignored (e.g., when a time of 2 ms or longer is required for information exchange, such as CSI, scheduling, and HARQ-ACK, between the cooperative TRPs), a method (DC-like method) of securing characteristics robust to a delay by using an independent structure for each TRP from the RLC layer is possible in a similar manner to S20 of FIG. 17.

The terminal supporting C-JT/NC-JT may receive a C-JT/NC-JT-related parameter, setting value, or the like from a higher-layer configuration, and may set an RRC parameter of the terminal, based on the parameter, the setting value, or the like. For the higher-layer configuration, the terminal may use a UE capability parameter, for example, tci-StatePDSCH. Here, the UE capability parameter, for example, tci-StatePDSCH may define TCI states for the purpose of PDSCH transmission, the number of the TCI states may be configured to be 4, 8, 16, 32, 64, and 128 in FR1 and configured to be 64 and 128 in FR2, and among the configured numbers, up to 8 states that may be indicated by 3 bits of a TC field in the DCI may be configured via a MAC CE message. The maximum value of 128 refers to a value indicated by maxNumberConfiguredTCIstatesPerCC in parameter tci-StatePDSCH included in capability signaling of the terminal. In this way, a series of configuration procedures from the higher-layer configuration to the MAC CE configuration may be applied to a beamforming change command or a beamforming indication for at least one PDSCH in one TRP.

[D-MIMO]

Figure 20:
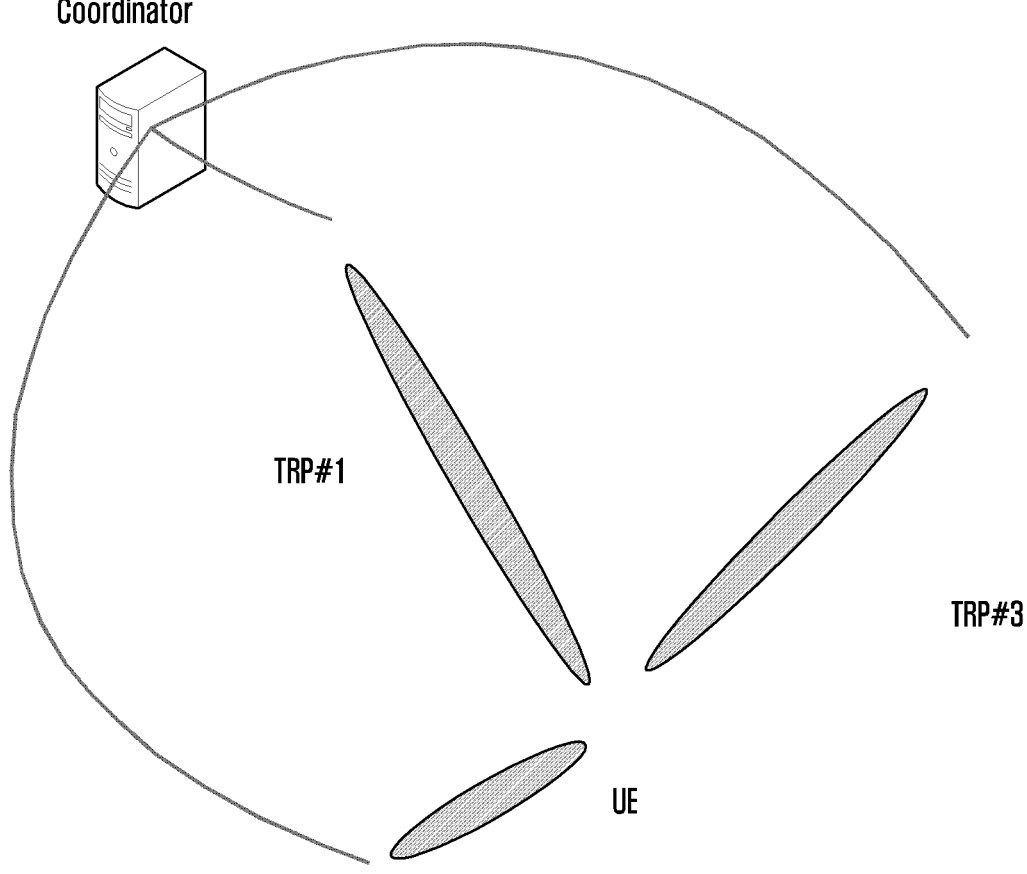
FIG. 20 illustrates operations of multiple base stations and terminals participating in distributed-multiple input multiple output (D-MIMO) transmission according to an embodiment of the disclosure.

Distributed-multiple input multiple output (D-MIMO) of the disclosure operates in all frequency bands, but it is considered that the D-MIMO operates in a multiple-input multiple-output environment in a low frequency band of 1 GHz or lower. In general, since power attenuation of a signal is less in a low-frequency environment compared to a high-frequency environment, a cell size may be relatively large. In addition, spacings between base station antenna ports have an inversely proportional relationship with operating frequencies. Therefore, in order to implement D-MIMO in a low frequency band, when antennas are arranged in a single array in the center of a cell, a shape thereof becomes very large, so that geographically dispersed installation is possible [FIG. 20]. Signals transmitted from these distributed transmission points (hereinafter, transmission reception points (TRPs)) may cause a large phase difference or a reception time delay depending on a position of a terminal in the cell of a wide area, so that a problem of deteriorating reception reliability may occur. In addition, a high reception complexity of the terminal is required to detect each delay spread from the received signal and decode data, and in particular, a higher terminal reception complexity is required in an environment having a large time delay and phase difference according to a specific position of the terminal in the cell.

In order to solve the above problem, a method is required, wherein the method includes reducing a reception complexity of the terminal by transmitting signals in a state where TRPs are synchronized after multiple base stations, cells, or TRPs participating in transmission compensate for a transmission time difference and a phase difference in advance. In order to synchronize TRPs, a method of synchronizing TRPs based on transmission of a reference signal (hereinafter. RS) from a base station and reporting from a terminal, which is one of traditional synchronization methods, may be introduced. However, the method is useful in a time division (TDD) system in which channel reciprocity is guaranteed, but performance degradation may occur when the method is applied to a frequency division (FDD) system in which channel compatibility is not guaranteed. Accordingly, the disclosure proposes a method of synchronizing between TRPs, based on a report on TRS (RS for synchronization) reception of the terminal in an FDD system. In addition, the disclosure proposes a method in which, after the TRPs are synchronized, the base station connects multiple QCLs to a new TRS and transmits the same to the terminal, so that the terminal decodes a PDSCH or PDCCH to be received later, by using a QCL relation in the corresponding TRS without referring to all TRSs transmitted from the respective TRPs.

First Embodiment: TRS Configuration Method of Single Frequency Network (SFN) Transmission TRP The proposed first embodiment relates to a method in which a TRP participating in D-MIMO transmission configures a TRS for one terminal or a group of terminals, and is a method of configuring a TRS in a single-frequency network (hereinafter, SFN) scheme that is a scheme in which transmission in TRPs is performed in the same time and frequency resources. Via the proposed TRS configuration method, the terminal may receive one TRS resource pre-compensated for each TRP with a high signal quality.

Figure 21:
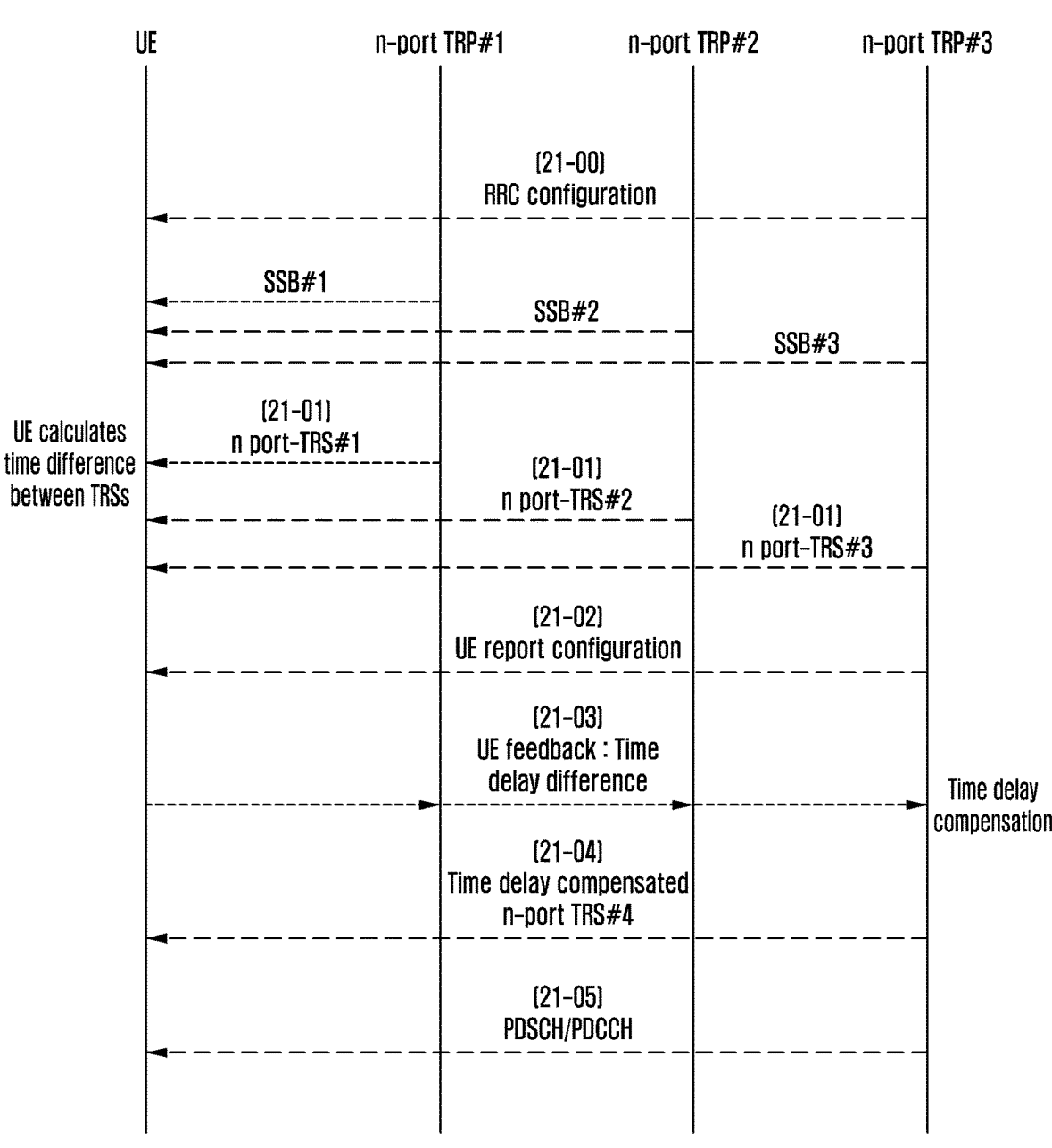
FIG. 21 is a diagram illustrating operations of a base station and a terminal in consideration of time synchronization between transmission and reception points (TRPs) according to an embodiment of the disclosure.

The first embodiment provides, as in FIG. 21, a method of configuring TRSs from n-port-TRPs having the same number of antenna ports in the SFN scheme and receiving the same by the terminal. For convenience of explanation, in FIG. 21, it is assumed that there are a total of three TRPs of TRP #1, TRP #2, and TRP #3 which participate in SFN transmission, but this is merely an example, and the embodiment may also be applied to a case of any number of TRPs. Here, the same number of antenna ports does not actually indicate the same number of physical antennas of TRP, but refers to the number of logical antenna ports. For example, if TRP #1 and TRP #2 have two physical antenna ports, and TRP #3 has four physical antenna ports, the four physical antenna ports of TRP #3 may be virtualized into two logical antennas, in which case, the terminal recognizes that all the three TRPs have two ports each.

FIG. 21 is a sequence diagram illustrating a method for time synchronization of three TRPs having the same number of antenna ports. The method includes procedures in which respective base stations transmit 21-01 TRSs, which are reference signals for time synchronization, to a terminal, and the terminal calculates a time delay between TRSs and reports 21-03 the same to the base stations. Here, a reference of delay between TRSs is based on a serving TRS, or includes indicating, by the base stations, a TRS to be used as a reference via higher-layer signaling.

The embodiment includes an operation 21-01 in which the terminal receives n-port-TRS #1, n-port-TRS #2, and n-port-TRS #3, in which a time delay difference is not compensated for, from the base stations, and an operation 21-04 in which the respective base stations configure TRS #4 obtained by pre-compensating for the time delay difference reported from the terminal.

1-1st Embodiment: Method of Configuring TRS with Physical Cell Information in TCI-stateID The proposed 1-1st embodiment relates to a method of configuring TRSs based on physical cell information in TCI-stateID, and distinguishing the TRSs received by the terminal. First, the terminal may receive higher signaling (e.g., RRC reconfiguration message) from the base stations. The terminal may receive 21-00, from the base stations, NZP-CSI-RS configuration information in which trs-Info in NZP-CSI-RS-ResourceSet, which is higher-layer signaling, is configured to be true. The base stations may transmit 21-01 TRSs to the terminal, based on the configuration information configured via higher signaling. In this case, TRS #1 transmitted by TRP #1, TRS #2 transmitted by TRP #2, and TRS #3 transmitted by TRP #3 may be nzp-CSI-RS-Resources having NZP-CSI-RS-ResourceId independent of each other (TRS #1 #TRS #2 #TRS #3). In this case, when TRS #1 to TRS #3 are received, the terminal may use TCI state information corresponding to TCI-StateId in NZP-CSI-RS-Resource which is higher-layer signaling. If information on a physical cell ID (PCID) is additionally present in TCI-State which is higher-layer signaling corresponding to TCI-StateId, and referenceSignal in QCL-Info configured in TCI-State is configured to be ssb, the terminal may recognize an SSB of a PCID which has a QCL relation with a received specific TRS, based on the corresponding TCI-StateId. That is, the terminal may identify a physical cell from which the SSB configured in referenceSignal has been transmitted. Using this, it is possible for the terminal to associate statistical characteristics, which may be measured by applying QCL Type-C or D to the received TRS, with the SSB to each of antenna ports, thereby facilitating a reception operation. For example, when TRS #1 is received from TRP #1, the terminal may receive TRS #1, based on SSB #1 which is a QCL source configured in TCI state information (TCI #1). In this case, based on SSB #1 information and PCID information configured in the TCI state, a certain base station (TRP #1 in this example) from which TRS #1 has been transmitted may be distinguished. Similarly, if QCL sources of TCI states (i.e., TCI #2 and TCI #3) configured respectively in TRS #2 and TRS #3 are configured to be SSB, and PCIDs are additionally configured in the TCI states, the terminal may distinguish base stations from which TRS #2 and TRS #3 have been transmitted.

The terminal may identify cell information and a CSI-RS for tracking signal respectively in a ServCell index and NZP-CSI-RS-ResourceId in QCL-Info in the TCI-State configured via higher-layer signaling. The terminal may identify a cell from which each TRS has been transmitted, by referring to the corresponding configuration information.

1-2nd Embodiment: Method of TRS Report Quantity Configuration for Time Delay Difference Reporting of Terminal The proposed 1-2nd embodiment relates to a method of configuring CSI reporting for the terminal to measure and report time delay differences between TRSs received from the base stations. The terminal may receive, from the base stations, CSI report information for TRS #1, TRS #2, and TRS #3 transmitted from the base stations. The terminal may acquire 21-02 the CSI report information via higher-layer signaling that may be received from the base stations. The terminal may receive values of reportQuantity configured to be enabled, timeDelayDifference, or timeDelayReference from the base stations, wherein reportQuantity is in CSI-ReportConfig connected to CSI-ResourceConfig, which is higher-layer signaling and includes TRS #1, TRS #2, and TRS #3. The term corresponding to reportQuantity is not limited to enabled, timeDelayDifference, or timeDelayReference, and may also be configured in other forms with the same meaning. Here, timeDelayReference indicates a TRS serving as a reference, and timeDelayDifference includes indicating to calculation of an offset value compared to the reference TRS. Based on the corresponding configuration information, the terminal may calculate time delay differences between the TRSs from received TRS #1, TRS #2, and TRS #3, and may report 21-03 the time delay differences to the base stations. The calculating and reporting of the time delay differences by the terminal will be described in detail in a 3-1st embodiment.

The base stations may perform transmission time synchronization between the TRPs by transmitting 21-04, to the terminal, TRS #4 obtained by pre-compensation for the time delay difference values reported from the terminal, and may improve 21-05 estimation accuracy for an average delay of a PDSCH/PDCCH to be received later by the terminal. However, average delays with TRPs per terminal may be different depending on a position of the terminal in a network. This indicates that all the time delay difference values, which need to be pre-compensated for, for each terminal are different, and includes pre-compensated TRS #4 being transmitted to an individual terminal or a group of terminals. Here, if pre-compensated TRS #4 no longer requires terminal reporting, reportQuantity in CSI-Report-Cofig may be configured to be none, and the number of antenna ports may still be the same n-port as that of TRS #1, TRS #2, and TRS #3.

1-3rd Embodiment: Method of Indicating Pre-Compensated TRS by Base Station

Figure 22:
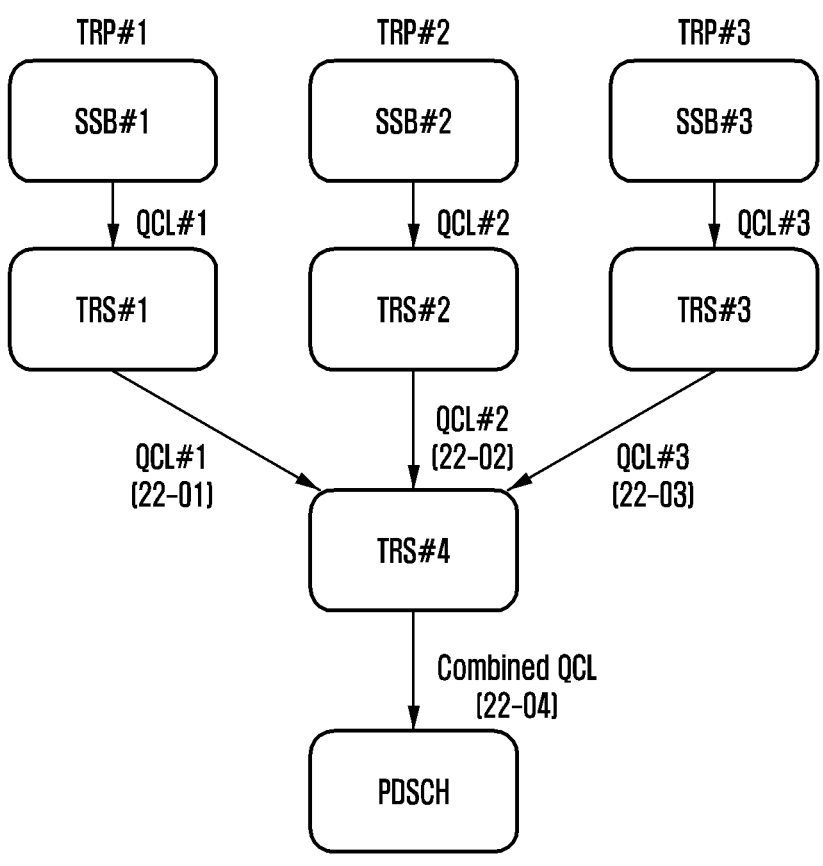
FIG. 22 is a diagram illustrating a method of configuring quasi-co-location (QCL) information of multiple TRSs having the same number of antenna ports for one tracking reference signal (TRS) according to an embodiment of the disclosure.

The proposed 1-3rd embodiment relates to a method in which the base stations notify the terminal of TRSs, in which a time delay difference has been pre-compensated for, in order to reduce a TRS reception complexity of the terminal. In the above example, pre-compensated TRS #4 may share a specific channel characteristic with each of non-pre-compensated TRS #1, TRS #2, and TRS #3 (e.g., at least one of average delay, delay spread, Doppler spread, and spatial Rx parameter may be shared), but may have a specific channel characteristic (e.g., average delay) which is not shared. Therefore, by indicating QCL relations (22-01, 22-02, and 22-03 in FIG. 22) for the shared channel characteristic with non-pre-compensated TRS #1, TRS #2, and TRS #3 with respect to pre-compensated TRS #4, the base stations may inform the terminal that TRS #4 has been pre-compensated, in addition to a channel characteristic for measurement of TRS #4, and detailed methods are as follows.

[Method 1-3-1]: Pre-Compensated Periodic TRS Indication Method

The proposed method is a method in which, if the terminal receives a periodic TRS from the base station, and a QCL reference of the TRS is indicated by another TRS, the corresponding periodic transmission TRS is determined to be a pre-compensated TRS. In this case, a QCL type indicated together may include at least one of the aforementioned channel characteristics, for example, average delay, delay spread, Doppler spread, and spatial Rx parameter.

In addition, if the pre-compensated TRS is a TRS transmitted based on an SFN, two or more other TRS resources may be indicated as QCL references for the TRS. In this case, the two or more QCL reference resources may be TRS resources transmitted from different TRPs, for example, TRS #1, TRS #2, and TRS #3. If two or more QCL reference resources are indicated, the terminal may properly combine the aforementioned channel characteristics of the QCL reference resources in order to measure pre-compensated TRS #4 which serves as a QCL target.

[Method 1-3-2]: Pre-Compensated Aperiodic TRS Indication Method

The proposed method is a method of, when the terminal receives an aperiodic TRS from the base station and a QCL reference of the TRS is indicated by another TRS, if an average delay is excluded from a corresponding QCL type, the aperiodic TRS is determined to be a pre-compensated TRS (TRS #4 in the example above). For an aperiodic TRS resource, another TRS is necessarily indicated as a QCL reference, but in this case, for the QCL type, only QCL-TypeD, if a spatial Rx parameter is used, and QCL-typeA can be used. As described above, since a pre-compensated TRS has an average delay value different from that of a non-pre-compensated TRS, the QCL type, from which the average delay is excluded, needs to be used to indicate a QCL relation between the two TRSs. In this case, the QCL type may include at least one of the channel characteristics, for example, average delay, delay spread, Doppler spread, and spatial Rx parameter, described above in the periodic TRS resource description. In addition, if the pre-compensated TRS is a TRS transmitted in the SFN, two or more other TRS resources may be indicated as a QCL reference for the TRS, and a detailed method of the indication may be the same as the indication method for the periodic TRS.

As described above, method 1-3-2 includes allowing a pre-compensated TRS only for an aperiodic TRS in order to reduce an overhead for the pre-compensated TRS. For example, in the method, a QCL relation, in which a QCL reference for a TRS #4 resource is indicated by one or multiple other TRSs, and an average delay is excluded from a corresponding QCL type, is allowed only if the "TRS resource" is an aperiodic TRS.

In addition to the pre-compensated TRS indication method, it is also possible to use a semi-persistent TRS and allow pre-compensation only for the semi-persistent TRS. In this case, a QCL relation of the semi-persistent pre-compensated TRS may be the same as a QCL relation of the aperiodic TRS.

The aforementioned methods are merely examples and are not limited thereto. Therefore, various methods, such as variations based on the listed methods or combinations of the listed methods, may be possible.

Second Embodiment: TRS Configuration Method of Non-SFN Transmission TRP

The proposed second embodiment relates to a method in which a TRP participating in D-MIMO configures a TRS for one terminal or a group of terminals, and is a method of configuring a TRS in a non-single-frequency network (non-SFN) scheme that is a scheme in which transmission is performed in different time and frequency resources between TRPs. Based on the proposed TRS configuration method, the terminal may receive TRSs from TRPs having different numbers of antenna ports, provide feedback information for synchronization between the TRPs, based on the received TRSs, and receive a data channel in a synchronized state.

When the terminal receives the TRSs from the TRPs, a time delay offset between the TRSs may be very small, but a large phase offset may occur. For convenience of explanation, in this drawing, it is assumed that there are a total of three TRPs of TRP #1, TRP #2, and TRP #3 which participate in non-SFN transmission, but this is merely an example, and the embodiment may also be applied to a case of any number of TRPs.

Figure 23:
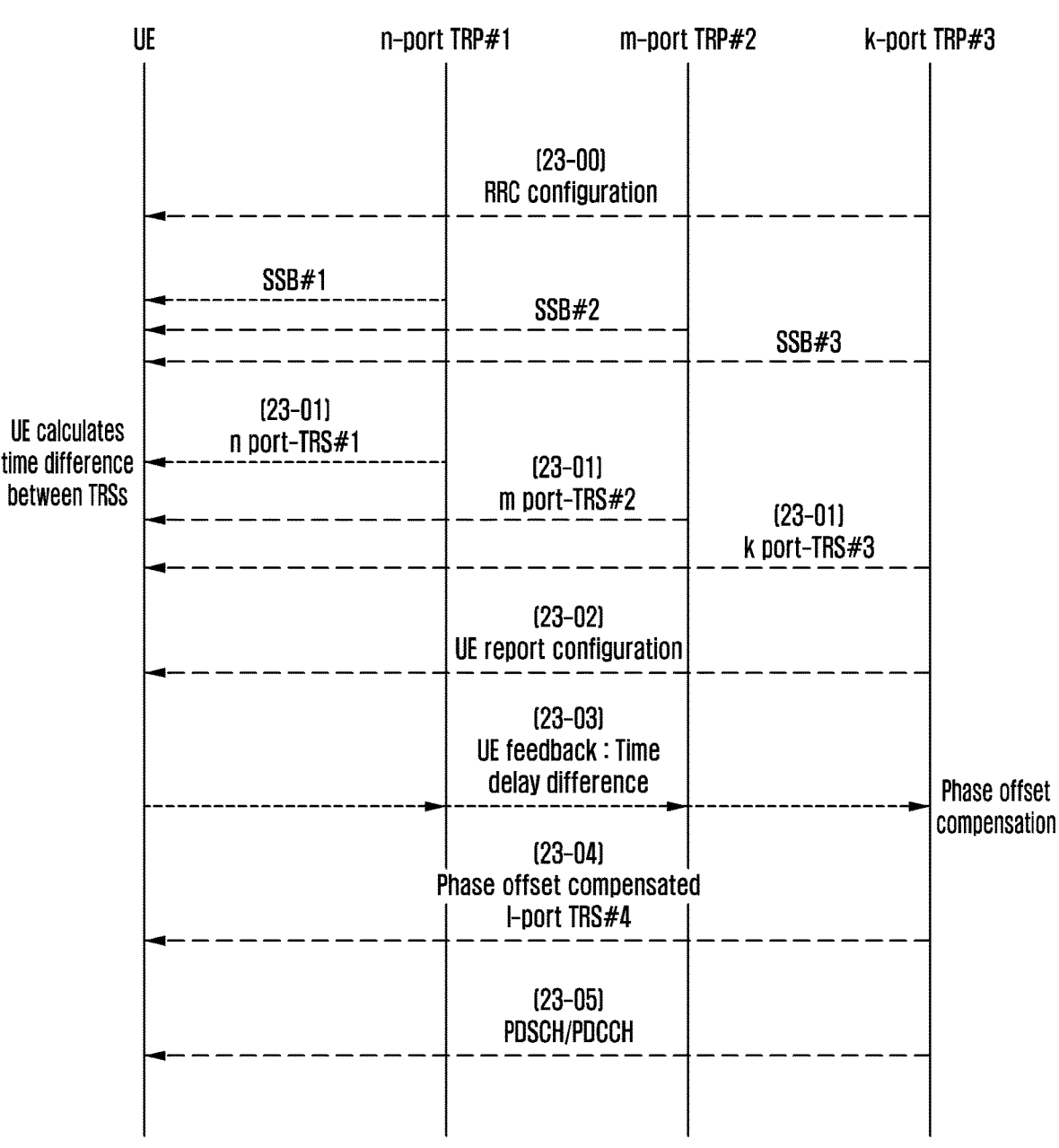
FIG. 23 is a diagram illustrating operations of a base station and a terminal in consideration of phase synchronization between TRPs according to an embodiment of the disclosure.

FIG. 23 is a sequence diagram illustrating a method of phase synchronization of three TRPs, which have different numbers of antenna ports, in a non-SFN manner. The embodiment includes an operation 23-01 in which, for phase synchronization between base stations, the respective base stations transmit TRS #1, TRS #2, and TRS #3, which have different numbers of antenna ports, to a terminal, and an operation 23-04 in which the base station configures TRS #4 obtained by pre-compensation for a phase difference reported from the terminal.

2-1st Embodiment: Method of TRS Report Quantity Configuration for Phase Difference Reporting of Terminal The proposed 2-1st embodiment relates to a method of configuring CSI reporting for the terminal to measure and report a phase difference between TRSs received from the base stations. The terminal may receive CSI report information for TRS #1, TRS #2, and TRS #3 transmitted from the base stations. The terminal may acquire 23-02 the CSI report information via higher-layer signaling which may be received from the base stations. The terminal may receive values of reportQuantity configured to be enabled, phaseDifference, or phaseDifferenceReference from the base stations, wherein reportQuantity is in CSI-ReportConfig connected to CSI-ResourceConfig, which is higher-layer signaling and includes TRS #1, TRS #2, and TRS #3. The term corresponding to reportQuantity is not limited to enabled, phaseDifference, or phaseDifferenceReference, and may also be configured in other forms with the same meaning. Here, phaseDifferenceReference indicates a TRS serving as a reference, and phaseDifference includes indicating to calculation of an offset value compared to the reference TRS. Based on the received configuration information in 23-02, the terminal may calculate phase differences between the TRSs from received TRS #1, TRS #2, and TRS #3, and may report 23-03 the phase difference to the base station. 'The calculating and reporting of the phase difference by the terminal will be described in detail in a 3-2nd embodiment.

The base stations may perform phase synchronization between the TRPs by transmitting 23-04, to the terminal, TRS #4 obtained by pre-compensation for the phase difference values reported from the terminal, and may improve estimation accuracy for an average delay of a PDSCH/ PDCCH to be received later by the terminal. However, average delays with TRPs per terminal may be different depending on a position of the terminal in a network. This indicates that all the phase difference values, which need to be pre-compensated for, for each terminal are different, and includes pre-compensated TRS #4 being transmitted to an individual terminal or a group of terminals. Here, if pre-compensated TRS #4 no longer requires terminal reporting, reportQuantity in CSI-ReportCofig may be configured to be none, and the number of antenna ports may be equal to the sum of the number of antenna ports of TRS #1, TRS #2, and TRS #3.

Figure 24:
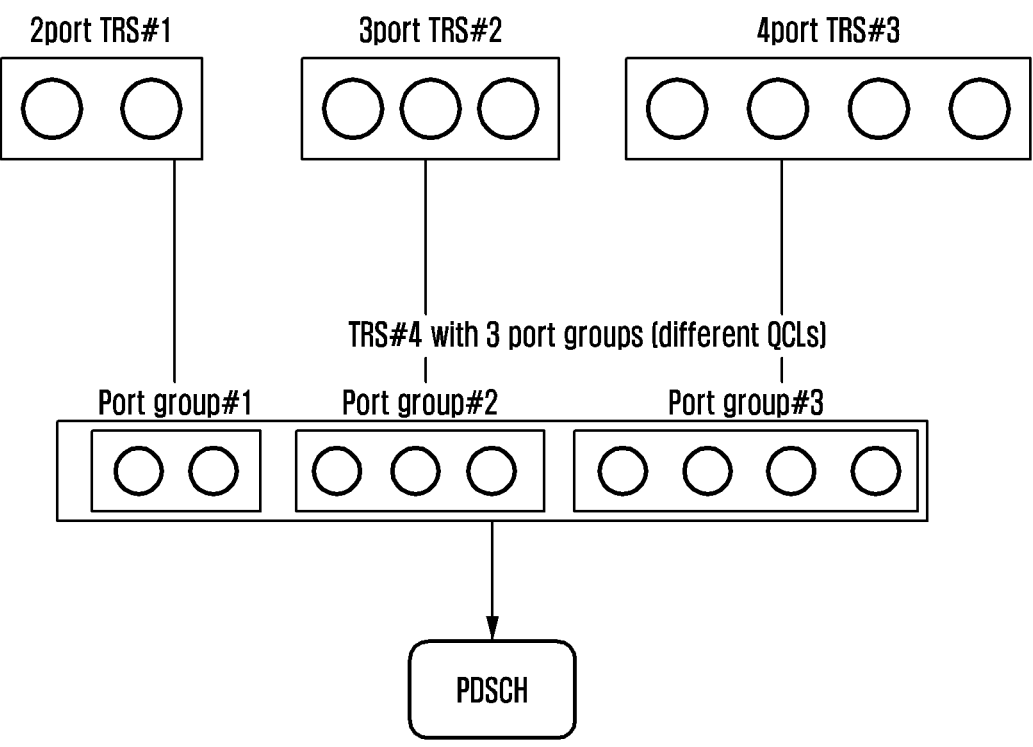
FIG. 24 is a diagram illustrating a method of configuring QCL information of multiple TRSs having different numbers of antenna ports for one TRS according to an embodiment of the disclosure.

2-2nd Embodiment: Method of Configuring One TRS Including TRSs of Different TRPs The proposed 2-2nd embodiment describes a method of configuring one TRS including TRSs transmitted by different TRPs. For example, the base stations may transmit, to the terminal, TRS #4, which is obtained by pre-compensation for the phase differences, separately from TRS #1. TRS #2, and TRS #3 which are not pre-compensated. In this case, TRS #4 may be transmitted in the non-SFN scheme in which the respective TRPs transmit TRSs in different time and frequency resources. The base stations may configure or indicate antenna ports of TRS #1, TRS #2, and TRS #3 to correspond to port group #1, port group #2, and port group #3 in one TRS #4, respectively, via TCI state configuration by higher-layer signaling. In this case, if the numbers of antenna ports of TRS #1, TRS #2, and TRS #3 are 2, 3, and 4, respectively, the number of antenna ports of TRS #4 may be 9 in FIG. 24. In addition, it is possible to configure QCL #1, QCL #2, and QCL #3, which are QCL configuration information of the respective TRSs, to correspond to antenna port groups #1, #2, and #3, respectively. Therefore, the terminal is able to apply different QCL information in TRS #4 to decoding a downlink control signal and a downlink data signal, which are to be received later, without referring to TRS #1, TRS #2, and TRS #3. Descriptions will be provided in detail in a fourth embodiment.

Third Embodiment: Method of Reporting TRS Reception of Terminal

The proposed third embodiment relates to a method in which the terminal calculates time delays (time delay differences) or phase differences (phase offsets) for TRSs transmitted to the terminal by other TRPs in comparison to a reference TRP among TRPs participating in D-MIMO, and reports the same to the base stations. Based on the proposed method of reporting time delays and phase differences by the terminal, the base stations may perform synchronization by compensating for the time difference and phase difference for each TRP, and the terminal may receive a downlink signal, which is synchronized via pre-compensation, with a high signal quality.

First, the terminal may receive, from the base stations, NZP-CSI-RS configuration information in which trs-Info in NZP-CSI-RS-ResourceSet, which is higher-layer signaling, is configured to be true, and the base stations may transmit TRS #1, TRS #2, and TRS #3 to the terminal, based on the configuration information. The terminal may receive, from the base stations, CSI report information for TRS #1, TRS #2, and TRS #3 transmitted from the base stations. The terminal may acquire the CSI report information via higher-layer signaling which may be received from the base stations. As described in the 1-2nd embodiment and the 2-1st embodiment, the terminal may receive values of reportQuantity configured to be enabled, timeDelayDifference, timeDelayReference, phaseDifference, or phaseDifferenceReference from the base stations, wherein reportQuantity is in CSI-ReportConfig connected to CSI-ResourceConfig, which is higher-layer signaling and includes TRS #1, TRS #2, and TRS #3. The term corresponding to reportQuantity is not limited to the above, and may also be configured in other forms with the same meaning. Based on the configuration information, the terminal is able to receive TRS #1, TRS #2, and TRS #3 from the respective TRPs, calculate time delay differences or phase differences in comparison to the reference TRS, and report the same to the base stations.

Figure 25:
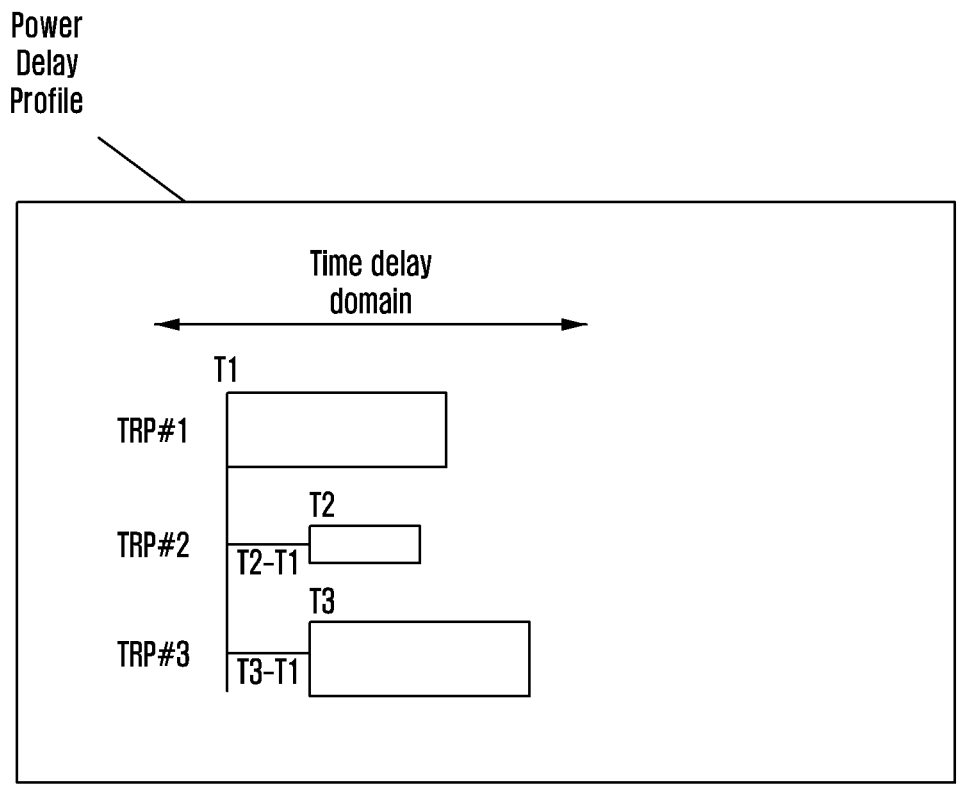
FIG. 25 is a diagram illustrating a power delay profile for TRS reception of a terminal according to an embodiment of the disclosure.

3-1st Embodiment: Method of Time Delay Difference Reporting by Terminal with Respect to TRS Transmission of SFN Transmission TRP The terminal may receive values of reportQuantity configured to be enabled, timeDelayDifference, or timeDelayReference from the base stations, wherein reportQuantity is in CSI-ReportConfig connected to CSI-ResourceConfig, which is higher-layer signaling and includes TRS #1, TRS #2, and TRS #3. In this case, the terminal may receive n-port-TRS #1, n-port-TRS #2, and n-port-TRS #3 from n-port-TRP #1, n-port-TRP #2, and n-port-TRP #3, respectively, and calculate time delay differences between the TRSs. For example, if reception times of TRS #1, TRS #2, and TRS #3 of the terminal are T1, T2, and T3 (T1<T2<T3), respectively, first received TRS #1 may be assumed to be a reference TRS. In this example, TRS #1, which is the earliest received signal among the TRSs received by the terminal, has been configured as a reference signal, but reference TRS configuration information may be indicated from higher-layer signaling, and the disclosure is not limited thereto. The terminal may calculate T2-T1 and T3-T1 via a power delay profile (PDP) of the TRSs received from the respective received TRPs, so as to measure time delay difference values of TRS #2 versus TRS #1 and TRS #3 versus TRS #1, in FIG. 25. The terminal may report, to the base stations, the calculated time delay differences in comparison to the reference TRS. The base stations may indicate the terminal to report the time delay differences via higher-layer signaling, which includes radio resource control (RRC) signaling or medium access control (MAC) control element (CE) signaling, or L1 signaling (e.g., common DCI, group-common DCI, and UE-specific DCI). A method of reporting the time delay differences to the base stations by the terminal having received the reporting indication from the base stations is as follows.

[Method 3-1-1]: Method of Reporting Time Delay Difference Values Collectively to all TRPs Proposed method 3-1-1 is a method in which the terminal collectively reports time delay difference values of other TRSs, in comparison to a reference TRS, to all TRPs. When TRS #1 to TRS #3 are received, the terminal may use TCI state information corresponding to TCI-StateId in NZP-CSI-RS-Resource which is higher-layer signaling. If information on a physical cell ID (PCID) is additionally present in TCI-State which is higher-layer signaling corresponding to TCI-StateId, and referenceSignal in QCL-Info configured in TCI-State is configured to be ssb, the terminal may recognize an SSB of a PCID which has a QCL relation with a received specific TRS, based on the corresponding TCI- StateId. That is, the terminal may identify a physical cell from which the SSB configured in referenceSignal has been transmitted. In this case, the terminal is able to collectively report, to TRP #1, TRP #2, and TRP #3, a cell ID to which TRP #2 belongs, a value of T2-T1 calculated in the 3-1st embodiment, a cell ID to which TRP #3 belongs, and a value of T3-T1. In this case, time synchronization between the base stations may be performed by pre-compensation for the reported T2-T1 value in case of TRP #2 and by pre-compensation for the T3-T1 value in case of TRP #3. The terminal reporting may be indicated in a periodic reporting scheme of indicating terminal reporting based on an RRC configuration, a semi-permanent reporting scheme of indicating terminal reporting based on MAC CE signaling, or an aperiodic scheme of indicating terminal reporting based on DCI or MAC CE signaling, and the terminal reporting is possible on a PUCCH or PUSCH, and is not limited to the description above.

[Method 3-1-2]: Method of Individually Reporting Time Delay Difference Values to TRPs Remaining after Excluding Reference TRP Proposed method 3-1-2 is a method in which the terminal individually reports time delay difference values of other TRSs, in comparison to a reference TRS, to respective TRPs. The terminal may calculate time delay differences in comparison to the reference (serving) TRS, and individually report a corresponding value to a TRP that needs to be compensated. As in method 3-1-1 above, the terminal may identify a physical cell from which a received specific TRS has been transmitted. In this case, the terminal may individually report a cell ID to which TRP #2 belongs and a T2-T1 value to TRP #2, and a cell ID to which TRP #3 belongs and a T3-T1 value to TRP #3. After the terminal reporting, transmission time synchronization between the TRPs may be finally performed by compensating the T2-T1 value for a downlink signal to be transmitted later in case of TRP #2 and by compensating the T3-T1 value for the downlink signal in case of TRP #3. For the terminal reporting scheme, reporting in a periodic, semi-permanent, or aperiodic scheme is also possible, and the terminal reporting scheme is not limited thereto.

3-2nd Embodiment: Method of Phase Offset Reporting by Terminal with Respect to TRS Transmission of Non-SFN Transmission TRP The embodiment describes a method of phase offset reporting by the terminal with respect to TRS transmission of a non-SFN transmission TRP. The terminal may receive values of reportQuantity configured to be enabled or phaseDifference from the base stations, wherein reportQuantity is in CSI-ReportConfig connected to CSI-ResourceConfig, which is higher-layer signaling and includes TRS #1, TRS #2, and TRS #3.

Figure 26:
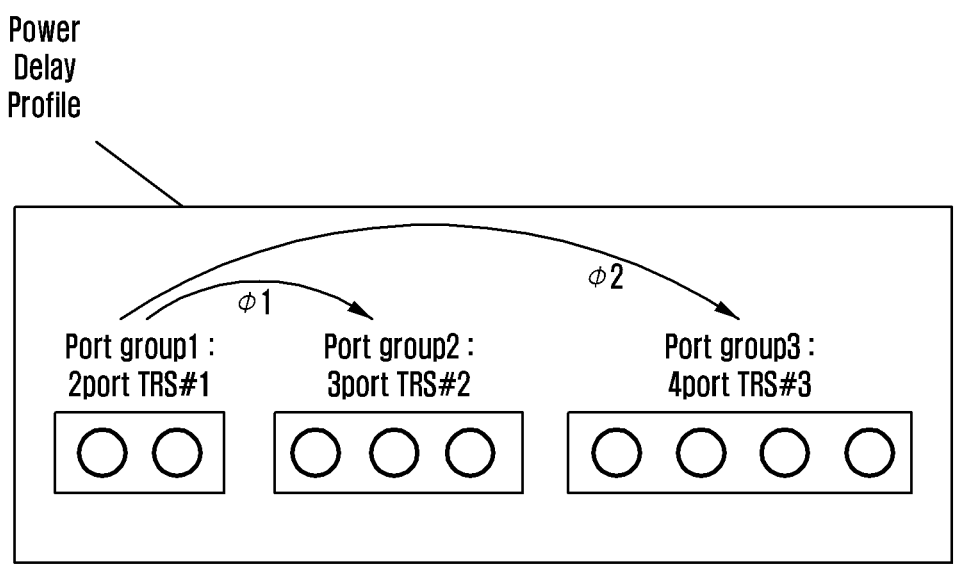
FIG. 26 is a diagram illustrating a phase difference between multiple antenna groups within one TRS according to an embodiment of the disclosure.
Figure 27:
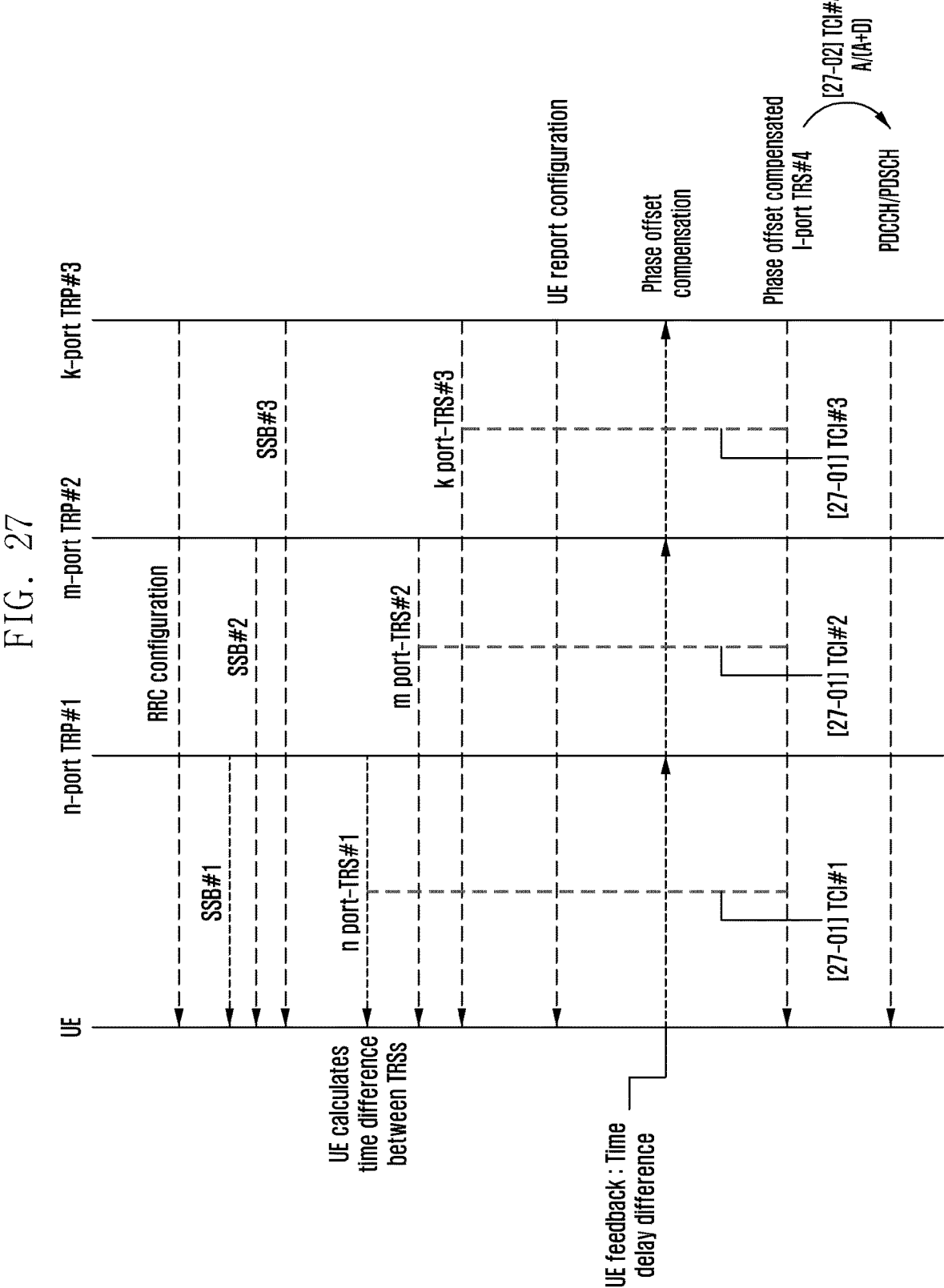
FIG. 27 is a diagram illustrating a procedure in which a terminal receives a downlink control channel and a downlink data channel by referring to a pre-compensated TRS according to an embodiment of the disclosure.

In this case, the terminal may receive n-port-TRS #1, m-port-TRS #2, and k-port-TRS #3 (n #m #k) from n-port-TRP #1, m-port-TRP #2, and k-port-TRP #3 (n≠m≠k), respectively, and may calculate phase differences between the TRSs. For example, if antenna port groups of 2port-TRS #1, 3port-TRS #2, and 4port-TRS #3 are port group #1, port group #2, and port group #3, port group #1 may be configured to be a reference port group. The terminal may measure $\Phi_1$ which is a phase difference between port group #1 and port group #2, and measure $\Phi_2$ which is a phase difference between port group #1 and port group #3, in FIG. 26. In the example above, TRS #1 (antenna port group #1) has been configured to be the serving TRS (reference TRS), but the reference TRS may be configured separately via RRC signaling, and the disclosure is not limited thereto.

In addition, the proposed embodiment includes a method of indicating a reference port in order to measure phase differences between port groups. For example, the embodiment includes, but is not limited to, a method of obtaining a phase difference based on a lowest index port of a port group, indicating a port index for each group via higher-layer signaling, or signaling a port index commonly applied to groups.

The terminal may report, to the base stations, the calculated phase differences in comparison to the reference TRS. The base stations may indicate the terminal to report the phase differences via higher signaling, which includes radio resource control (RRC) signaling or medium access control (MAC) control element (CE) signaling, or L1 signaling (e.g., common DCI, group-common DCI, and UE-specific DCI). A method of reporting the phase differences to the base stations by the terminal having received the reporting indication from the base stations is as follows.

[Method 3-2-1]: Method of Reporting Phase Difference Values Collectively to all TRPs Proposed method 3-2-1 is a method in which the terminal collectively reports phase difference values of other TRSs, in comparison to a reference TRS, to all TRPs. When TRS #1 to TRS #3 are received, the terminal may use TCI state information corresponding to TCI-StateId in NZP-CSI-RS-Resource which is higher-layer signaling. If information on a physical cell ID (PCID) is additionally present in TCI-State which is higher-layer signaling corresponding to TCI-StateId, and referenceSignal in QCL-Info configured in TCI-State is configured to be ssb, the terminal may recognize an SSB of a PCID which has a QCL relation with a received specific TRS, based on the corresponding TCI-StateId. That is, the terminal may identify a physical cell from which the SSB configured in referenceSignal has been transmitted. In this case, the terminal is able to collectively report a cell ID to which TRP #2 belongs, a $\Phi_1$ value calculated in the 3-2nd embodiment, a cell ID to which TRP #3 belongs, and a $\Phi_2$ value to TRP #1, TRP #2, and TRP #3. In this case, time synchronization between the base stations may be performed by pre-compensation for the reported $\Phi_1$ value in case of TRP #2 and by pre-compensation for the $\Phi_2$ value in case of TRP #3. The terminal reporting may be indicated in a periodic reporting scheme of indicating terminal reporting based on an RRC configuration, a semi-permanent reporting scheme of indicating terminal reporting based on MAC CE signaling, or an aperiodic scheme of indicating terminal reporting based on DCI or MAC CE signaling, and the terminal reporting is possible on a PUCCH or PUSCH, and is not limited to the description above.

[Method 3-2-2]: Method of Individually Reporting Phase Difference Values to TRPs Remaining after Excluding Reference TRP Proposed method 3-2-2 is a method in which the terminal individually reports phase difference values of other TRSs, in comparison to a reference TRS, to respective TRPs. The terminal may calculate phase differences in comparison to the reference (serving) TRS, and individually report a corresponding value to a TRP that needs to be compensated. As in method 3-2-1 above, the terminal may identify a physical cell from which a received specific TRS has been transmitted. In this case, the terminal may individually report a cell ID to which TRP #2 belongs and a $\Phi_1$ value to TRP #2, and a cell ID to which TRP #3 belongs and a $\Phi_2$ value to TRP #3. After the terminal reporting, phase synchronization between the TRPs may be finally performed by compensating the $\Phi_1$ value for a downlink signal to be transmitted later in case of TRP #2 and by compensating the $\Phi_2$ value for the downlink signal in case of TRP #3. For the terminal reporting scheme, reporting in a periodic, semi-permanent, or aperiodic scheme is also possible, and the terminal reporting scheme is not limited thereto.

For feedback of the proposed phase difference, the terminal may provide feedback by quantizing an angle corresponding to the range 0 to 360 of a phase into n-bits. In addition, to this end, indicating, to the terminal via an RRC, higher signaling indicating a quantization level is included.

The phase difference proposed in the 3-2nd embodiment is a value corresponding to the time difference, and includes feedback of a value in another format having the same meaning. For example, values, such as a difference in a mean delay value of a delay profile, a difference in a mean delay value of a first cluster of the delay profile, and a difference in a first tap of the delay profile, may be reported.

A method proposed to secure accuracy of synchronization measurement includes indicating, to the terminal via higher signaling, configuration information enabling reception of a TRS of a certain resource or more in a certain time or frequency window when an aperiodic or semi-static TRS is used.

In addition, as a preferred embodiment of the disclosure, configuration information used for TRS transmission may be indicated in a configuration for CSI report, and in this case, the base station may indirectly determine whether synchronization is successful, based on channel feedback of the terminal.

Fourth Embodiment: PDCCH/PDSCH Transmission Method in which Time Delay Difference and Phase Difference are Pre-Compensated in TRPs The proposed fourth embodiment describes a method of transmitting a PDCCH/PDSCH in which the base stations have pre-compensated time/phase differences, which are reported by the terminal, for TRS transmission of the base stations in the third embodiment above.

4-1st Embodiment: Method of Transmitting Pre-Compensated PDCCH or PDSCH after Pre-Compensated TRS Transmission The proposed 4-1st embodiment describes a method of transmitting a pre-compensated PDCCH or PDSCH after transmission of TRS #4 which is obtained by pre-compensating for time delay differences or phase differences reported by the terminal in the second embodiment. With respect to the pre-compensated PDCCH or PDSCH, the QCL relation with TRS #4, which has been pre-compensated and transmitted, may be indicated 27-02. For example, a QCL reference for the pre-compensated PDCCH or PDSCH may be indicated as the pre-compensated TRS #4 resource, in which case, a QCL type may include at least one of QCL-typeA and QCL-typeD. In addition, for non-SFN transmission TRPs, since three different QCLs may be connected in TRS #4, different QCL-types can be indicated for each antenna port group in TRS #4. Although a TRS has been taken as an example in the above embodiment, transmission in other forms, such as a CSI-RS for CSI and a CSI-RS for BM, is also possible.

4-2nd Embodiment: Method of Transmitting Pre-Compensated PDCCH or PDSCH without Transmitting Pre-Compensated TRS The proposed 4-2nd embodiment describes a method of transmitting a pre-compensated PDCCH or PDSCH if there is no transmission of TRS #4 which is obtained by the base stations pre-compensating for time/phase differences reported by the terminal in the third embodiment. If TRS #4 pre-compensated by the base stations is not transmitted, a TRS resource to refer to an average delay characteristic of the pre-compensated PDCCH or PDSCH may not be configured. Therefore, if non-pre-compensated TRS #1, TRS #2, or TRS #3 transmitted in the first operation of the first embodiment is used as the QCL reference of the PDCCH or PDSCH, a channel information characteristic that is referenced together may include no average delay channel characteristic. For example, for the QCL type indicated together with TRS #1, TRS #2, and TRS #3, at least one channel characteristic among average delay, delay spread, Doppler spread, and spatial Rx parameter is indicated, and the QCL type may not include the average delay. In addition, the QCL type may be a new type, such as QCL-typeE or QCL-typeF which has not been previously defined.

Figure 28:
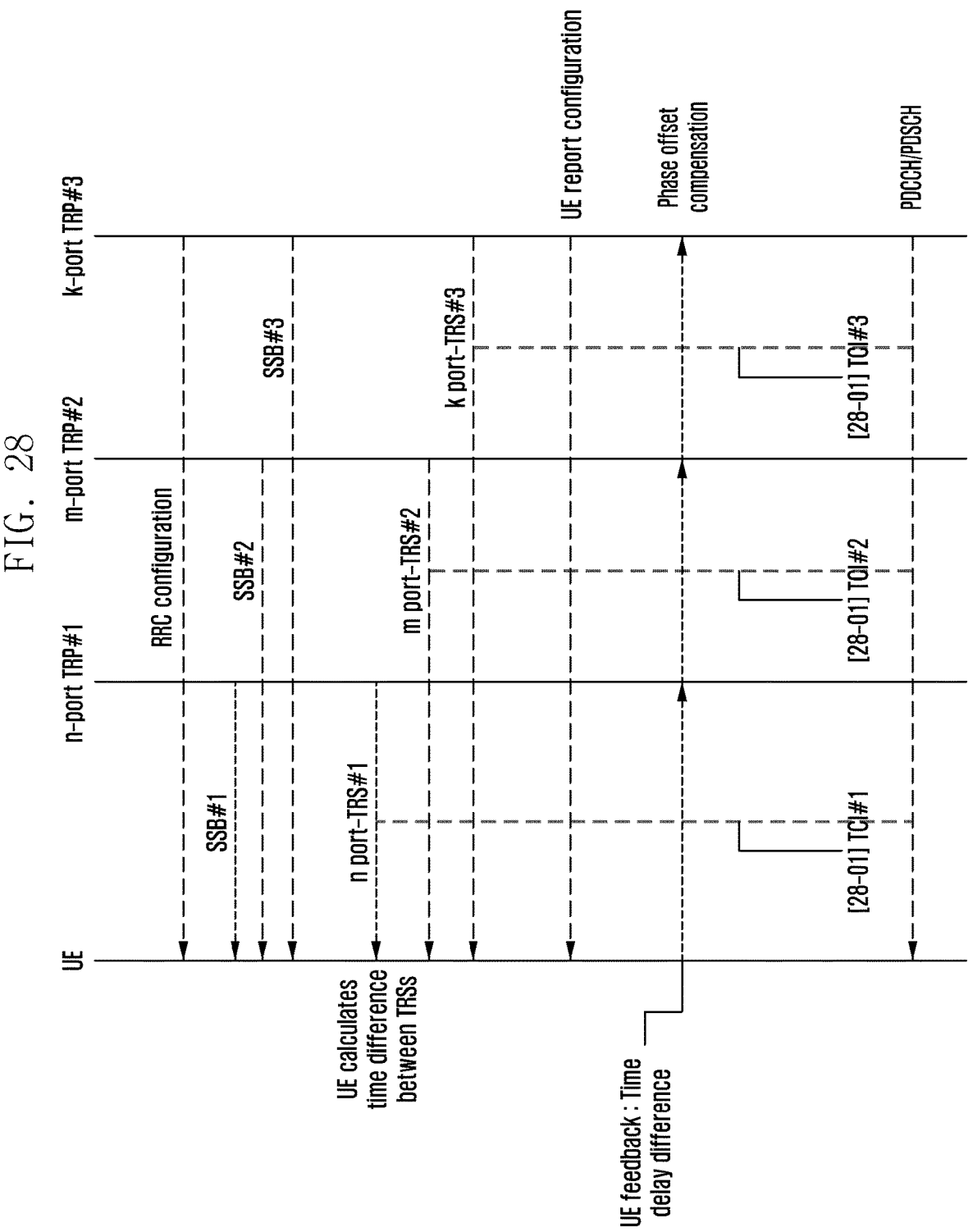
FIG. 28 is a diagram illustrating a procedure in which a terminal receives a downlink control channel and a downlink data channel by referring to TRS #1, TRS #2, and TRS #3 which are not pre-compensated, according to an embodiment of the disclosure.

FIG. 28 is a sequence diagram illustrating a method of indicating a QCL relation of a pre-compensated PDCCH or PDSCH according to the 4-2nd embodiment. If pre-compensated TRS #4 is not transmitted in the example above, one or multiple TRSs among the three TRS #1, TRS #2, and TRS #3 may be indicated as the QCL reference 28-01 with respect to the pre-compensated PDCCH or PDSCH. In this case, if the average delay of the PDCCH or PDSCH is pre-compensated based on TRS #1, an average delay characteristic is shared with the PDCCH or PDSCH and TRS #1, but only other channel characteristics except for the average delay may be shared with the PDCCH or PDSCH, TRS #2, and TRS #3. At least one of the following may be considered as a method of sharing the channel characteristic when indicating the QCL relation for PDCCH or PDSCH reception.

[Method 4-2-1]: Indicating Different QCL Type for Each TRS

Proposed method 4-2-1 is a method of indicating the QCL relation for each of different TRSs transmitted by the base stations. For example, if the base stations indicate, to the terminal, TRS #1, TRS #2, and TRS #3 as QCL references via higher-layer signaling, a different QCL type may be indicated for each of TRS #1, TRS #2, and TRS #3. In this case, if the serving TRP is TRP #1, QCL-typeA may be indicated in TRS #1, but QCL-typeB, from which an average delay has been excluded, or a new QCL type may be indicated in TRS #2 and TRS #3.

[Method 4-2-2]: Assuming average delay measured in TRS of serving TRP

Proposed method 4-2-2 is a method of referring to a QCL relation of a TRS transmitted from the serving TRP among different TRSs transmitted by the base stations. For example, if the base stations indicate, to the terminal, TRS #1 and TRS #2 as QCL references by higher-layer signaling, the terminal may assume, as a reference for the average delay, a value measured in TRS #1 transmitted from the serving TRP in the example above. TRS #1 may be indicated differently as a first-indicated QCL reference RS, a TRS with a lower index, or the like, and may be indicated in various forms having the same meaning.

The aforementioned methods and transmission signals are merely examples, and are not limited thereto. For example, in the above examples, it is assumed that a signal, which is obtained by the base stations pre-compensating for time delay and phase differences reported by the terminal, to be a CSI-RS for tracking (TRS), but a CSI-RS for CSI, a CSI-RS for BM, etc. may be transmitted to the terminal, and the terminal may be able to receive a downlink signal, such as PDSCH, PDCCH, and DMRS, by using the QCL relation of CSI-RS received from the base stations.

As in the above examples, various embodiments, such as variations based on listed methods or combinations of the listed methods, may be possible.

Figure 29:
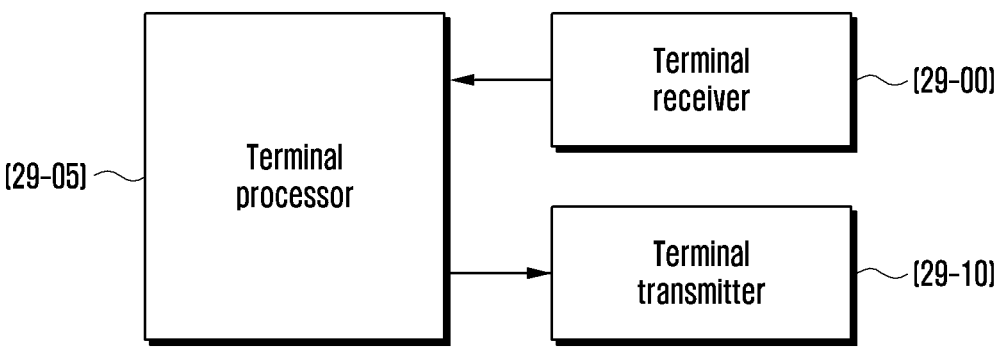
FIG. 29 is a diagram illustrating a structure of a terminal in the wireless communication system according to an embodiment of the disclosure.

FIG. 29 is a diagram illustrating a structure of a terminal in the wireless communication system according to an embodiment of the disclosure.

Referring to FIG. 29, a terminal may include a transceiver, which refers to a terminal receiver 29-00 and a terminal transmitter 29-10, a memory (not illustrated), and a terminal processor 29-05 (or a terminal controller or a processor). According to the communication method of the terminal described above, the transceiver 29-00 or 29-10, the memory, and the terminal processor 29-05 of the terminal may operate. However, the elements of the terminal are not limited to the aforementioned examples. For example, the terminal may include more elements or fewer elements compared to the aforementioned elements. In addition, the transceiver, the memory, and the processor may be implemented in the form of a single chip.

The transceiver may transmit a signal to or receive a signal from a base station. Here, the signal may include control information and data. To this end, the transceiver may include an RF transmitter configured to perform up-conversion and amplification of a frequency of a transmitted signal, an RF receiver configured to perform low-noise amplification of a received signal and down-conversion of a frequency, and the like. However, this is only an embodiment of the transceiver, and the elements of the transceiver are not limited to the RF transmitter and the RF receiver.

The transceiver may receive a signal and output the same to the processor via a radio channel and may transmit, via a radio channel, a signal output from the processor.

The memory may store a program and data necessary for operation of the terminal. The memory may store control information or data included in a signal transmitted or received by the terminal. The memory may include a storage medium or a combination of storage media, such as a ROM, a RAM, a hard disk, a CD-ROM, and a DVD. There may be multiple memories.

The processor may control a series of procedures so that the terminal operates according to the aforementioned embodiments. For example, the processor may receive DCI including two layers and control the elements of the terminal to simultaneously receive multiple PDSCHs. There may be multiple processors, and the processors may control the elements of the terminal by executing programs stored in the memory.

For example, the processor is configured to measure a first reference signal transmitted from a first transmission and reception point (TRP) of a base station and measure a second reference signal transmitted from a second TRP, calculate a time delay difference between the first reference signal and the second reference signal, receive, from the base station, terminal report configuration information indicating reporting of the time delay difference between the first reference signal and the second reference signal, transmit, based on the terminal report configuration information, information on the time delay difference between the first reference signal and the second reference signal to the base station, receive reference signals compensated based on the information on the time delay difference between the first reference signal and the second reference signal from the first TRP and the second TRP, and perform control to receive downlink information from the first TRP and the second TRP, based on the compensated reference signals.

In addition, the terminal report configuration information may include first information indicating a reference signal serving as a time delay reference from among the first reference signal and the second reference signal, and second information indicating time delay difference reporting. In addition, the terminal report configuration information may include third information indicating a reference signal serving as a reference for a phase difference from among the first reference signal and the second reference signal, and fourth information indicating phase difference reporting. In addition, the downlink information may be received based on the compensated reference signals and quasi-co-location (QCL) information related to the compensated reference signals.

Figure 30:
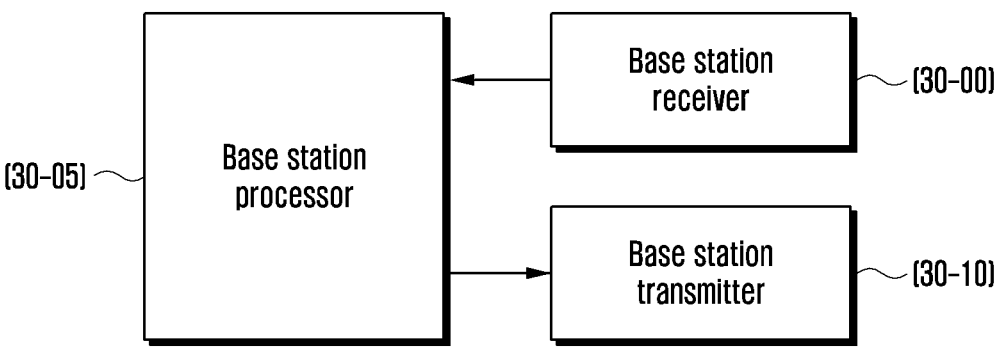
FIG. 30 is a diagram illustrating a structure of a base station in the wireless communication system according to an embodiment of the disclosure.

FIG. 30 is a diagram illustrating a structure of a base station in the wireless communication system according to an embodiment of the disclosure.

Referring to FIG. 30, a base station may include a transceiver, which refers to a base station receiver 30-00 and a base station transmitter 30-10, a memory (not illustrated), and a base station processor 30-05 (or a base station controller or a processor). According to the communication method of the base station described above, the transceiver 30-00 or 30-10, the memory, and the base station processor 30-05 of the base station may operate. However, the elements of the base station are not limited to the above examples. For example, the base station may include more elements or fewer elements compared to the aforementioned elements. In addition, the transceiver, the memory, and the processor may be implemented in the form of a single chip.

The transceiver may transmit a signal to or receive a signal from a terminal. Here, the signal may include control information and data. To this end, the transceiver may include an RF transmitter configured to perform up-conversion and amplification of a frequency of a transmitted signal, an RF receiver configured to perform low-noise amplification of a received signal and down-conversion of a frequency, and the like. However, this is only an embodiment of the transceiver, and the elements of the transceiver are not limited to the RF transmitter and the RF receiver.

The transceiver may receive a signal and output the same to the processor via a radio channel and may transmit, via a radio channel, a signal output from the processor.

The memory may store a program and data necessary for operation of the base station. The memory may store control information or data included in a signal transmitted or received by the base station. The memory may include a storage medium or a combination of storage media, such as a ROM, a RAM, a hard disk, a CD-ROM, and a DVD. There may be multiple memories.

The processor may control a series of procedures so that the base station operates according to the aforementioned embodiments of the disclosure. For example, the processor may configure DCI of two layers including allocation information for multiple PDSCHs, and may control each element of the base station to transmit the DCI. There may be multiple processors, and the processors may control the elements of the base station by executing programs stored in the memory.

For example, the processor is configured to transmit a first reference signal from a first transmission and reception point (TRP) and transmit a second reference signal from a second TRP to a terminal, transmit, to the terminal, terminal report configuration information indicating reporting of a time delay difference between the first reference signal and the second reference signal, receive, based on the terminal report configuration information, information on the time delay difference between the first reference signal and the second reference signal from the terminal, compensate, based on the information on the time delay difference, at least one reference signal of the first reference signal of the first TRP or the reference signal of the second TRP, transmit compensated reference signals from the first TRP and the second TRP to the terminal, and perform control to transmit downlink information to the terminal from the first TRP and the second TRP, based on the compensated reference signals.

The terminal report configuration information may include first information indicating a reference signal serving as a time delay reference from among the first reference signal and the second reference signal, and second information indicating time delay difference reporting. In addition, the terminal report configuration information may include third information indicating a reference signal serving as a reference for a phase difference from among the first reference signal and the second reference signal, and fourth information indicating phase difference reporting. In addition, the downlink information may be transmitted based on the compensated reference signals and quasi-co-location (QCL) information related to the compensated reference signals.

The methods according to various embodiments described in the claims or the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

The embodiments of the disclosure described and shown in the specification and the drawings are merely specific examples that have been presented to easily explain the technical contents of the disclosure and help understanding of the disclosure, and are not intended to limit the scope of the disclosure. That is, it will be apparent to those skilled in the art that other variants based on the technical idea of the disclosure may be implemented. Furthermore, the above respective embodiments may be employed in combination, as necessary. For example, a part of one embodiment of the disclosure may be combined with a part of another embodiment to operate a base station and a terminal. As an example, a part of embodiment 1 of the disclosure may be combined with a part of embodiment 2 to operate a base station and a terminal. Moreover, although the above embodiments have been described based on the FDD LTE system, other variants based on the technical idea of the embodiments may also be implemented in other systems such as TDD LTE, 5G, and NR systems.

In the drawings in which methods of the disclosure are described, the order of the description does not always correspond to the order in which steps of each method are performed, and the order relationship between the steps may be changed or the steps may be performed in parallel.

Alternatively, in the drawings in which methods of the disclosure are described, some elements may be omitted and only some elements may be included therein without departing from the essential spirit and scope of the disclosure.

Furthermore, in methods of the disclosure, some or all of the contents of each embodiment may be implemented in combination without departing from the essential spirit and scope of the disclosure.

Various embodiments of the disclosure have been described above. The above description of the disclosure is merely for the purpose of illustration, and embodiments of the disclosure are not limited to the embodiments set forth herein. Those skilled in the art will appreciate that other particular modifications and changes may be easily made without departing from the technical idea or the essential features of the disclosure. The scope of the disclosure should be determined not by the above description but by the appended claims, and all modifications or changes derived from the meaning and scope of the claims and equivalent concepts thereof shall be construed as falling within the scope of the disclosure.

The invention claimed is:

1. A method performed by a terminal of a wireless communication system, the method comprising:
measuring a first reference signal transmitted from a first transmission and reception point (TRP) of a base station and a second reference signal transmitted from a second TRP;
calculating a time delay difference between the first reference signal and the second reference signal;

receiving, from the base station, terminal report configuration information indicating reporting of the time delay difference between the first reference signal and the second reference signal;

based on the terminal report configuration information, transmitting information on the time delay difference between the first reference signal and the second reference signal to the base station;

receiving reference signals compensated based on the information on the time delay difference between the first reference signal and the second reference signal from the first TRP and the second TRP; and based on the compensated reference signals, receiving downlink information from the first TRP and the second TRP.

2. The method of claim 1, wherein the terminal report configuration information comprises first information indicating a reference signal serving as a time delay reference from among the first reference signal and the second reference signal, and second information indicating time delay difference reporting.

3. The method of claim 1, wherein the terminal report configuration information comprises third information indicating a reference signal serving as a reference for a phase difference from among the first reference signal and the second reference signal, and fourth information indicating phase difference reporting.

4. The method of claim 1, wherein the downlink information is received based on the compensated reference signals and quasi-co-location (QCL) information related to the compensated reference signals.

5. A method performed by a base station of a wireless communication system, the method comprising:

transmitting a first reference signal from a first transmission and reception point (TRP) and a second reference signal from a second TRP to a terminal;

transmitting, to the terminal, terminal report configuration information indicating reporting of a time delay difference between the first reference signal and the second reference signal;

based on the terminal report configuration information, receiving information on the time delay difference between the first reference signal and the second reference signal from the terminal;

based on the information on the time delay difference, compensating at least one reference signal of the first reference signal of the first TRP or the reference signal of the second TRP;

transmitting compensated reference signals from the first TRP and the second TRP to the terminal; and based on the compensated reference signals, transmitting downlink information to the terminal from the first TRP and the second TRP.

6. The method of claim 5, wherein the terminal report configuration information comprises first information indicating a reference signal serving as a time delay reference from among the first reference signal and the second reference signal, and second information indicating time delay difference reporting.

7. The method of claim 5, wherein the terminal report configuration information comprises third information indicating a reference signal serving as a reference for a phase difference from among the first reference signal and the second reference signal, and fourth information indicating phase difference reporting.

8. The method of claim 5, wherein the downlink information is transmitted based on the compensated reference signals and quasi-co-location (QCL) information related to the compensated reference signals.

9. A terminal of a wireless communication system, the terminal comprising:

a transceiver; and a controller, wherein the controller is configured to:

measure a first reference signal transmitted from a first transmission and reception point (TRP) of a base station a second reference signal transmitted from a second TRP;

calculate a time delay difference between the first reference signal and the second reference signal;

receive, from the base station, terminal report configuration information indicating reporting of the time delay difference between the first reference signal and the second reference signal;

based on the terminal report configuration information, transmit information on the time delay difference between the first reference signal and the second reference signal to the base station;

receive reference signals compensated based on the information on the time delay difference between the first reference signal and the second reference signal from the first TRP and the second TRP; and based on the compensated reference signals, receive downlink information from the first TRP and the second TRP.

10. The terminal of claim 9, wherein the terminal report configuration information comprises first information indicating a reference signal serving as a time delay reference from among the first reference signal and the second reference signal, and second information indicating time delay difference reporting.

11. The terminal of claim 9, wherein the terminal report configuration information comprises third information indicating a reference signal serving as a reference for a phase difference from among the first reference signal and the second reference signal, and fourth information indicating phase difference reporting.

12. The terminal of claim 9, wherein the downlink information is received based on the compensated reference signals and quasi-co-location (QCL) information related to the compensated reference signals.

13. A base station of a wireless communication system, the base station comprising:

a transceiver; and a controller, wherein the controller is configured to:

transmit, to a terminal, a first reference signal from a first transmission and reception point (TRP) and a second reference signal from a second TRP;

transmit, to the terminal, terminal report configuration information indicating reporting of a time delay difference between the first reference signal and the second reference signal;

based on the terminal report configuration information, receive information on the time delay difference between the first reference signal and the second reference signal from the terminal;

based on the information on the time delay difference, compensate at least one reference signal of the first reference signal of the first TRP or the reference signal of the second TRP;

transmit compensated reference signals from the first TRP and the second TRP to the terminal; and based on the compensated reference signals, transmit downlink information to the terminal from the first TRP and the second TRP.

14. The base station of claim 13, wherein the terminal report configuration information comprises first information indicating a reference signal serving as a time delay reference from among the first reference signal and the second reference signal, and second information indicating time delay difference reporting, and wherein the terminal report configuration information comprises third information indicating a reference signal serving as a reference for a phase difference from among the first reference signal and the second reference signal, and fourth information indicating phase difference reporting.

15. The base station of claim 13, wherein the downlink information is transmitted based on the compensated reference signals and quasi-co-location (QCL) information related to the compensated reference signals.

\* \* \* \* \*